US012786999B2

(12) United States Patent
Liu et al.

(10) Patent No.: US 12,786,999 B2
(45) Date of Patent: Nov. 3, 2026

(54) COMMUNICATION METHOD AND APPARATUS, TERMINAL DEVICE, NETWORK DEVICE, AND MEDIUM

(71) Applicant: HUAWEI TECHNOLOGIES CO., LTD., Shenzhen (CN)

(72) Inventors: Xianda Liu, Beijing (CN); Xueru Li, Beijing (CN); Liuliu Ji, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 764 days.

(21) Appl. No.: 18/151,986

(22) Filed: Jan. 9, 2023

(65) Prior Publication Data

US 2023/0164783 A1 May 25, 2023

Related U.S. Application Data

(63) Continuation of application No. PCT/CN2021/104798, filed on Jul. 6, 2021.

(30) Foreign Application Priority Data

Jul. 10, 2020 (CN) ......................... 202010664744.9

(51) Int. Cl.
*H04W 72/1273* (2023.01)
*H04W 72/20* (2023.01)

(52) U.S. Cl.
CPC ....... *H04W 72/1273* (2013.01); *H04W 72/20* (2023.01)

(58) Field of Classification Search
None
See application file for complete search history.

(56) References Cited

U.S. PATENT DOCUMENTS

2018/0220428 A1* 8/2018 Sun ........................ H04W 74/02
2019/0150123 A1* 5/2019 Nogami ................ H04W 72/23 370/330

(Continued)

FOREIGN PATENT DOCUMENTS

CN 105589506 A 5/2016
CN 110831216 A 2/2020

(Continued)

OTHER PUBLICATIONS

Extended European Search Report issued in corresponding European Application No. 21838235.6, dated Nov. 21, 2023, pp. 1-11.

(Continued)

*Primary Examiner* — Phirin Sam
(74) *Attorney, Agent, or Firm* — HAUPTMAN HAM, LLP

(57) ABSTRACT

Embodiments of this disclosure provide a communication method and apparatus, a terminal device, a network device, and a medium. In the method, the terminal device receives first scheduling information from the network device, where the first scheduling information indicates a set of shared channel transmission occasions and a first beamforming manner of a shared channel. The terminal device receives second scheduling information from the network device, where the second scheduling information indicates a control channel transmission occasion and/or a second beamforming manner of a control channel. If the terminal device determines that time domain resources of the control channel transmission occasion and one or more shared channel transmission occasions in the set of shared channel transmission occasions at least partially overlap, the terminal device determines at least one shared channel transmission occasion from the set based on at least one of the first beamforming manner and the second beamforming manner.

20 Claims, 15 Drawing Sheets

(56) References Cited

U.S. PATENT DOCUMENTS

| | | | | |
|---|---|---|---|---|
| 2019/0335441 | A1* | 10/2019 | Bai | H04L 5/0023 |
| 2020/0053712 | A1* | 2/2020 | Josan | H04B 7/0617 |
| 2020/0163096 | A1* | 5/2020 | Wu | H04L 5/0091 |
| 2020/0350957 | A1* | 11/2020 | Zhou | H04B 7/0408 |
| 2021/0014800 | A1* | 1/2021 | Wang | H04L 5/0048 |
| 2021/0219318 | A1* | 7/2021 | Sarkis | H04L 1/0003 |
| 2022/0046675 | A1* | 2/2022 | Jung | H04L 5/0055 |
| 2022/0124619 | A1* | 4/2022 | Sun | H04L 12/2803 |
| 2023/0397112 | A1* | 12/2023 | Sun | H04L 12/2803 |
| 2024/0349268 | A1* | 10/2024 | Wu | H04W 72/12 |
| 2025/0158754 | A1* | 5/2025 | Moon | H04L 1/1854 |

FOREIGN PATENT DOCUMENTS

| | | | |
|---|---|---|---|
| CN | 110958690 | A | 4/2020 |
| EP | 3843303 | A1 | 6/2021 |
| WO | 2018231728 | A1 | 12/2018 |
| WO | 2020034430 | A1 | 2/2020 |
| WO | 2020051152 | A1 | 3/2020 |
| WO | 2020057404 | A1 | 3/2020 |
| WO | 2021226740 | A1 | 11/2021 |

OTHER PUBLICATIONS

India Examination Report issued in corresponding India Application No. 202337002086, dated Sep. 6, 2023, pp. 1-2.

International Search Report issued in corresponding International Application No. PCT/CN2021/104798, dated Aug. 31, 2021, pp. 1-8.

* cited by examiner

COMMUNICATION METHOD AND APPARATUS, TERMINAL DEVICE, NETWORK DEVICE, AND MEDIUM

CROSS-REFERENCE TO RELATED APPLICATIONS

This application is a continuation of International Application No. PCT/CN2021/104798, filed on Jul. 6, 2021, which claims priority to Chinese Patent Application No. 202010664744.9, filed on Jul. 10, 2020. The disclosures of the forementioned applications are hereby incorporated by reference in their entireties.

TECHNICAL FIELD

This disclosure relates to communication technologies in general, and specifically, to a communication method, a communication apparatus, a terminal device, a network device, and a computer-readable medium.

BACKGROUND

A 5th generation (5G) mobile communication technology is a new-generation mobile communication system developed to meet latest mobile communication requirements, and has ultra-high spectrum and energy efficiency. Specifically, in terms of a transmission rate, resource utilization, and the like, a 5G mobile communication system is improved by one or more orders of magnitude than a 4th generation (4G) mobile communication system, and wireless coverage performance, a transmission latency, system security, and user experience of 5G are also significantly improved. Currently, 5G has become a research focus in a mobile communication field at home and abroad. Countries around the world have conducted extensive discussions on development visions, application requirements, candidate frequency bands, key technical indicators, and enabling technologies of 5G, and initiated a related standardization process. Based on technical visions of 5G, a 5G network meets requirements of people for an ultra-high traffic density, an ultra-high connection density, and ultra-high mobility, and provides users with optimal service experience such as a high-definition video, virtual reality, augmented reality, a cloud desktop, and online gaming. In addition, 5G further penetrates into an internet of things field and deeply integrates with industrial facilities, medical instruments, transportation vehicles, and the like, to fully achieve "connectivity of everything".

In a mobile communication system such as 5G, various shared channels and control channels may be transmitted between a terminal device and a network device (or another terminal device). Examples of the shared channels may include but are not limited to a physical uplink shared channel (physical uplink shared channel, PUSCH), a physical downlink shared channel (physical downlink shared channel, PDSCH), a physical sidelink shared channel (physical sidelink shared channel, PSSCH), and the like. Examples of the control channels may include but are not limited to a physical uplink control channel (physical uplink control channel, PUCCH), a physical downlink control channel (physical downlink control channel, PDCCH), a physical sidelink control channel (physical sidelink control channel, PSCCH), and the like. However, in some communication scenarios, a conventional transmission solution of a shared channel and a control channel may fail to ensure high transmission reliability and a low transmission latency of the shared channel and the control channel. Consequently, performance of communication between the terminal device and the network device (or the another terminal device) deteriorates, and user experience is further affected.

SUMMARY

This disclosure relates to a technical solution for communication, and specifically provides a communication method, a communication apparatus, a terminal device, a network device, and a computer-readable medium.

According to a first aspect of this disclosure, a communication method is provided. The method includes: A terminal device receives first scheduling information of a shared channel from a network device, where the first scheduling information indicates a set of shared channel transmission occasions of the shared channel and a first beamforming manner of the shared channel. The method further includes: The terminal device receives second scheduling information of a control channel from the network device, where the second scheduling information indicates a control channel transmission occasion of the control channel and/or a second beamforming manner of the control channel. The method further includes: If the terminal device determines that time domain resources of the control channel transmission occasion and one or more shared channel transmission occasions in the set at least partially overlap, the terminal device determines at least one shared channel transmission occasion from the set based on at least one of the first beamforming manner and the second beamforming manner. It is optional that the second scheduling information indicates the second beamforming manner of the control channel. The method further includes: The terminal device sends control information associated with the control channel to the network device on the at least one shared channel transmission occasion. According to the method, transmission reliability of the control information between the terminal device and the network device can be improved, and transmission reliability of data or other information on the shared channel can be further considered, to improve performance of communication between the network device and the terminal device.

In an alternative implementation of that "if the terminal device determines that time domain resources of the control channel transmission occasion and one or more shared channel transmission occasions in the set at least partially overlap, the terminal device determines at least one shared channel transmission occasion from the set based on at least one of the first beamforming manner and the second beamforming manner", the terminal device determines the at least one shared channel transmission occasion from the set of shared channel transmission occasions based on the at least one of the first beamforming manner and the second beamforming manner, where the time domain resources of the control channel transmission occasion and the one or more shared channel transmission occasions in the set of shared channel transmission occasions at least partially overlap.

In some implementations, the determining at least one shared channel transmission occasion from the set includes: If the first beamforming manner is that a plurality of shared channel transmission occasions in the set are associated with different beams, the terminal device determines, from the set, the plurality of shared channel transmission occasions associated with the different beams. In this manner, in a scenario of coordinated multipoint transmission or multi-transmission reception point transmission of the network device, transmission reliability of the control information between the terminal device and the network device can be improved, to improve performance of communication between the terminal device and the network device.

Optionally, transmit beams associated with the plurality of shared channel transmission occasions are different from each other.

In some implementations, the plurality of shared channel transmission occasions are a plurality of shared channel transmission occasions, in the set of shared channel transmission occasions, that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device and the network device is low, to avoid a case in which the control information cannot be received within predetermined time and transmission performance of the data or other information on the shared channel is affected.

In some implementations, the determining at least one shared channel transmission occasion from the set includes: The terminal device determines a time period for generating the control information. The terminal device determines a subset of the set based on the time period, where duration between a start time point of a shared channel transmission occasion in the subset and a receiving time point at which the second scheduling information is received is greater than the time period. The terminal device determines the at least one shared channel transmission occasion from the subset. In this manner, the method in this embodiment of this disclosure may adapt to a terminal device with a low processing capability, and meet a limitation of the low processing capability of the terminal device.

In some implementations, the determining at least one shared channel transmission occasion from the set includes: If the first beamforming manner is that all shared channel transmission occasions in the set are associated with a same beam, the terminal device determines a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some implementations, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that a plurality of control channel transmission occasions in the second set are associated with different beams, the terminal device determines the plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel. In some implementations, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that all control channel transmission occasions in the second set are associated with a same beam, the terminal device determines a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the first beamforming manner is that a plurality of shared channel transmission occasions in the first set are associated with different beams, and the second beamforming manner is that a plurality of control channel transmission occasions in the second set are associated with different beams, the terminal device determines, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some implementations, the at least one shared channel transmission occasion includes a plurality of shared channel transmission occasions, and the sending control information includes: The terminal device sends, on each of one or more of the plurality of shared channel transmission occasions, a plurality of modulation symbols corresponding to the control information. In this way, reliability of transmitting the control information on a plurality of transmission occasions of the shared channel can be improved.

In some implementations, the at least one shared channel transmission occasion includes a plurality of shared channel transmission occasions, and the sending control information includes: The terminal device sends, on each of the plurality of shared channel transmission occasions, a part of a plurality of modulation symbols corresponding to the control information. In this way, transmission reliability of the data or other information on the shared channel can be improved.

In some implementations, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (Bandwidth part, BWP).

According to a second aspect of this disclosure, a communication method is provided. The method includes: A network device sends first scheduling information of a shared channel to a terminal device, where the first scheduling information indicates a set of shared channel transmission occasions of the shared channel and a first beamforming manner of the shared channel. The method further includes: The network device sends second scheduling information of a control channel to the terminal device, where the second scheduling information indicates a control channel transmission occasion of the control channel and/or a second beamforming manner of the control channel. The method further includes: If the network device determines that time domain resources of the control channel transmission occasion and one or more shared channel transmission occasions in the set at least partially overlap, the network device determines at least one shared channel transmission occasion from the set based on at least one of the first beamforming manner and the second beamforming manner. It is optional that the second scheduling information indicates the second beamforming manner of the control channel. The method further includes: The network device receives control information associated with the control channel from the terminal device on the at least one shared channel transmission occasion. According to the method, transmission reliability of the control information between the terminal device and the network device can be improved, and transmission reliability of data or other information on the shared channel can be further considered, to improve performance of communication between the network device and the terminal device.

In an alternative implementation of that "if the network device determines that time domain resources of the control channel transmission occasion and one or more shared channel transmission occasions in the set at least partially overlap, the network device determines at least one shared channel transmission occasion from the set based on at least one of the first beamforming manner and the second beamforming manner", the network device determines the at least one shared channel transmission occasion from the set of shared channel transmission occasions based on the at least one of the first beamforming manner and the second beamforming manner, where the time domain resources of the control channel transmission occasion and the one or more shared channel transmission occasions in the set of shared channel transmission occasions at least partially overlap.

In some implementations, the determining at least one shared channel transmission occasion from the set includes: If the first beamforming manner is that a plurality of shared channel transmission occasions in the set are associated with different beams, the network device determines, from the set, the plurality of shared channel transmission occasions associated with the different beams. In this manner, in a scenario of coordinated multipoint transmission or multi-transmission reception point transmission of the network device, transmission reliability of the control information between the terminal device and the network device can be improved, to improve performance of communication between the terminal device and the network device.

Optionally, transmit beams associated with the plurality of shared channel transmission occasions are different from each other.

In some implementations, the plurality of shared channel transmission occasions are a plurality of shared channel transmission occasions in the set that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device and the network device is low, to avoid a case in which the control information cannot be received within predetermined time and transmission performance of the data or other information on the shared channel is affected.

In some implementations, the determining at least one shared channel transmission occasion from the set includes: The network device determines a time period used by the terminal device to generate the control information. The network device determines a subset of the set based on the time period, where duration between a start time point of a shared channel transmission occasion in the subset and a receiving time point at which the terminal device receives the second scheduling information is greater than the time period. The network device determines the at least one shared channel transmission occasion from the subset. In this manner, the method in this embodiment of this disclosure may adapt to a terminal device with a low processing capability, and meet a limitation of the low processing capability of the terminal device.

In some implementations, the determining at least one shared channel transmission occasion from the set includes: If the first beamforming manner is that all shared channel transmission occasions in the set are associated with a same beam, the network device determines a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some implementations, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that a plurality of control channel transmission occasions in the second set are associated with different beams, the network device determines the plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that all control channel transmission occasions in the second set are associated with a same beam, the network device determines a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the first beamforming manner is that a plurality of shared channel transmission occasions in the first set are associated with different beams, and the second beamforming manner is that a plurality of control channel transmission occasions in the second set are associated with different beams, the network device determines, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some implementations, the at least one shared channel transmission occasion includes a plurality of shared channel transmission occasions, and the receiving control information includes: The network device receives, on each of one or more of the plurality of shared channel transmission occasions, a plurality of modulation symbols corresponding to the control information. In this way, reliability of transmitting the control information on a plurality of transmission occasions of the shared channel can be improved.

In some implementations, the at least one shared channel transmission occasion includes a plurality of shared channel transmission occasions, and the receiving control information includes: The network device receives, on each of the plurality of shared channel transmission occasions, a part of a plurality of modulation symbols corresponding to the control information. In this way, transmission reliability of the data or other information on the shared channel can be improved.

In some implementations, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

According to a third aspect of this disclosure, a communication apparatus is provided. The apparatus includes a receiver, a processor, and a transmitter. The receiver is configured to receive first scheduling information of a shared channel from a network device, where the first scheduling information indicates a set of shared channel transmission occasions of the shared channel and a first beamforming manner of the shared channel. The receiver is further configured to receive second scheduling information of a control channel from the network device, where the second scheduling information indicates a control channel transmission occasion of the control channel and/or a second beamforming manner of the control channel. The processor is configured to: if determining that time domain resources of the control channel transmission occasion and one or more shared channel transmission occasions in the set at least partially overlap, determine at least one shared channel transmission occasion from the set based on at least one of the first beamforming manner and the second beamforming manner. It is optional that the second scheduling information indicates the second beamforming manner of the control channel. The transmitter is configured to send control information associated with the control channel to the network device on the at least one shared channel transmission occasion. Based on the apparatus, transmission reliability of the control information between the terminal device and the network device can be improved, and transmission reliability of data or other information on the shared channel can be further considered, to improve performance of communication between the network device and the terminal device.

In an alternative implementation of that "the processor is configured to: if determining that time domain resources of the control channel transmission occasion and one or more shared channel transmission occasions in the set at least partially overlap, determine at least one shared channel transmission occasion from the set based on at least one of the first beamforming manner and the second beamforming manner", the processor is configured to determine the at least one shared channel transmission occasion from the set of shared channel transmission occasions based on the at least one of the first beamforming manner and the second beamforming manner, where the time domain resources of the control channel transmission occasion and the one or more shared channel transmission occasions in the set of shared channel transmission occasions at least partially overlap.

In some implementations, the processor is further configured to determine the at least one shared channel transmission occasion from the set in the following manner: if the first beamforming manner is that a plurality of shared channel transmission occasions in the set are associated with different beams, determining the plurality of shared channel transmission occasions associated with the different beams. In this manner, in a scenario of coordinated multipoint transmission or multi-transmission reception point transmission of the network device, transmission reliability of the control information between the terminal device and the network device can be improved, to improve performance of communication between the terminal device and the network device.

Optionally, transmit beams associated with the plurality of shared channel transmission occasions are different from each other.

In some implementations, the plurality of shared channel transmission occasions are a plurality of shared channel transmission occasions in the set that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device and the network device is low, to avoid a case in which the control information cannot be received within predetermined time and transmission performance of the data or other information on the shared channel is affected.

In some implementations, the processor is further configured to determine the at least one shared channel transmission occasion from the set in the following manner: determining a time period for generating the control information; determining a subset of the set based on the time period, where duration between a start time point of the shared channel transmission occasion in the sub set and a receiving time point at which the second scheduling information is received is greater than the time period; and determining the at least one shared channel transmission occasion from the subset. In this manner, the apparatus in this embodiment of this disclosure may adapt to a terminal device with a low processing capability, and meet a limitation of the low processing capability of the terminal device.

In some implementations, the processor is further configured to determine the at least one shared channel transmission occasion from the set in the following manner: if the first beamforming manner is that all shared channel transmission occasions in the set are associated with a same beam, determining a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some implementations, the set of shared channel transmission occasions is a first set, the foregoing control channel transmission occasion is a control channel transmission occasion in a second set of control channel transmission occasions of the control channel, and the processor is further configured to determine the at least one shared channel transmission occasion from the first set in the following manner: if the second beamforming manner is that a plurality of control channel transmission occasions in the second set are associated with different beams, determining a plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the processor is further configured to determine the at least one shared channel transmission occasion from the first set in the following manner: if the second beamforming manner is that all control channel transmission occasions in the second set are associated with a same beam, determining a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the processor is further configured to determine the at least one shared channel transmission occasion from the first set in the following manner: if the first beamforming manner is that a plurality of shared channel transmission occasions in the first set are associated with different beams, and the second beamforming manner is that a plurality of control channel transmission occasions in the second set are associated with different beams, determining, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some implementations, the at least one shared channel transmission occasion includes a plurality of shared channel transmission occasions, and the transmitter is further configured to send the control information in the following manner: sending, on each of one or more of the plurality of shared channel transmission occasions, a plurality of modulation symbols corresponding to the control information. In this way, reliability of transmitting the control information on a plurality of transmission occasions of the shared channel can be improved.

In some implementations, the at least one shared channel transmission occasion includes a plurality of shared channel transmission occasions, and the transmitter is further configured to send the control information in the following manner: sending, on each of the plurality of shared channel transmission occasions, a part of a plurality of modulation symbols corresponding to the control information. In this way, transmission reliability of the data or other information on the shared channel can be improved.

In some implementations, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

According to a fourth aspect of this disclosure, a communication apparatus is provided. The apparatus includes a transmitter, a processor, and a receiver. The transmitter is configured to send first scheduling information of a shared channel to a terminal device, where the first scheduling information indicates a set of shared channel transmission occasions of the shared channel and a first beamforming manner of the shared channel. The transmitter is further configured to send second scheduling information of a control channel to the terminal device, where the second scheduling information indicates a control channel transmission occasion of the control channel and/or a second beamforming manner of the control channel. The processor is configured to: if determining that time domain resources of the control channel transmission occasion and one or more shared channel transmission occasions in the set at least partially overlap, determine at least one shared channel transmission occasion from the set based on at least one of the first beamforming manner and the second beamforming manner. It is optional that the second scheduling information indicates the second beamforming manner of the control channel. The receiver is configured to receive control information associated with the control channel from the terminal device on the at least one shared channel transmission occasion. Based on the apparatus, transmission reliability of the control information between the terminal device and the network device can be improved, and transmission reliability of data or other information on the shared channel can be further considered, to improve performance of communication between the network device and the terminal device.

In an alternative implementation of that "the processor is configured to: if determining that time domain resources of the control channel transmission occasion and one or more shared channel transmission occasions in the set at least partially overlap, determine at least one shared channel transmission occasion from the set based on at least one of the first beamforming manner and the second beamforming manner", the processor is configured to determine the at least one shared channel transmission occasion from the set of shared channel transmission occasions based on the at least one of the first beamforming manner and the second beamforming manner, where the time domain resources of the control channel transmission occasion and the one or more shared channel transmission occasions in the set of shared channel transmission occasions at least partially overlap.

In some implementations, the processor is further configured to determine the at least one shared channel transmission occasion from the set in the following manner: if the first beamforming manner is that a plurality of shared channel transmission occasions in the set are associated with different beams, determining the plurality of shared channel transmission occasions associated with the different beams. In this manner, in a scenario of coordinated multipoint transmission or multi-transmission reception point transmission of the network device, transmission reliability of the control information between the terminal device and the network device can be improved, to improve performance of communication between the terminal device and the network device.

Optionally, transmit beams associated with the plurality of shared channel transmission occasions are different from each other.

In some implementations, the plurality of shared channel transmission occasions are a plurality of shared channel transmission occasions in the set that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device and the network device is low, to avoid a case in which the control information cannot be received within predetermined time and transmission performance of the data or other information on the shared channel is affected.

In some implementations, the processor is further configured to determine the at least one shared channel transmission occasion from the set in the following manners: determining a time period used by the terminal device to generate the control information; determining a subset of the set based on the time period, where duration between a start time point of a shared channel transmission occasion in the subset and a receiving time point at which the terminal device receives the second scheduling information is greater than the time period; and determining the at least one shared channel transmission occasion from the subset. In this manner, the apparatus in this embodiment of this disclosure may adapt to a terminal device with a low processing capability, and meet a limitation of the low processing capability of the terminal device.

In some implementations, the processor is further configured to determine the at least one shared channel transmission occasion from the set in the following manner: if the first beamforming manner is that all shared channel transmission occasions in the set are associated with a same beam, determining a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some implementations, the set of shared channel transmission occasions is a first set, the foregoing control channel transmission occasion is a control channel transmission occasion in a second set of control channel transmission occasions of the control channel, and the processor is further configured to determine the at least one shared channel transmission occasion from the first set in the following manner: if the second beamforming manner is that a plurality of control channel transmission occasions in the second set are associated with different beams, determining a plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the processor is further configured to determine the at least one shared channel transmission occasion from the first set in the following manner: if the second beamforming manner is that all control channel transmission occasions in the second set are associated with a same beam, determining a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some implementations, the set of shared channel transmission occasions is a first set, the foregoing control channel transmission occasion is a control channel transmission occasion in a second set of control channel transmission occasions of the control channel, and the processor is further configured to determine the at least one shared channel transmission occasion from the first set in the following manner: if the first beamforming manner is that a plurality of shared channel transmission occasions in the first set are associated with different beams, and the second beamforming manner is that a plurality of control channel transmission occasions in the second set are associated with different beams, determining, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some implementations, the at least one shared channel transmission occasion includes a plurality of shared channel transmission occasions, and the receiver is further configured to receive the control information in the following manner: receiving, on each of one or more of the plurality of shared channel transmission occasions, a plurality of modulation symbols corresponding to the control information. In this way, reliability of transmitting the control information on a plurality of transmission occasions of the shared channel can be improved.

In some implementations, the at least one shared channel transmission occasion includes a plurality of shared channel transmission occasions, and the receiver is further configured to receive the control information in the following manner: receiving, on each of the plurality of shared channel transmission occasions, a part of a plurality of modulation symbols corresponding to the control information. In this way, transmission reliability of the data or other information on the shared channel can be improved.

In some implementations, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

According to a fifth aspect of this disclosure, a terminal device is provided. The terminal device includes a processor and a memory. The memory stores computer program instructions. The memory and the computer program instructions are configured to work with the processor to enable the terminal device to perform the method in the first aspect.

According to a sixth aspect of this disclosure, a network device is provided. The network device includes a processor and a memory. The memory stores computer program instructions. The memory and the computer program instructions are configured to work with the processor to enable the network device to perform the method in the second aspect.

According to a seventh aspect of this disclosure, a computer-readable medium is provided. The computer-readable medium stores machine-executable instructions. When the machine-executable instructions are executed by a terminal device, the terminal device is enabled to perform the method in the first aspect.

According to an eighth aspect of this disclosure, a computer-readable medium is provided. The computer-readable medium stores machine-executable instructions. When the machine-executable instructions are executed by a network device, the network device is enabled to perform the method in the second aspect.

It should be understood that content described in the summary part is not intended to limit a key or important feature of this disclosure, and is not intended to limit the scope of this disclosure. The following descriptions facilitate understanding of other features of this disclosure.

BRIEF DESCRIPTION OF DRAWINGS

The foregoing and other objects, features, and advantages of embodiments of this disclosure become easily understood by reading the following detailed descriptions with reference to the accompanying drawings. In the accompanying drawings, several embodiments of this disclosure are shown by way of example and not limitation.

Throughout all the accompanying drawings, same or similar reference numerals represent same or similar components.

DESCRIPTION OF EMBODIMENTS

Figure 1:
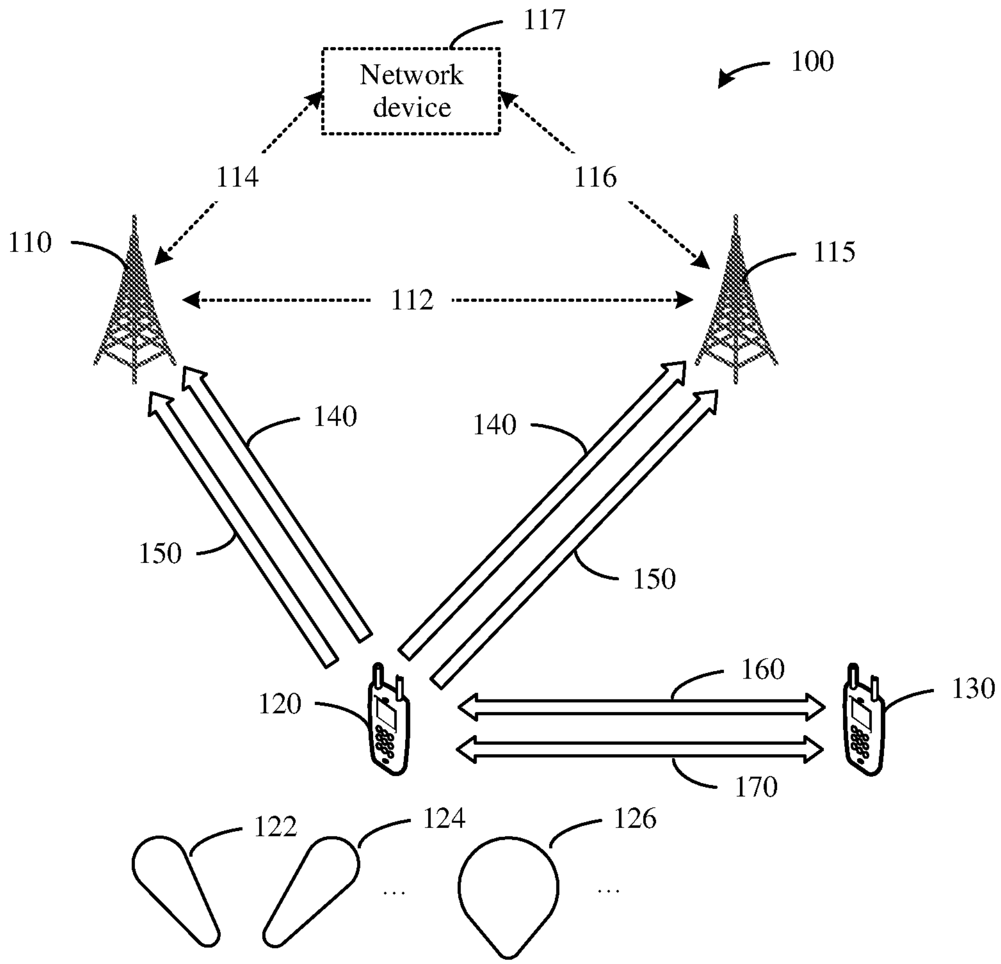
FIG. 1 is a schematic diagram of an example communication system according to an embodiment of this disclosure.

The following describes the principle and spirit of this disclosure with reference to several example embodiments shown in the accompanying drawings. It should be understood that these specific embodiments are described merely to enable a person skilled in the art to better understand and implement this disclosure, but are not intended to limit the scope of this disclosure in any manner. In the following descriptions and claims, unless otherwise defined, all technical and scientific terms used in this specification have meanings as those commonly understood by a person of ordinary skill in the art to which this disclosure belongs.

As used in this specification, the term "include" and similar terms should be understood as open inclusion, that is, "include but not limited to". The term "based" should be understood as "at least partially based". The terms "one embodiment" or "the embodiment" should be understood as "at least one embodiment". Terms such as "first", "second", and the like may refer to different objects or a same object, and are merely used to distinguish between specified objects, but do not imply a specific spatial order, a time order, an importance order, or the like of the specified objects. In some embodiments, a value, a process, a selected item, a determined item, a device, an apparatus, a means, a part, a component, or the like is referred to as "optimal", "lowest", "highest", "minimum", "maximum", or the like. It should be understood that such a description is intended to indicate that a selection may be made among many available functional selections, and that such a selection does not need to be better, lower, higher, smaller, larger, or otherwise preferred than other selections in other aspects or in all aspects. As used in this specification, the term "determining" may cover a variety of actions. For example, "determining" may include operating, calculation, processing, export, investigation, lookup (for example, lookup in a table, database, or another data structure), finding, and the like. In addition, "determining" may include receiving (for example, receiving information), accessing (for example, accessing data in a memory), and the like. In addition, "determining" may include parsing, selection, choice, establishment, and the like.

The term "circuit" used in this specification refers to one or more of the following: (a) a hardware-only circuit implementation (such as an analog-only circuit implementation and/or a digital-only circuit implementation); (b) a combination of a hardware circuit and software, such as (if applicable): (i) a combination of an analog hardware circuit and/or a digital hardware circuit and software/firmware, and (ii) any part of a hardware processor and software (including a digital signal processor, software, and a memory that work together to enable an apparatus, such as a communication device or another electronic device, to perform various functions); and (c) a hardware circuit and/or a processor, such as a microprocessor or a part of a microprocessor, which requires software (such as firmware) to be used for operations, but may not have software when software is not required for operations. The definition of the circuit is applicable to all usage scenarios of the term in this application (including the claims). In another example, the term "circuit" used herein also covers an implementation of a hardware-only circuit or a processor (or a plurality of processors), or a part of a hardware circuit or a processor, or accompanying software or firmware. For example, if applicable to a particular claim element, the term "circuit" also covers a baseband integrated circuit or a processor integrated circuit, a network device, a terminal device, or a similar integrated circuit in another device.

As used in this specification, the term "terminal device" or "user equipment" (UE) refers to any terminal device that can perform wireless communication with a network device (for example, a base station) or with a terminal device. For example, the terminal device may include a mobile terminal (MT), a subscriber station (SS), a portable subscriber station (PSS), a mobile station (MS), or an access terminal (AT), and the foregoing vehicle-mounted device. The terminal device may be any type of mobile terminal, fixed terminal, or portable terminal, including but not limited to: a mobile phone, a station, a unit, a device, a multimedia computer, a multimedia tablet, an internet node, a communicator, a desktop computer, a laptop computer, a notebook computer, a netbook computer, a tablet computer, a personal communications system (PCS) device, a personal navigation device, a personal digital assistant (PDA), an audio/video player, a digital camera/video camera, a positioning device, a television receiver, a radio broadcast receiver, an e-book device, a game device, a smart meter, a meter, another device that may be used for communication, or any combination thereof. In the context of this disclosure, for ease of description, the terms "terminal device" and "user equipment" may be used interchangeably.

As used in this specification, the term "network device" or "base station" (BS) refers to a device that can provide or host a cell or a coverage area, and a terminal device may perform communication in the cell or the coverage area. The base station may represent a NodeB (NodeB or NB), an evolved NodeB (eNodeB or eNB), a next generation NodeB (gNB), an infrastructure device for vehicle-to-everything (V2X) communication, a remote radio unit (RRU), a transmission/reception point (TRP), a radio-frequency head (RH), a remote radio head (RRH), a repeater, or a low power node, such as a picocell base station or a femto base station. A coverage area of the base station, that is, a geographical area in which a service can be provided, may be referred to as a cell. In the context of this disclosure, for ease of description, the terms "network device" and "base station" may be used interchangeably, and an eNB or a gNB may be mainly used as an example of the network device. In this specification, both the "network device" and the "terminal device" may be referred to as communication devices.

As used in this specification, the term "transmission reception point", "transmission/reception point", or "transmission and reception point" may generally refer to a station that communicates with the terminal device or the user equipment. However, the transmission and reception point may also be referred to as different terms in some scenarios, such as a base station, a cell, a NodeB, an evolved NodeB (eNB), a next generation NodeB (gNB), a sector, a station, a base transceiver system (BTS), an access point (AP), a relay node (RN), a remote radio head (RRH), a radio unit (RU), an antenna, and the like. In other words, in the context of this disclosure, the transmission and reception point, the base station, or the cell may be interpreted as an inclusive concept, and may represent a coverage area or a part of functions of a base station controller (BSC) in a code division multiple access (CDMA) system, a NodeB in a WCDMA system, an eNB or a sector (site) in an LTE system, a gNB or a TRP in an NR system, or the like. Therefore, concepts of the transmission and reception point, the base station, and/or the cell may include various coverage areas, such as a giant cell, a macro cell, a micro cell, a pico cell, and a femto cell. In addition, such a concept may include a communication range of a relay node (RN), a remote radio head (RRH), or a radio unit (RU).

In the context of this disclosure, the terminal device (or the user equipment) and the network device (the base station or the transmission/reception point) may be two transmission and reception objects that have inclusive meanings, are used to reflect the technologies and concepts disclosed in this specification, and are not limited to specific terms or words. In addition, the terminal device (or the user equipment) and the network device (the base station or the transmission/reception point) may be uplink or downlink transmission/reception objects that have inclusive meanings, are used to reflect the technical content and technical concepts of this disclosure, and may be not limited to specific terms or words. As used in this specification, an uplink (UL) is a communication link on which data or information is sent from the terminal device (or the user equipment) to the network device (the base station or the transmission/reception point). In addition, a downlink (DL) is a communication link on which data or information is sent from the network device (the base station or the transmission/reception point) to the terminal device (or the user equipment). As used in this specification, the term "resource", "transmission resource", "resource block", "physical resource block", "uplink resource", or "downlink resource" may be any resource used to perform communication (such as communication between the terminal device and the network device), for example, a resource in time domain, a resource in frequency domain, a resource in space domain, a resource in code domain, or any other resource used to implement communication. In the following, both a frequency domain resource and a time domain resource are used as examples of transmission resources to describe some embodiments of this disclosure. However, it should be understood that embodiments of this disclosure are also equivalently applicable to another resource in another domain.

As mentioned above, in some communication scenarios, between the terminal device and the network device (or the another terminal device), a conventional transmission solution of a shared channel and a control channel may fail to ensure high transmission reliability and a low transmission latency of the shared channel and the control channel. Consequently, performance of communication between the terminal device and the network device (or the another terminal device) deteriorates, and user experience is further affected. Specifically, an example in which a PUSCH and a PUCCH are respectively used as a shared channel and a control channel is used. In a conventional transmission solution of the PUSCH and the PUCCH, scheduled PUSCH transmission and PUCCH transmission may overlap in time domain. This means that the terminal device needs to simultaneously perform transmission on the two channels. However, the terminal device may not have a capability of simultaneously transmitting the two channels, or simultaneous transmission of the two channels causes a severe loss of transmission performance of the two channels. In this case, the terminal device may use two conventional processing manners. In a conventional processing manner, it is considered that the PUCCH is more important than the PUSCH. Therefore, when the PUCCH and the PUSCH overlap in time domain, the PUCCH may be selected to be transmitted and transmission of the PUSCH may be abandoned. In this processing manner, performance of the PUCCH can be ensured, but a transmission latency of the PUSCH is increased sharply. In the other conventional compromise processing manner, there is an attempt to balance transmission latencies and performance of the PUCCH and the PUSCH. Therefore, uplink control information (UCI) on the PUCCH is carried on the PUSCH for transmission, and transmission of the PUCCH is abandoned. This transmission manner may be referred to as "piggybacking" the UCI on the PUSCH. However, in the conventional compromise processing manner, UCI transmission reliability cannot be ensured in a scenario of time-domain repeated transmission of the PUSCH or the PUCCH.

Time-domain repeated transmission of the PUSCH means that a same data block or transport block (transmission block, TB) carried on the PUSCH is sent for a plurality of times in a plurality of different time units, and the transport block may be sent in different time units by using different beams through a beamforming (beamforming) technology. Time-domain repeated transmission of the PUCCH may be similar to time-domain repeated transmission of the PUSCH. To implement the beamforming technology, a communication device may have an antenna array. Each array element in the antenna array may radiate energy to the outside, and an arrangement spacing between array elements is usually related to a wavelength, a carrier, and the like of an electromagnetic wave used for communication. A radiation energy pattern of a signal sent by the antenna array may be formed by adjusting a phase or an amplitude of each array element in the antenna array. The forming herein may refer to narrowing the radiation energy pattern, to increase an energy concentration degree to improve signal sending quality, or adjusting a direction of the radiation energy pattern, to improve signal receiving quality for a reception point. Generally, an objective of beamforming is to adapt to channels reaching different receiving stations, so that the different receiving stations can receive same information to perform joint processing. Additionally or alternatively, on a premise that channel measurement accuracy cannot be ensured, for example, when the terminal device has a moving speed, coherence time becomes shorter, causing channel measurement to expire. In this case, the terminal device may improve signal transmission reliability in a beam polling or sweeping manner. A beamforming manner for uplink sending may be indicated by a network device 110 to a terminal device 120. Specifically, the network device may configure spatial filtering information for the PUSCH/PUCCH. The spatial filtering information indicates at least one reference signal index value. The terminal device 120 may determine one transmit beam by using each reference signal index value. A reference signal may be a sounding reference signal SRS, or a channel state information—reference signal CSI-RS, or a secondary synchronization block (Secondary synchronization Block, SSB). The terminal device may deduce, based on the indicated reference signal index value, a transmit beam for sending an uplink signal. Alternatively, the network device may indicate at least one piece of transmission precoding matrix information (Transmission Precoding matrix information, TPMI) for the PUSCH/PUCCH, and each TPMI corresponds to one transmit beam.

In a conventional solution, when the PUSCH piggybacking the UCI is repeatedly transmitted in time domain, the UCI is carried only in one of a plurality of times of repeated transmission. For example, if the PUCCH and the repeatedly transmitted PUSCH overlap in time domain in a slot, the UCI on the PUCCH is carried only in the first time of transmission of the PUSCH, or is carried only in one time of specific (for example, a largest quantity of time-domain orthogonal frequency division multiplexing OFDM symbols) transmission, and transmission of the PUCCH is abandoned. In this way, UCI transmission reliability can be ensured to some extent by increasing a code rate of the UCI carried on the PUSCH. However, in some cases, the PUCCH may alternatively be configured to perform repeated transmissions by using different beams (for example, on different symbols) through beamforming. According to the conventional solution, when the PUCCH and the PUSCH repeatedly transmitted in time domain overlap, the UCI associated with the PUCCH is carried only in one time of transmission of the PUSCH. Therefore, only a beam that is the same as that used for one time of transmission of the PUSCH is used for UCI transmission, and a diversity gain cannot be obtained. In other words, in this one time of "piggybacking" manner, joint processing of a plurality of stations of the UCI cannot be implemented, or beam polling or sweeping cannot be supported to improve UCI transmission reliability.

In view of the foregoing problems and other potential problems in the conventional solution, especially in a multi-station joint reception scenario, when control information (for example, the UCI) needs to be carried on a repeatedly transmitted shared channel (for example, the PUSCH), to ensure transmission reliability of the control information and consider transmission reliability of data or other information on the shared channel, embodiments of this disclosure provide a technical solution for communication. In embodiments of this disclosure, when a transmission occasion of a control channel and a transmission occasion in a set of transmission occasions of the shared channel overlap in time domain, a terminal device may determine one or more transmission occasions from the set of transmission occasions of the shared channel based on one of or both a beamforming manner of the shared channel and a beamforming manner of the control channel, to transmit control information associated with the control channel. In this manner, when improving transmission reliability of the control information, the terminal device may further consider transmission reliability of the data or other information on the shared channel, to improve performance of communication between a network device and the terminal device. The following describes several embodiments of this disclosure in detail with reference to the accompanying drawings.

FIG. 1 is a schematic diagram of an example of a communication system 100 (which may also be referred to as an example of a communication environment) according to an embodiment of this disclosure. As shown in FIG. 1, the example of the communication system 100 may include network devices 110 and 115, which may communicate with a terminal device 120. In some embodiments, the network devices 110 and 115 may be used as scheduling devices for communicating with the terminal device 120. Examples of the network devices 110 and 115 may include but are not limited to a base station eNB in an LTE system, a base station gNB in a 5G NR system, an operator device, and the like. Functions of the network devices 110 and 115 used as the scheduling devices may include scheduling and configuration of an uplink resource and a downlink resource, and the like. Additionally or alternatively, in a scheduling mode, the network devices 110 and 115 may send control information such as downlink control information (DCI) to the terminal device 120 for scheduling. In some embodiments, the network devices 110 and 115 may alternatively be used as transceiver devices for communicating with the terminal device 120. Examples of the network devices 110 and 115 may include but are not limited to a transmission/reception point (TRP), a remote radio head (RRH), and the like. Functions of the network devices 110 and 115 used as the transceiver devices may include sending of a downlink signal, receiving of an uplink signal, and the like. The terminal device 120 may include various user equipment (UE), and functions of the terminal device 120 may include receiving of a downlink signal or a sidelink signal, sending of an uplink signal or a sidelink signal, and the like.

In some embodiments, to better perform communication with the terminal device 120, coordinated multipoint transmission, also referred to as collaborative multipoint transmission, may be implemented between the network devices 110 and 115. For example, both the network devices 110 and 115 may be macro base stations, both may be micro base stations, or one is a macro base station and the other is a micro base station, to implement coordinated multipoint transmission between the macro base stations, between the micro base stations, or between the macro base station and the micro base station. In coordinated multipoint transmission performed by the network devices 110 and 115 for the terminal device 120, the network devices 110 and 115 may simultaneously receive signals sent by the terminal device 120, and then one of or both the network devices 110 and 115 may perform joint processing on the signals separately received from the terminal device 120, to improve reliability of received signals, for example, improve an equivalent signal-to-noise ratio (SNR) of the received signals. To perform such joint processing, there may be a communication link 112 (for example, an optical fiber link) between the network devices 110 and 115, to transmit, between the network devices 110 and 115, the signals separately received from the terminal device 120. It should be noted that the scenario in which two network devices perform coordinated transmission described herein is merely an example, and is not intended to limit the scope of this disclosure in any manner. Embodiments of this disclosure are equivalently applicable to a scenario in which more network devices perform coordinated transmission and any derivative scenario thereof. In the following, some embodiments are described by using an example in which the network device 110 communicates with the terminal device 120. However, it is understood that all or a part of operations of the network device in embodiments of this disclosure may alternatively be performed by the network device 115.

In another embodiment, the network devices 110 and 115 may alternatively be two transmission/reception points (TRPs), remote radio heads (RRHs), or the like of another network device 117. In these embodiments, the signals separately received by the network devices 110 and 115 from the terminal device 120 may be transmitted to the network device 117, and jointly processed centrally by the network device 117, to improve reliability of received signals, for example, improve an equivalent signal-to-noise ratio (SNR) of the received signals. To implement such joint processing, there may be communication links 114 and 116 (for example, optical fiber links) between the network device 110 and the network device 117 and between the network device 115 and the network device 117 respectively, to transmit, between the network device 110 and the network device 117 and between the network device 115 and the network device 117, the signals received from the terminal device 120. Therefore, in this scenario in which the network device 117 has a plurality of TRPs, operations of the network devices 110 and 115 may also be considered as operations of the network device 117. Furthermore, it should be noted that the scenario of two TRPs described herein is merely an example, and is not intended to limit the scope of this disclosure in any manner. Embodiments of this disclosure is equivalently applicable to a single-TRP or multi-TRP scenario and any derivative scenario thereof. In the following, some embodiments are described by using an example in which the network device 110 communicates with the terminal device 120. However, it is understood that all or a part of operations of the network device in embodiments of this disclosure may alternatively be considered to be performed by the network device 117.

Generally, any data or information may be transmitted between the network device 110 and the terminal device 120 and between the network device 115 and the terminal device 120, and the data or information may be carried on various channels. For example, a shared channel 140 may be transmitted between the network device 110 and the terminal device 120, and may be for carrying data or other information (such as control information). For another example, a control channel 150 may be transmitted between the network device 110 and the terminal device 120, and may be for carrying control information. In the context of this disclosure, the data may be communication information or communication content to be transmitted between the network device and the terminal device, and the control information may be information used to assist in transmitting the communication information or the communication content. In addition, definitions and meanings of the data and the control information may be determined with reference to an existing or a future developed communication standard or protocol, for example, a 3GPP communication standard. Additionally or alternatively, the shared channel 140 and the control channel 150 may also be transmitted between the network device 115 and the terminal device 120. In some embodiments, the shared channel 140 may be a PUSCH sent by the terminal device 120 to the network device 110 or 115, and the control channel 150 may be a PUCCH sent by the terminal device 120 to the network device 110 or 115. For specific definitions and details of the PUSCH and the PUCCH, refer to related definitions in the 3GPP communication standard. It should be noted that the shared channel 140 and the control channel 150 in embodiments of this disclosure are also intended to respectively cover a channel for carrying data (or other information) and a channel for carrying control information that are defined in the future developed communication standard or protocol.

When the control channel 150 is a PUCCH, control information carried on the control channel 150 may be referred to as uplink control information (uplink control information, UCI). Generally, the UCI is control information that may be carried on an uplink channel (for example, a PUCCH or a PUSCH). In other words, the terminal device 120 generates the UCI and then sends the UCI to the network device 110. In some embodiments, the control information (for example, the UCI) carried on the control channel 150 may include a scheduling request (scheduling request, SR), a hybrid automatic repeat request acknowledgment (hybrid automatic repeat request acknowledgment, HARQ-ACK), channel state information (channel state information, CSI), and the like. The terminal device 120 may request, from the network device 110 by using the scheduling request, to allocate a physical resource for transmitting data. The terminal device 120 may use the HARQ-ACK to indicate whether downlink data sent by the network device 110 to the terminal device 120 is correctly received. If the terminal device 120 correctly receives the downlink data, the terminal device 120 may feed back an ACK to the network device 110. On the contrary, if the terminal device 120 does not correctly receive the downlink data, the terminal device 120 may feed back a NACK to the network device 110. The channel state information is channel state information determined by the terminal device 120 through downlink channel measurement, and includes information such as a rank (RANK), a precoding matrix indicator (PMI), and a channel quality indicator (CQI).

Because the PUCCH is usually for carrying important uplink control information, the PUCCH may be designed to ensure a low bit error rate. Therefore, in some embodiments, a plurality of PUCCH formats are provided to adapt to different transmission scenarios. These PUCCH formats include but are not limited to a PUCCH format 0 (also briefly referred to as a PF 0), a PUCCH format 2 (also briefly referred to as a PF 2), a PUCCH format 1/3/4 (also briefly referred to as a PF 1/3/4), and the like. The PUCCH format 0 is a short PUCCH format for carrying one or two bits. The short format means that the PUCCH may occupy one or two orthogonal frequency division multiplexing (OFDM) symbols in time domain, and carrying one to two bits may be a quantity of information bits of the HARQ-ACK. A PUCCH in this format may occupy one resource block (RB), that is, 12 subcarriers, in frequency domain. In some embodiments, HARQ-ACK information may be transmitted in a form of a sequence on the PUCCH. For example, the sequence may be a sequence with a length of 12 and a low peak to average power ratio (peak to average power ratio, PAPR). At the terminal device 120, a modulated sequence is generated after specific modulation (for example, quadrature phase shift keying QPSK modulation) is performed on a base sequence set. A cyclically shifted sequence is generated after a specific operation (for example, a cyclic shift CS) is performed on the modulated sequence. Sequences using different cyclic shift values may correspond to different HARQ-ACK information.

On a receiving side of the PUCCH format 0, the network device 110 may perform correlation detection, that is, operations on a received signal and different cyclic shifts of a base sequence, to determine HARQ-ACK information sent by the terminal device 120. When the PUCCH format 0 occupies two OFDM symbols, information carried on the two OFDM symbols may be the same, that is, a same base sequence uses a same CS value and are carried on the two OFDM symbols. An objective of doing this is that channels on the two OFDM symbols may be considered to be approximately the same, which is equivalent to improving a received signal-to-noise ratio. In some embodiments, a physical resource block (Physical Resource Block, PRB) occupied by the second OFDM symbol may be different from that occupied by the first OFDM symbol, which may be referred to as frequency hopping. In a frequency hopping manner, a frequency diversity gain may be obtained, that is, a same information bit may be sent on different frequencies, and a receiving end may obtain two identical information bits that pass through different frequency domain channels, and then perform combination processing. Alternatively, in a case of frequency hopping, a physical antenna or a beamforming manner used for sending a signal on the second OFDM symbol may be different from that used for sending a signal on the first symbol, to further obtain a space diversity gain and enable the beamforming manner to adapt to different frequency domain channels.

The PUCCH format 2 is a short PUCCH format for carrying more than two bits. APUCCH in this PUCCH format may occupy 1 to 16 resource blocks in frequency domain. After encoding and modulation are performed on HARQ-ACK information on the PUCCH, a modulation symbol may be formed and mapped to a PUCCH resource. A demodulation reference signal (DMRS) may be mapped to some specific resource elements (REs) in these PUCCH resources, and is used for PUCCH channel estimation. When the PUCCH format 2 occupies two OFDM symbols, information carried on the two OFDM symbols may also be the same, that is, information bits are separately mapped to the two symbols after being encoded and modulated in a same manner. Same as the PUCCH format 0, the PUCCH format 2 may also support frequency hopping of the second symbol and use different beamforming manners.

The PUCCH format 1/3/4 is a long PUCCH format. The long format may mean that the PUCCH occupies a large quantity of OFDM symbols in time domain, for example, 4 to 14 OFDM symbols. For example, the PUCCH format 1 may carry one or two information bits of the HARQ-ACK. The DMRS and the UCI may be alternately carried on consecutive OFDM symbols. UCI information on different OFDM symbols may be the same, but different orthogonal cover codes (OCC codes) may be used for a multi-user (MU) scenario. For example, odd-numbered symbol positions may carry a same UCI information bit, and UCI information bits on different symbols may be processed by using specific OCC codes, to form a plurality of orthogonal resources in code domain. The PUCCH format 3/4 may be used for UCI transmission in a single-carrier waveform. A specific symbol on the PUCCH may carry the DMRS, and a remaining symbol may carry the UCI. The PUCCH format 1/3/4 may also support frequency hopping transmission. Channels on a plurality of symbols in a same time of frequency hopping may be deduced. That is, a same antenna port is used for sending. This may be understood as using a same physical antenna and using same beamforming. Channels in different times of frequency hopping cannot be deduced. That is, the terminal device 120 may use different antenna ports for sending. This may be understood as using different physical antennas or using different beamforming. Control information carried in different times of frequency hopping may be the same, or may be different.

As mentioned above, the network devices 110 and 115 may use a coordinated multipoint transmission technology to improve uplink receiving quality for the terminal device 12, for example, uplink receiving quality of the shared channel 140 or the control channel 150. Specifically, the shared channel 140 (for example, the PUSCH) or the control channel 150 (for example, the PUCCH) sent by the terminal device 120 may be simultaneously received by the network devices 110 and 115 used as a plurality of stations. By performing joint processing on the received shared channel 140 or control channel 150, receiving reliability of the shared channel 140 or the control channel 150 may be improved, for example, an equivalent SNR of receiving the shared channel 140 or the control channel 150 may be improved. In some embodiments, the terminal device 120 may have a beamforming capability. For example, the terminal device 120 may send, by using different beams, signals to network devices or other terminal devices in different directions and at different positions. As shown in FIG. 1, the terminal device 120 may generate beams such as beams 122, 124, and 126 to send various signals, for example, shared channels 140 and 160 and control channels 150 and 170. In some embodiments, the beams 122 and 124 may be beams with high directivity, where the beam 122 may point to the network device 110, and the beam 124 may point to the network device 115. In contrast, the beam 126 may be a beam with a wide coverage area. For example, the beam 126 may be used to cover both the network devices 110 and 115. In each time of transmission of the shared channels 140 and 160 or the control channels 150 and 170, the terminal device 120 may selectively use one or more beams. In some embodiments, each beam of the terminal device 120 may have a beam index, and the network device 110 may use a beam index in a process of communicating with the terminal device 120, to indicate the terminal device to use a corresponding beam. It should be understood that although FIG. 1 schematically shows a specific quantity of beams and beams of specific shapes of the terminal device 120, such a show is merely an example, and is not intended to limit the scope of this disclosure in any manner. In another embodiment, the terminal device 120 may form any quantity and any shape of beams through the beamforming technology, to perform signal transmission. It should be understood that the beamforming herein may be that a directional beam is formed by adding different phases to different antenna groups in analog domain by using phase shifters, or may be that a directional beam is formed by adding different phases to different antenna elements in digital domain, or may be a combination of the foregoing two directional beams.

It should be noted that when the terminal device 120 determines a transmit beamforming manner or antenna, there are a plurality of policies that can improve signal sending quality. For example, the terminal device 120 may use different transmit beamforming manners (or beams) to match channels reaching different stations, and use the foregoing different transmit beamforming manners (or beams) on different physical resources. For another example, the terminal device 120 may alternatively jointly determine optimal beamforming on different frequency domain resources based on a plurality of channels reaching different stations, and then separately send a signal by using the optimal beamforming on the different frequency domain resources. The PUCCH format 0 is used as an example. The terminal device 120 may send UCI to the network device 110 on the first symbol of the PUCCH format 0 by using the beam 122, and send the same UCI to the network device 115 on the second symbol by using the beam 124. On a receiving side, the network device 110 may receive the UCI sent by using the beam 122, and the network device 115 may receive the UCI sent by using the beam 124, so that the network devices 110 and 115 may perform joint processing on the received signals to determine indication information in the PUCCH format 0. In addition, the PUCCH format 0 is still used as an example. A symbol 1 and a symbol 2 may carry same UCI, but may occupy different resource blocks, to generate a frequency hopping effect. In addition, beams used on the two symbols may be different. In this manner, a frequency diversity gain may also be obtained.

It should be noted that although some embodiments are described in this specification by using the PUSCH and the PUCCH as an example, these embodiments are also equivalently applicable to the PDSCH and the PDCCH that are sent by the network device 110 to the terminal device 120. In addition, as shown in FIG. 1, the terminal device 120 may further perform sidelink (sidelink) communication, that is, device-to-device (D2D) communication, with a terminal device 130. For example, a PSSCH 160 and a PSCCH 170 may be transmitted between the terminal device 120 and the terminal device 130. The PSSCH 160 may be for carrying sidelink data or other information (such as control information), and the PSCCH 170 may be for carrying sidelink control information. For definitions and details of the PSSCH 160 and the PSCCH 170, refer to a related communication standard or protocol, for example, a 3GPP standard. However, embodiments of this disclosure are also equivalently applicable to a sidelink communication channel defined in a future developed communication standard. It should be further noted that some embodiments are described below with reference to the shared channel 140 and the control channel 150 between the network device 110 or 115 and the terminal device 120 as an example. However, these embodiments are also applicable to a shared channel 160 and a control channel 170 between the terminal device 120 and one or more other terminal devices (for example, the terminal device 130).

Figure 2:
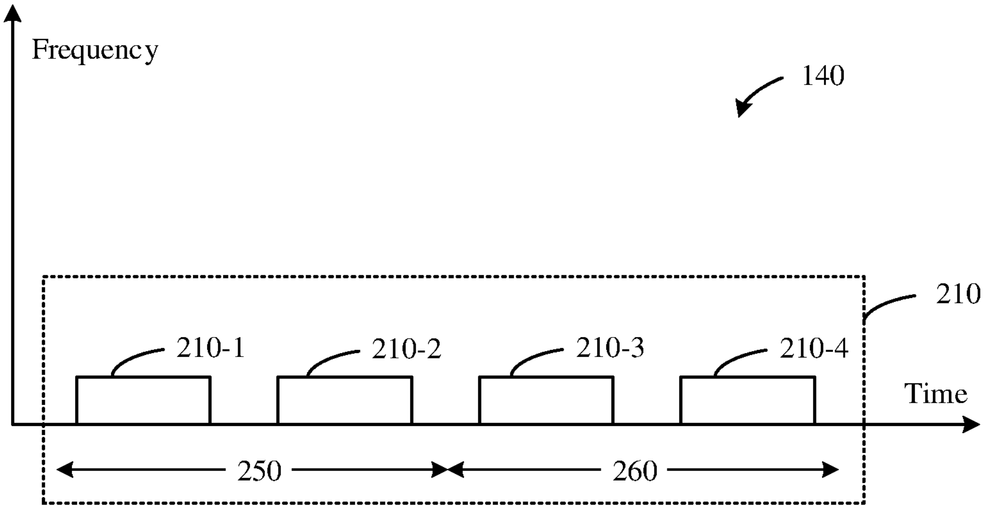
FIG. 2 is a schematic diagram of an example set of transmission occasions of a shared channel according to an embodiment of this disclosure.

In some embodiments, the shared channel 140 between the network device 110 and the terminal device 120 may support time-domain repeated transmission. A set of transmission occasions for time-domain repeated transmission of the shared channel 140 is briefly described below with reference to FIG. 2. It should be noted that although some embodiments of this disclosure are described in a scenario of time-domain repeated transmission of the shared channel 140, embodiments of this disclosure are also applicable to a scenario in which the shared channel 140 is transmitted only once in time domain. In other words, the shared channel 140 has only one transmission occasion. As used in this specification, a "transmission occasion (transmission occasion)" may usually refer to one time of transmission of various signals or channels (for example, the shared channel 140 and the control channel 150), and may correspond to a resource used for the time of transmission, for example, a time-frequency resource. In addition, another definition or technical meaning of the transmission occasion may be further determined with reference to an existing or a future developed related communication standard or protocol (for example, a 3GPP protocol). FIG. 2 is a schematic diagram of an example set 210 of transmission occasions of the shared channel 140 according to an embodiment of this disclosure. In FIG. 2, a horizontal axis may represent time, that is, a time domain resource, and a vertical axis may represent a frequency, that is, a frequency domain resource. The terminal device 120 may transmit the shared channel 140 to the network device 110 on transmission occasions 210-1 to 210-4 in the set 210 of transmission occasions, that is, transmit the shared channel 140 to the network device 110 for a plurality of times in time domain, to improve transmission reliability of the shared channel 140. This is also referred to as time-domain repeated transmission of the shared channel 140. Each of the transmission occasions 210-1 to 210-4 may represent a time-frequency resource for transmitting the shared channel 140 this time.

In the example of FIG. 2, the transmission occasions 210-1 to 210-4 in the set 210 of transmission occasions are shown as occupying same and consecutive frequency domain resources in frequency domain. However, in another embodiment, one or more transmission occasions in the set 210 of transmission occasions may alternatively occupy different frequency domain resources, or occupy inconsecutive frequency resources. In addition, in some embodiments, one or more transmission occasions in the set 210 of transmission occasions may occupy, in frequency domain, a quantity of frequency domain resources different from a quantity of frequency domain resources of another transmission occasion. In addition, in the example of FIG. 2, the transmission occasions 210-1 to 210-4 in the set 210 of transmission occasions are shown as having a same interval in time domain. However, in another embodiment, two or more transmission occasions in the set 210 of transmission occasions may alternatively have no interval in time domain, or a plurality of transmission occasions may have different intervals in time domain. Further, in the example of FIG. 2, the transmission occasions 210-1 to 210-4 in the set 210 of transmission occasions are shown as occupying a same quantity (that is, same duration) of consecutive time domain resources in time domain. However, in another embodiment, one or more transmission occasions in the set 210 of transmission occasions may alternatively occupy different quantities of time domain resources, or occupy inconsecutive time domain resources.

In some embodiments, to ensure a low transmission latency of the shared channel 140 to meet, for example, a requirement of an ultra-reliable low-latency communication (Ultra Reliable Low Latency Communications, URLLC) scenario in 5G, a time unit used for time-domain repeated transmission of the shared channel 140 may be at a sub-slot (sub-slot) level. For example, in the example of FIG. 2, there may be two transmission occasions 210-1 and 210-2 in a slot 250, and there may also be two transmission occasions 210-3 and 210-4 in a slot 260. Certainly, this disclosure is not limited thereto. In another embodiment, there may alternatively be more or fewer transmission occasions in one slot. As used in this specification, a "slot" may refer to a "time unit" defined to facilitate descriptions or coordination of communication between communication devices. Specifically, other related definitions and details of the slot may be found in an existing or a future developed communication standard or protocol (for example, a 3GPP standard). More generally, the term "slot" used in this specification may also refer to any existing defined time unit or any time unit to be defined in the future. In addition, in some embodiments, different redundancy versions (RVs) may be used as a start value for reading a circle buffer of the terminal device 120 for a same transport block transmitted in different time units (for example, the slot 250 and the slot 260). In other words, different RV values may be used as start values for a same transport block formed after modulation and encoding are performed on a same information bit string, and to-be-sent information bits are formed after the circle buffer of the terminal device 120 performs a bit mapping operation. These information bits may be mapped to different sub-slots. For example, in the example of FIG. 2, Two times of repeated transmission may be performed on the transmission occasions 210-1 and 210-2 in one slot 250. In two time units 210-1 and 210-2 for carrying a same transport block, the terminal device 120 may respectively adapt, by using different beamforming manners, to channels reaching different stations (for example, the network devices 110 and 115), or improve transmission reliability in a beam polling or sweeping manner.

Figure 3A:
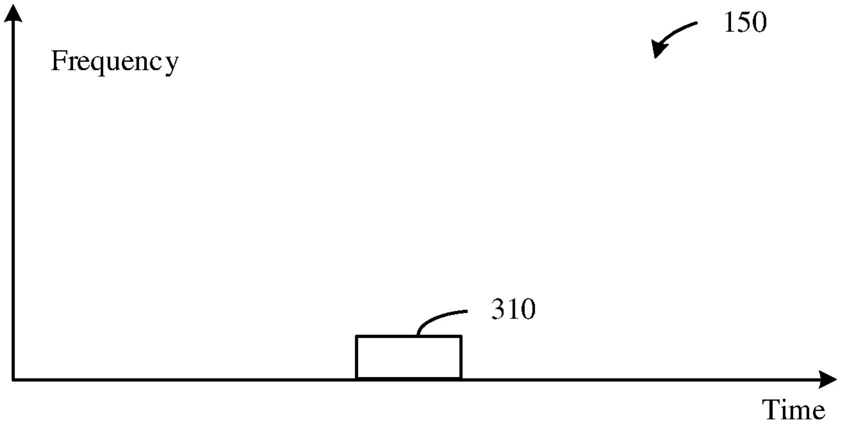
FIG. 3A is a schematic diagram of an example transmission occasion of a control channel according to an embodiment of this disclosure.

In some embodiments, time-domain repeated transmission may not be performed on the control channel 150 between the network device 110 and the terminal device 120, that is, the control channel 150 is sent only once in time domain. A transmission occasion for the control channel 150 without time-domain repeated transmission is briefly described below with reference to FIG. 3A. FIG. 3A is a schematic diagram of an example transmission occasion 310 of the control channel 150 according to an embodiment of this disclosure. In FIG. 3A, a horizontal axis may represent time, that is, a time domain resource, and a vertical axis may represent a frequency, that is, a frequency domain resource. As shown in the figure, the terminal device 120 may transmit the control channel 150 to the network device 110 on the transmission occasion 310. In the example of FIG. 3, the transmission occasion 310 is shown as occupying same and consecutive time domain resources and frequency domain resources in time domain and frequency domain. However, this disclosure is not limited thereto. In another embodiment, the transmission occasion 310 may alternatively occupy inconsecutive time domain resources and inconsecutive frequency domain resources.

Figure 3B:
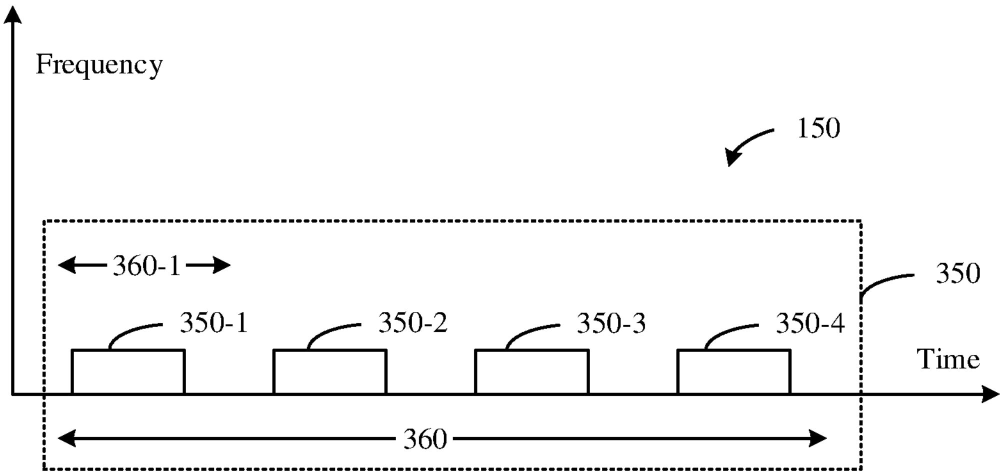
FIG. 3B is a schematic diagram of an example set of transmission occasions of a control channel according to an embodiment of this disclosure.

In another embodiment, similar to time-domain repeated transmission of the shared channel 140, the control channel 150 between the network device 110 and the terminal device 120 may also support time-domain repeated transmission. For example, the PUCCH format 0 may be repeatedly transmitted on different symbols by using different beams. For another example, the PUCCH format 1/3/4 may also support time-domain repeated transmission in one slot. In addition, other PUCCH formats may similarly perform time-domain repeated transmission. A set of transmission occasions for time-domain repeated transmission of the control channel 150 is briefly described below with reference to FIG. 3B. FIG. 3B is a schematic diagram of an example set 350 of transmission occasions of the control channel 150 according to an embodiment of this disclosure. In FIG. 3B, a horizontal axis may represent time, that is, a time domain resource, and a vertical axis may represent a frequency, that is, a frequency domain resource. The terminal device 120 may transmit the control channel 150 to the network device 110 on transmission occasions 350-1 to 350-4 in the set 350 of transmission occasions, that is, transmit the control channel 150 to the network device 110 for a plurality of times in time domain, to improve transmission reliability of the control channel 150. This is also referred to as time-domain repeated transmission of the control channel 150. Each of the transmission occasions 350-1 to 350-4 may represent a time-frequency resource for transmitting the control channel 150 this time.

In the example of FIG. 3B, the transmission occasions 350-1 to 350-4 in the set 350 of transmission occasions are shown as occupying same and consecutive frequency domain resources in frequency domain. However, in another embodiment, one or more transmission occasions in the set 350 of transmission occasions may alternatively occupy different frequency domain resources, or occupy inconsecutive frequency resources. In addition, in some embodiments, one or more transmission occasions in the set 350 of transmission occasions may occupy, in frequency domain, a quantity of frequency domain resources different from a quantity of frequency domain resources of another transmission occasion. In addition, in the example of FIG. 3B, the transmission occasions 350-1 to 350-4 in the set 350 of transmission occasions are shown as having a same interval in time domain. However, in another embodiment, two or more transmission occasions in the set 350 of transmission occasions may alternatively have no interval in time domain, or a plurality of transmission occasions may have different intervals in time domain. Further, in the example of FIG. 3B, the transmission occasions 350-1 to 350-4 in the set 350 of transmission occasions are shown as occupying a same quantity (that is, same duration) of consecutive time domain resources in time domain. However, in another embodiment, one or more transmission occasions in the set 350 of transmission occasions may alternatively occupy different quantities of time domain resources, or occupy inconsecutive time domain resources.

In some embodiments, to ensure a low transmission latency of the control channel 150, a time unit used for time-domain repeated transmission of the control channel 150 may be at a sub-slot level, that is, time-domain repeated transmission of the control channel 150 is performed in one slot. For example, in a repeated transmission manner, one slot may be divided into a plurality of sub-slots, and each time of repeated transmission may be performed at a same time domain position in each sub-slot. For example, in the example of FIG. 3B, there may be four transmission occasions 350-1 to 350-4 in a slot 360, and each transmission occasion may be at a same time domain position in one sub-slot. For example, the transmission occasion 350-1 may be in a sub-slot 360-1, and the transmission occasions 350-2 to 350-4 may be at a same position of corresponding sub-slots. In another repeated transmission manner, the network device 110 may indicate a time domain position of the first time of transmission to the terminal device 120. Each time of subsequent repeated transmission and the first time of transmission are arranged consecutively or at intervals of several symbols, and time domain lengths are the same. Although there are four transmission occasions in the slot 360 in FIG. 3B, in another embodiment, there may alternatively be more or fewer transmission occasions in one slot (for example, the slot 360). It should be further noted that, in some embodiments, the time-domain repeated transmission manner of the control channel 150 described herein with reference to FIG. 3B may also be applied to time-domain repeated transmission of the shared channel 140.

It should be understood that FIG. 1, FIG. 2, FIG. 3A, and FIG. 3B merely schematically show devices, units, elements, or information related to embodiments of this disclosure in the example communication system 100. In practice, the example communication system 100 may further include other devices, units, elements, or information for other functions. In addition, a specific quantity of terminal devices, a specific quantity of network devices, a specific quantity of channels, a specific quantity of beams, and a specific quantity of transmission occasions shown in FIG. 1, FIG. 2, FIG. 3A, and FIG. 3B are merely for purposes of description, and are not intended to limit the scope of this disclosure in any manner. The example communication environment 100 may include any suitable quantity of terminal devices suitable, any suitable quantity of network devices, any suitable quantity of other communication devices, any suitable quantity of channels, any suitable quantity of beams, and the like for implementing embodiments of this disclosure. The shared channel 140 and the control channel 150 may alternatively have any suitable quantity of transmission occasions. In addition, it is learned that various wireless communication and wired communication (if needed) may exist between all communication devices. Therefore, embodiments of this disclosure are not limited to the specific devices, units, elements, or information shown in FIG. 1, FIG. 2, FIG. 3A, and FIG. 3B, but are generally applicable to any technical environment in which signal transmission exists between the terminal device and the network device.

For example, embodiments of this disclosure are applicable to a URLLC transmission scenario in 5G. This scenario is characterized by low latencies of a user plane and a control plane. For example, a latency of the user plane may be as low as 1 ms, and transmission reliability is high. For example, a block error rate (block error rate, BLER) may reach $10^{-5}$ for a specific SNR. Embodiments of this disclosure are applicable to both a homogeneous network scenario and a heterogeneous network scenario, and are applicable to both a frequency division duplex (FDD) system and a time division duplex (TDD) system. Embodiments of this disclosure are applicable to a low-frequency scenario (sub-6G), and are also applicable to a high-frequency scenario (above 6G). Embodiments of this disclosure are applicable to a 4G, 5G, or future mobile communication system. More generally, communication in the example communication environment 100 may conform to any appropriate standard, including but not limited to a global system for mobile communications (GSM), extended coverage in global system for mobile communications for internet of things (EC-GSM-IoT), long term evolution (LTE), LTE-advanced, LTE-advanced (LTE-A), wideband code division multiple access (WCDMA), code division multiple access (CDMA), GSM EDGE radio access network (GERAN), and the like. Further, communication in the example communication environment 100 may be performed according to any communication protocol currently known or to be developed in the future. Examples of the communication protocol include but are not limited to 1st generation (1G), 2nd generation (2G), 2.5G, 2.75G, 3rd generation (3G), 4th generation (4G), 4.5G, and 5th generation (5G) communication protocols. The following describes a communication method in embodiments of this disclosure with reference to FIG. 4.

Figure 4:
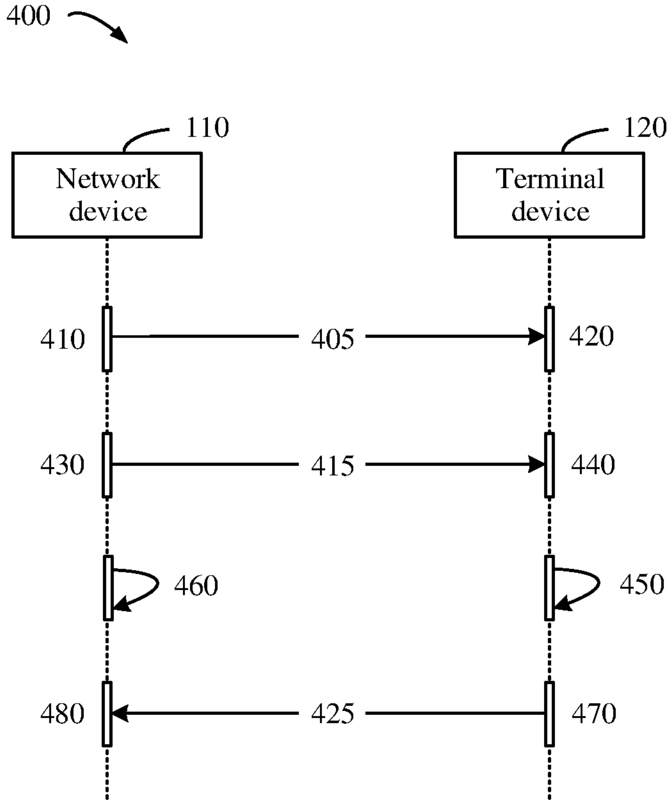
FIG. 4 shows an example communication process between a network device and a terminal device according to an embodiment of this disclosure.

FIG. 4 shows an example communication process 400 between a network device 110 and a terminal device 120 according to an embodiment of this disclosure. For purposes of description, the example communication process 400 is described with reference to the various elements shown in FIG. 1, FIG. 2, FIG. 3A, and FIG. 3B. However, it should be understood that the example communication process 400 may also be performed between any two communication devices in any other communication scenario.

As shown in FIG. 4, to schedule the terminal device 120 to transmit, to the network device 110, a shared channel 140 carrying data or other information (such as control information), the network device 110 may send (410) scheduling information 405 of the shared channel 140 to the terminal device 120. In other words, the network device 110 may use the scheduling information 405 to schedule the terminal device 120 to transmit the data or other information (such as the control information) to the network device 110 on the shared channel 140. In this specification, for ease of description, the scheduling information 405 of the shared channel 140 may also be referred to as first scheduling information 405. Correspondingly, on the other side of the example communication process 400, the terminal device 120 may receive (420) the first scheduling information 405 of the shared channel 140 from the network device 110.

In some embodiments, the first scheduling information 405 may be sent by using higher layer signaling. For example, the higher layer signaling may include a radio resource control (RRC) message, a media access control (MAC) control element (CE) message, or other higher layer signaling. In another embodiment, the first scheduling information 405 may alternatively be sent by using downlink control information (DCI). For example, the network device 110 may use a PDCCH to carry DCI information sent to the terminal device 120. In another embodiment, the first scheduling information 405 may alternatively be sent by using a combination of two or more of an RRC message, a MAC CE message, and DCI information. More generally, the first scheduling information 405 may be sent in any message or information form that conforms to an existing or a future developed communication standard or protocol (for example, a 3GPP protocol standard).

To enable the terminal device 120 to perform transmission of the shared channel 140, the first scheduling information 405 may indicate a resource for transmitting the shared channel 140. In some embodiments, for example, in a scenario of repeated transmission of the shared channel 140, the network device 110 may indicate, by using the first scheduling information 405, the terminal device 120 to perform repeated transmission of the shared channel 140. As described above, in the case of repeated transmission of the shared channel 140, the shared channel 140 has a set of transmission occasions, and each transmission occasion in the set of transmission occasions may be associated with a transmission resource set (for example, a time-frequency resource set). For example, in the example of FIG. 2, the set 210 of transmission occasions may include the transmission occasions 210-1 to 210-4. Therefore, the first scheduling information 405 sent by the network device 110 may indicate, to the terminal device 120, the set 210 of transmission occasions of the shared channel 140, that is, the transmission occasions 210-1 to 210-4, to indicate time-domain repeated transmission of the shared channel 140. Therefore, after receiving the first scheduling information 405, the terminal device 120 may determine that the shared channel 140 is to be transmitted on these transmission occasions 210-1 to 210-4, that is, repeatedly transmitted in time domain. In this specification, for ease of description, the set 210 of transmission occasions of the shared channel 140 may also be referred to as a first set 210.

In some embodiments, a PUSCH that is repeatedly transmitted for a plurality of times may be scheduled by using one piece of DCI signaling. For example, the DCI signaling indicates a time domain position occupied by a transmission occasion of the PUSCH repeatedly transmitted for the first time, and indicates a quantity of repeated transmission times, that is, a quantity of transmission occasions. The terminal device deduces, according to a specified rule, a time domain position occupied by remaining repeated transmission other than the first time of repeated transmission. Further, the DCI signaling further indicates an RV value used for the PUSCH repeatedly transmitted for the first time, and the terminal device deduces, according to the specified rule, an RV value used for the remaining repeated transmission other than the first time of repeated transmission.

In another embodiment, a PUSCH that is repeatedly transmitted for a plurality of times may be scheduled by using a plurality of pieces of DCI signaling. For example, each piece of DCI signaling indicates a time domain position occupied by a transmission occasion of the PUSCH that is repeatedly transmitted once, and the plurality of pieces of DCI signaling jointly notify the terminal device to schedule a same data block TB.

In addition, if the terminal device 120 has a beamforming capability, the terminal device 120 may further use different beams when sending the shared channel 140 on different transmission occasions, and may also use different beams when sending the shared channel 140 on one transmission occasion. Therefore, the network device 110 may further indicate a beamforming manner of the shared channel 140 to the terminal device 120 in the first scheduling information 405. As used in this specification, the "beamforming manner" may be a beam configuration used when a communication device sends or receives a signal, or may be a beam or beams for sending or receiving a signal. More generally, the "beamforming manner" may include any configuration associated with a beam and may be used interchangeably with a "beam configuration" or a "beamforming configuration". In this specification, for ease of description, the beamforming manner of the shared channel 140 may also be referred to as a first beamforming manner.

In an example of the first beamforming manner of the shared channel 140, the transmission occasions 210-1 to 210-4 of the shared channel 140 may be associated with different beams. For example, transmission occasions 210-1 and 210-3 may be associated with a beam 122, and transmission occasions 210-2 and 210-4 may be associated with a beam 124. It should be understood that a specific association relationship between a transmission occasion and a beam herein is merely an example, and is not intended to limit the scope of this disclosure in any manner. Embodiments of this disclosure are equivalently applicable to any association relationship between a transmission occasion of the shared channel 140 and an available beam of the terminal device 120. In some embodiments, one transmission occasion of the shared channel 140 may be associated with a plurality of beams, and another transmission occasion may be associated with only one beam. In this case, the two transmission occasions may be considered to be associated with different beams. For example, assuming that the transmission occasion 210-1 is associated with both the beams 122 and 124, and the transmission occasion 210-2 is associated only with the beam 122, the transmission occasions 210-1 and 201-2 are considered to be associated with different beams. Furthermore, in some embodiments, one transmission occasion of the shared channel 140 may be associated with a plurality of beams, and another transmission occasion may be associated with a plurality of beams, but beams of the two transmission occasions are not exactly the same. In this case, the two transmission occasions may be considered to be associated with different beams. For example, assuming that the transmission occasion 210-1 is associated with both the beams 122 and 124, and the transmission occasion 210-2 is associated with beams 122 and 126, the transmission occasions 210-1 and 201-2 are considered to be associated with different beams.

In another example of the beamforming manner of the shared channel 140, the transmission occasions 210-1 to 210-4 of the shared channel 140 may be associated with a same beam. It should be noted that, as used in this specification, "the same beam" may refer to a same beam, or may refer to a plurality of same beams. For example, assuming that both the transmission occasions 210-1 and 210-2 are associated with the beam 122, the transmission occasions 210-1 and 210-2 are considered to be associated with the same beam. For another example, assuming that the transmission occasions 210-1 and 210-2 each are associated with both the beams 122 and 124, the transmission occasions 210-1 and 210-2 are also considered to be associated with the same beam. In this case, different beams may correspond to different transport layers on a same time-frequency resource.

In some embodiments, when the PUSCH that is repeatedly transmitted for the plurality of times is scheduled by using one piece of DCI signaling, the DCI signaling may indicate a plurality of transmit beams, each transmit beam corresponds to one or more transmission occasions, and different transmit beams correspond to different transmission occasions. Specifically, the DCI signaling may include a spatial filtering information indication field, and the field may indicate a plurality of reference signal index values. The terminal device may deduce one piece of transmit beam information based on each reference signal index value. Optionally, the DCI signaling may include a transmitted precoding matrix indicator (Transmission Precoding matrix information, TPMI) field. The field may indicate a plurality of TPMIs, and each TPMI may be understood as one piece of transmit beam information. The TPMI indicates phase information used by a transmitting end to send signals through a plurality of antennas, and is usually represented in a form of a matrix. A row of the matrix corresponds to each transmit antenna, a column of the matrix corresponds to a different transport layer, and each matrix element is a phase of a corresponding transmit antenna when the corresponding transmit antenna performs sending at a corresponding transport layer.

In some other embodiments, when the PUSCH that is repeatedly transmitted for the plurality of times is scheduled by using a plurality of pieces of DCI signaling, each piece of DCI signaling may indicate one transmit beam, and the transmit beam corresponds to one transmission occasion. Specifically, the DCI signaling may include a spatial filtering information indication field, and the field may indicate a reference signal index value. The terminal device may deduce one piece of transmit beam information based on the reference signal index value.

In addition to the first scheduling information 405, to schedule the terminal device 120 to transmit, to the network device 110, a control channel 150 carrying control information 425, the network device 110 may send (430) scheduling information 415 of the control channel 150 to the terminal device 120. In other words, the network device 110 may use the scheduling information 415 to schedule the terminal device 120 to transmit the control information 425 to the network device 110 on the control channel 150. In this specification, for ease of description, the scheduling information 415 of the control channel 150 may also be referred to as second scheduling information 415. Correspondingly, on the other side of the example communication process 400, the terminal device 120 may receive (440) the second scheduling information 415 of the control channel 150 from the network device 110. In some embodiments, the second scheduling information 415 may be sent by using higher layer signaling. For example, the higher layer signaling may include an RRC message, a MAC CE message, or other higher layer signaling. In another embodiment, the second scheduling information 415 may alternatively be sent by using DCI information. In another embodiment, the second scheduling information 415 may alternatively be sent by using a combination of two or more of an RRC message, a MAC CE message, and DCI information. More generally, the second scheduling information 415 may be sent in any message or information form that conforms to the existing or the future developed communication standard or protocol (for example, the 3GPP protocol standard). To enable the terminal device 120 to perform transmission of the control channel 150, the second scheduling information 415 may indicate a resource for transmitting the control channel 150. In some embodiments, the control channel 150 may be configured to be transmitted only once in time domain. For example, in the example of FIG. 3A, the control channel 150 may have one transmission occasion 310, and the transmission occasion 310 may be associated with a transmission resource set (for example, a time-frequency resource set). Therefore, the second scheduling information 415 sent by the network device 110 may indicate the transmission occasion 310 of the control channel 150 to the terminal device 120. After receiving the second scheduling information 415, the terminal device 120 may determine that the control channel 150 is to be transmitted to the network device 110 on the transmission occasion 310.

In some embodiments, for example, in a scenario of repeated transmission of the control channel 150, the network device 110 may indicate, by using the second scheduling information 415, the terminal device 120 to perform repeated transmission of the control channel 150. As described above, in the case of repeated transmission of the control channel 150, the control channel 150 has a set of transmission occasions, and each transmission occasion in the set of transmission occasions may be associated with a transmission resource set (for example, a time-frequency resource set). For example, in the example of FIG. 3B, the set 350 of transmission occasions may include the transmission occasions 350-1 to 350-4. Therefore, the second scheduling information 415 sent by the network device 110 may indicate, to the terminal device 120, the set 350 of transmission occasions of the control channel 150, that is, the transmission occasions 350-1 to 350-4, to indicate time-domain repeated transmission of the control channel 150. Therefore, after receiving the second scheduling information 415, the terminal device 120 may determine that the control channel 150 is to be transmitted on these transmission occasions 350-1 to 350-4, that is, repeatedly transmitted in time domain. In this specification, for ease of description, the set 350 of transmission occasions of the control channel 150 may also be referred to as a second set 350. It should be noted that this embodiment of this disclosure is equivalently applicable to two cases in which the control channel 150 has one transmission occasion 310 and the set 350 of transmission occasions. In the following, some embodiments are described by using one transmission occasion 310 of the control channel 150 as an example. However, it should be understood that in these embodiments, the transmission occasion 310 may also be equivalently replaced with any transmission occasion in the set 350 of transmission occasions.

In some embodiments, the network device 110 may configure a quantity of transmission occasions for time-domain repeated transmission of a PUCCH. Specifically, the quantity may be indicated by configuring a quantity of OFDM symbols occupied by the PUCCH, or may be indicated by configuring a frequency hopping mode of the PUCCH to be enabled, or may be directly configured.

In addition, if the terminal device 120 has the beamforming capability, the terminal device 120 may use different beams when sending the control channel 150 on different transmission occasions, and may also use different beams when transmitting the control channel 150 on one transmission occasion. Therefore, the network device 110 may further indicate a beamforming manner of the control channel 150 to the terminal device 120 in the second scheduling information 415. It should be noted that, in some embodiments, the second scheduling information 415 may indicate one of the transmission occasion and the beamforming manner of the control channel 150. In some other embodiments, the second scheduling information 415 may alternatively indicate both the transmission occasion and the beamforming manner of the control channel 150. In this specification, for ease of description, the beamforming manner of the control channel 150 may also be referred to as a second beamforming manner. In an example of the second beamforming manner of the control channel 150, when the control channel 150 has only one transmission occasion 310, the second beamforming manner may indicate a beam associated with the transmission occasion 310. For example, the second beamforming manner may indicate that the transmission occasion 310 is associated with one of beams 122, 124, 126, and the like. For another example, the second beamforming manner may alternatively indicate that the transmission occasion 310 is associated with two or more of beams 122, 124, 126, and the like. In other words, the terminal device 120 may simultaneously use a plurality of beams on the transmission occasion 310 to transmit the control channel 150.

In another example of the second beamforming manner of the control channel 150, when the control channel 150 has the set 350 of transmission occasions, the transmission occasions 350-1 to 350-4 of the control channel 150 may be associated with different beams. For example, transmission occasions 350-1 and 350-3 may be associated with the beam 122, and transmission occasions 350-2 and 350-4 may be associated with the beam 124. It should be understood that a specific association relationship between a transmission occasion and a beam herein is merely an example, and is not intended to limit the scope of this disclosure in any manner. Embodiments of this disclosure are equivalently applicable to any association relationship between a transmission occasion of the control channel 150 and an available beam of the terminal device 120. In some embodiments, one transmission occasion of the control channel 150 may be associated with a plurality of beams, and another transmission occasion may be associated with only one beam. In this case, the two transmission occasions may be considered to be associated with different beams. For example, assuming that the transmission occasion 350-1 is associated with both the beams 122 and 124, and the transmission occasion 350-2 is associated only with the beam 122, the transmission occasions 350-1 and 350-2 are considered to be associated with different beams. Furthermore, in some embodiments, one transmission occasion of the control channel 150 may be associated with a plurality of beams, and another transmission occasion may be associated with a plurality of beams, but beams of the two transmission occasions are not exactly the same. In this case, the two transmission occasions may be considered to be associated with different beams. For example, assuming that the transmission occasion 350-1 is associated with both the beams 122 and 124, and the transmission occasion 350-2 is associated with beams 122 and 126, the transmission occasions 350-1 and 350-2 are considered to be associated with different beams.

In still another example of the second beamforming manner of the control channel 150, when the control channel 150 has the set 350 of transmission occasions, the transmission occasions 350-1 to 350-4 of the control channel 150 may be associated with a same beam. It should be noted that, as noted above, "the same beam" may refer to a same beam, or may refer to a plurality of same beams. For example, assuming that both the transmission occasions 350-1 and 350-2 are associated with the beam 122, the transmission occasions 350-1 and 350-2 are considered to be associated with the same beam. For another example, assuming that the transmission occasions 350-1 and 350-2 each are associated with both the beams 122 and 124, the transmission occasions 350-1 and 350-2 are also considered to be associated with the same beam. In some embodiments, the second scheduling information may indicate only a physical resource of the control channel 150, and does not indicate the beamforming manner of the control channel 150.

In some cases, the terminal device 120 may not have a capability of simultaneously transmitting the shared channel 140 and the control channel 150, or simultaneous transmission of the shared channel 140 and the control channel 150 may reduce transmission performance of the two channels, affecting performance of communication between the network device 110 and the terminal device 120. Therefore, after receiving the first scheduling information 405 and the second scheduling information 415 from the network device 110, the terminal device 120 may determine whether time domain resources of the transmission occasion 310 of the control channel 150 and the transmission occasions 210-1 to 210-4 in the first set 210 overlap, in other words, whether the transmission occasion 310 and the transmission occasions 210-1 to 210-4 overlap in time domain. For example, when the shared channel 140 is a PUSCH and the control channel 150 is a PUCCH, the terminal device 120 may determine whether at least one OFDM symbol overlaps between a transmission occasion of the PUSCH and a transmission occasion of the PUCCH. There may be a plurality of reasons why the transmission occasion 310 of the control channel 150 scheduled by the network device 110 and the first set 210 of transmission occasions of the shared channel 140 overlap in time domain. For example, one of the shared channel 140 and the control channel 150 may be scheduled for periodic transmission, and the other may be aperiodically (or temporarily) scheduled. For another example, the control channel 150 and the shared channel 140 may be scheduled at two time points with a long interval. As a result, the scheduled transmission occasion 310 and the first set 210 overlap in time domain. For still another example, one of or both the transmission occasion 310 of the control channel 150 and the first set 210 of transmission occasions of the shared channel 140 may be temporarily modified, resulting in overlapping. If the transmission occasion 310 and the first set 210 overlap in time domain, it means that the terminal device 120 needs to simultaneously perform transmission of the shared channel 140 and transmission of the control channel 150 at a specific time point. It should be noted that the "overlapping" herein may be that the transmission occasion 310 and one of the transmission occasions 210-1 to 210-4 overlap or the transmission occasion 310 and a plurality of transmission occasions in the transmission occasions 210-1 to 210-4 overlap. In addition, as used in this specification, that time domain resources of two transmission occasions "overlap" or two transmission occasions "overlap" in time domain means that the time domain resources of the two transmission occasions at least partially overlap, and it is not required or excluded that the time domain resources of the two transmission occasions are exactly the same.

If the terminal device 120 determines that the transmission occasion 310 and the transmission occasions 210-1 to 210-4 overlap in time domain, the terminal device 120 may choose to abandon transmission of the control channel 150, but select one or more transmission occasions from the transmission occasions 210-1 to 210-4 of the shared channel 140 to send the control information 425 to be sent on the control channel 150, so that simultaneous transmission of the shared channel 140 and the control channel 150 can be avoided. In some embodiments, the terminal device 120 may determine (450) one or more transmission occasions from the first set 210 based on the first beamforming manner of the shared channel 140, to transmit the control information 425. These embodiments are described in detail below with reference to FIG. 5 to FIG. 10. In some other embodiments, the terminal device 120 may alternatively determine (450) one or more transmission occasions from the first set 210 based on the second beamforming manner of the control channel 150, to transmit the control information 425. These embodiments are described in detail below with reference to FIG. 11 and FIG. 12. In another embodiment, the terminal device 120 may alternatively determine (450) one or more transmission occasions from the first set 210 based on both the first beamforming manner of the shared channel 140 and the second beamforming manner of the control channel 150, to transmit the control information 425. These embodiments are described in detail below with reference to FIG. 13. It should be noted that in this embodiment of this disclosure, it is not required that the control information 425 of the control channel 150 is carried only on a transmission occasion, of the shared channel 140, that overlaps with the transmission occasion 310 of the control channel 150. For example, if the transmission occasion 310 of the control channel 150 and only one transmission occasion of the shared channel 140 overlap, the control information 425 of the control channel 150 may alternatively be carried on a plurality of transmission occasions of the shared channel 140 or another different transmission occasion.

It should be understood that in this disclosure, the terminal device 120 determines time domain resource overlapping in a plurality of specific manners. In an implementation or an alternative solution, the terminal device 120 may calculate a parameter configured for the terminal device 120, to determine whether a specific condition is met. In addition, the step in which the terminal device 120 determines that the transmission occasion of the control channel 150 and the transmission occasion of the shared channel 140 overlap in time domain may be optional. In a specific implementation process, if content indicated by the first scheduling information 405 or content indicated by the second scheduling information 415 meets a condition, or objectively, time domain resources of the transmission occasion of the control channel 150 and one or more shared channel transmission occasions in the set 210 at least partially overlap, or the terminal device 120 is configured to directly determine at least one shared channel transmission occasion based on a part or all of the first scheduling information 405, the terminal device 120 may directly determine the at least one shared channel transmission occasion based on the part or all of the first scheduling information 405, and send related control information 425 to the network device 110. The foregoing condition may be that some configuration values, in the first scheduling information 405 and the second scheduling information 415, associated with the transmission occasion of the shared channel 140 and the transmission occasion of the control channel 150 are the same, or a parameter such as transmission time of the shared channel 140 and transmission time of the control channel 150 meets another preset condition. In an alternative embodiment, the terminal device 120 determines the at least one shared channel transmission occasion from the set 210 based on at least one of the first beamforming manner and the second beamforming manner, where the time domain resources of the transmission occasion of the control channel 150 and the one or more shared channel transmission occasions in the set 210 at least partially overlap.

Similar to the terminal device 120, the network device 110 may also determine whether the time domain resources of the transmission occasion 310 of the control channel 150 and the transmission occasions 210-1 to 210-4 in the first set 210 overlap, in other words, whether the transmission occasion 310 and the transmission occasions 210-1 to 210-4 overlap in time domain. If time domain overlapping exists, the network device 110 may determine that the terminal device 120 is not to transmit the control channel 150, but is to use one or more transmission occasions in the first set 210 to send the control information 425 associated with the control channel 150. Specifically, if the network device 110 determines that the transmission occasion 310 and the one or more shared channel transmission occasions in the first set 210 overlap in time domain, the network device 110 may also determine (460) one or more transmission occasions from the first set 210 based on the first beamforming manner of the shared channel 140, to receive the control information 425 on the determined transmission occasions. As described above, the beamforming manner may be the beam configuration used when the communication device sends or receives the signal. Herein, the one or more transmission occasions may be determined based on configuration information or a related parameter of beamforming. In other words, the terminal device 120 determines at least one shared channel transmission time domain resource, and the at least one shared channel transmission time domain resource is associated with the foregoing beamforming configuration parameter. In some other embodiments, the network device 110 may alternatively determine (460) one or more transmission occasions from the first set 210 based on the second beamforming manner of the control channel 150, to receive the control information 425 on the determined transmission occasions. In another embodiment, the network device 110 may alternatively determine (460) one or more transmission occasions from the first set 210 based on both the first beamforming manner of the shared channel 140 and the second beamforming manner of the control channel 150, to receive the control information 425 on the determined transmission occasions. It should be understood that the network device 110 and the terminal device 120 may select one or more identical transmission occasions from the first set 210 according to a same predetermined rule, to ensure that the network device 110 can receive the control information 425 from the terminal device 120 on the correct one or more transmission occasions. It should be further noted that the first set 210 of transmission occasions of the shared channel 140 usually includes a plurality of transmission occasions. However, in this embodiment of this disclosure, a case in which the first set 210 of transmission occasions includes only one transmission occasion is not excluded. In this case, it may be considered that the network device 110 and the terminal device 120 select the transmission occasion from the first set 210 by default based on one of or both the first beamforming manner and the second beamforming manner.

After determining, from the first set 210, the transmission occasions of the shared channel 140 that are to be for transmitting the control information 425, the terminal device 120 may send (470) the control information 425 associated with the control channel 150 to the network device 110 on the determined transmission occasions, and no longer perform transmission of the control channel 150. For example, assuming that the terminal device 120 determines the transmission occasions 210-1 to 210-4 from the first set 210 based on one of or both the first beamforming manner and the second beamforming manner, the terminal device 120 may send (470) the control information 425 to the network device 110 on each of the transmission occasions 210-1 to 210-4. For another example, assuming that the terminal device 120 determines the transmission occasions 210-1 and 210-2 from the first set 210 based on one of or both the first beamforming manner and the second beamforming manner, the terminal device 120 may send (470) the control information 425 to the network device 110 on each of the transmission occasions 210-1 and 210-2. For still another example, assuming that the terminal device 120 determines the transmission occasion 210-1 from the first set 210 based on one of or both the first beamforming manner and the second beamforming manner, the terminal device 120 may send (470) the control information 425 to the network device 110 on the transmission occasion 210-1.

It should be noted that in this embodiment of this disclosure, that the terminal device 120 transmits the control information 425 on the one or more transmission occasions of the shared channel 140 means that the terminal device 120 transmits the control information 425 through the shared channel 140. In other words, the control information 425 is transmitted through the shared channel 140 instead of the control channel 150. More specifically, the terminal device 120 may determine a sending manner of the control information 425 based on a data sending manner on the transmission occasion of the shared channel 140. Therefore, in any one of the foregoing cases, the terminal device 120 no longer transmits the control channel 150, but transmits the control information 425 together with data or other information that is originally to be transmitted on a corresponding transmission occasion of the shared channel 140, to avoid simultaneous transmission of the shared channel 140 and the control channel 150. It is understood that the specific transmission occasion determined by the terminal device 120 from the first set 210 described above is merely an example, and is not intended to limit the scope of this disclosure in any manner. In another embodiment, the terminal device 120 may select any quantity of transmission occasions from the first set 210 that has any quantity of transmission occasions, to transmit the control information 425.

On the other side of the example communication process 400, after determining, from the first set 210, the transmission occasions to be for receiving the control information 425, the network device 110 may receive (480) the control information 425 associated with the control channel 150 from the terminal device 120 on the determined transmission occasions, and no longer perform receiving of the control channel 150. For example, assuming that the network device 110 determines the transmission occasions 210-1 to 210-4 from the first set 210 based on one of or both the first beamforming manner and the second beamforming manner, the network device 110 may receive (480) the control information 425 from the terminal device 120 on each of the transmission occasions 210-1 to 210-4. For another example, assuming that the network device 110 determines the transmission occasions 210-1 and 210-2 from the first set 210 based on one of or both the first beamforming manner and the second beamforming manner, the network device 110 may receive (480) the control information 425 from the terminal device 120 on each of the transmission occasions 210-1 and 210-2. For still another example, assuming that the network device 110 determines the transmission occasion 210-1 from the first set 210 based on one of or both the first beamforming manner and the second beamforming manner, the network device 110 may receive (480) the control information 425 from the terminal device 120 on the transmission occasion 210-1.

In any case, the network device 110 no longer receives the control channel 150, but receives, on the determined transmission occasions, the control information 425 together with the data or other information that is originally to be transmitted on the corresponding transmission occasion. It is understood that the specific transmission occasion determined by the network device 110 from the first set 210 described above is merely an example, and is not intended to limit the scope of this disclosure in any manner. In another embodiment, the network device 110 may select any quantity of transmission occasions from the first set 210 that has any quantity of transmission occasions, to receive the control information 425.

In some embodiments, if the terminal device 120 determines, from the first set 210, a plurality of transmission occasions for transmitting the control information 425, the terminal device 120 may send, on each of one or more of the plurality of shared channel transmission occasions, a plurality of modulation symbols corresponding to the control information 425. For example, in the example of FIG. 2, assuming that the terminal device 120 determines that the transmission occasions 210-1 to 210-3 are for transmitting the control information 425, the terminal device 120 may transmit, on each of the transmission occasions 210-1 to 210-3, all modulation symbols generated after the control information 425 is modulated. More specifically, if the shared channel 140 is a PUSCH and the control channel 150 is a PUCCH, the terminal device 120 may generate one group of encoded UCI bits, and separately map these bits to a plurality of times of PUSCH transmission. The bits mapped to each time of PUSCH transmission are the same. In other words, the UCI bits are repeatedly transmitted in the plurality of times of PUSCH transmission. In this manner, UCI transmission reliability can be improved, but UCI resource overheads are increased to some extent, reducing transmission reliability of data or other information on the PUSCH. Certainly, the terminal device 120 may alternatively transmit all modulation symbols on a part of transmission occasions, and separately transmit a part of modulation symbols on the other part of the transmission occasions. These parts of modulation symbols may be combined to obtain the control information 425. For example, the terminal device 120 may transmit all the modulation symbols on the transmission occasion 210-1, and separately transmit half of all the modulation symbols on the transmission occasions 210-2 and 210-3.

Similarly, if the network device 110 determines, from the first set 210, a plurality of transmission occasions for receiving the control information 425, the network device 110 may receive, on each of one or more of the plurality of shared channel transmission occasions, a plurality of modulation symbols corresponding to the control information 425. For example, in the example of FIG. 2, assuming that the network device 110 determines that the transmission occasions 210-1 to 210-3 are for receiving the control information 425, the network device 110 may receive, on each of the transmission occasions 210-1 to 210-3, all modulation symbols generated after the control information 425 is modulated. Certainly, the network device 110 may alternatively receive all modulation symbols on a part of transmission occasions, separately receive a part of modulation symbols on the other part of the transmission occasions, and then combine these parts of modulation symbols to obtain the control information 425. For example, the network device 110 may receive all the modulation symbols on the transmission occasion 210-1, and separately receive half of all the modulation symbols on the transmission occasions 210-2 and 210-3.

In another embodiment, if the terminal device 120 determines, from the first set 210, a plurality of transmission occasions for transmitting the control information 425, the terminal device 120 may send, on each of the plurality of shared channel transmission occasions, a part of a plurality of modulation symbols corresponding to the control information 425. For example, in the example of FIG. 2, assuming that the terminal device 120 determines that the transmission occasions 210-1 to 210-3 are for transmitting the control information 425, the terminal device 120 may separately transmit, on the transmission occasions 210-1 to 210-3, one third of all modulation symbols generated after the control information 425 is modulated, and these parts of modulation symbols may be combined to obtain the control information 425. More specifically, if the shared channel 140 is a PUSCH and the control channel 150 is a PUCCH, the terminal device 120 may divide encoded UCI bits into N parts, all parts of bits are sequentially carried in N times of PUSCH transmission, and only a part of UCI bits are carried in each time of PUSCH transmission. In this manner, UCI transmission reliability is slightly reduced, but transmission reliability of data or other information on the PUSCH is improved.

In some embodiments, the terminal device 120 may determine, based on a corresponding quantity of time-frequency resources included on each of a plurality of transmission occasions of the shared channel 140, a quantity of modulation symbols sent on each of the plurality of transmission occasions. For example, if quantities of time-frequency resources included in the transmission occasions 210-1 to 210-3 for transmitting the control information 425 are 50, 50, and 100 respectively, and all modulation symbols of the control information 425 are 40, the terminal device 120 may transmit 10 modulation symbols, 10 modulation symbols, and 20 modulation symbols on the transmission occasions 210-1 to 210-3 respectively. More specifically, if the shared channel 140 is a PUSCH and the control channel 150 is a PUCCH, a quantity of each part of UCI bits carried on the PUSCH for a plurality of times may be determined based on a quantity of time-frequency resources corresponding to each time of PUSCH repeated transmission. For example, when UCI is carried in two times of PUSCH transmission, and quantities of time-frequency resources in the two times of PUSCH transmission are the same, each part of UCI bits may have a same quantity. When UCI is carried in two times of PUSCH transmission, a quantity of time-frequency resources for the first time of PUSCH transmission is 4, and a quantity of time-frequency resources for the second time of PUSCH transmission is 2, a quantity of UCI bits carried in the first time of PUSCH transmission is 2/3 of a total quantity of UCI bits, and a quantity of UCI bits carried in the second time of PUSCH transmission is ⅓ of the total quantity of UCI bits.

Similarly, if the network device 110 determines, from the first set 210, a plurality of transmission occasions for receiving the control information 425, the network device 110 may receive, on each of the plurality of shared channel transmission occasions, a part of a plurality of modulation symbols corresponding to the control information 425. For example, in the example of FIG. 2, assuming that the network device 110 determines that the transmission occasions 210-1 to 210-3 are for receiving the control information 425, the network device 110 may separately receive, on the transmission occasions 210-1 to 210-3, one third of all modulation symbols generated after the control information 425 is modulated, and then combine the modulation symbols to obtain the control information 425. In some embodiments, the network device 110 may determine, based on a corresponding quantity of time-frequency resources included on each of a plurality of transmission occasions of the shared channel 140, a quantity of modulation symbols that need to be received on each of the plurality of transmission occasions. For example, if quantities of time-frequency resources included in the transmission occasions 210-1 to 210-3 for receiving the control information 425 are 50, 50, and 100 respectively, and all modulation symbols of the control information 425 are 40, the network device 110 may receive 10 modulation symbols, 10 modulation symbols, and 20 modulation symbols on the transmission occasions 210-1 to 210-3 respectively. It is understood that various specific values listed herein are merely examples, and are not intended to limit the scope of this disclosure in any manner. In another embodiment, any parameter described herein may have any appropriate value.

According to the example communication process 400, when transmission of the shared channel 140 scheduled by the network device 110 and transmission of the control channel 150 overlap in time domain, the terminal device 120 may appropriately select an appropriate transmission occasion from the plurality of transmission occasions of the shared channel 140 based on one of or both the beamforming manner of the shared channel 140 and the beamforming manner of the control channel 150, to transmit the control information 425 of the control channel 150. Correspondingly, the network device 110 may select an appropriate transmission occasion from the plurality of transmission occasions of the shared channel 140 to receive the control information 425. In this manner, transmission reliability of the control information 425 can be improved, and transmission reliability of data or other information on the shared channel 140 can be considered, to improve performance of communication between the network device 110 and the terminal device 120.

As described above with reference to FIG. 4, in some embodiments, the terminal device 120 and the network device 110 may determine the transmission occasions from the first set 210 based on the first beamforming manner of the shared channel 140, to transmit the control information 425. In this manner, reliability of the control information 150 (for example, the UCI) can be ensured to some extent, and impact of the control information 150 on transmission reliability of the data or other information on the shared channel 140 is reduced as much as possible, to achieve an appropriate compromise between transmission performance of the data or other information on the shared channel 140 and transmission performance of the control information 150.

Specifically, if the first beamforming manner of the shared channel 140 is that a plurality of shared channel transmission occasions in the first set 210 are associated with different beams, the terminal device 120 and the network device 110 may determine the plurality of shared channel transmission occasions from the first set 210, to transmit the control information 425. For example, when a PUSCH transmission scheme is time-domain repeated transmission and at least two of a plurality of transmission occasions use different beamforming manners or transmit beams, UCI of a PUCCH that overlaps with a PUSCH in time domain for any one or more times of repeated transmission may be carried in a plurality of times of time-domain repeated transmission of the PUSCH. In some embodiments, beamforming manners or transmit beams used for all of the plurality of times of repeated transmission of the PUSCH for carrying the UCI are different from each other, and the plurality of transmission occasions meet a constraint condition: duration between start time points of the plurality of transmission occasions and a receiving time point at which scheduling UCI signaling is received is greater than a time period. Optionally, the plurality of times of repeated transmission of the PUSCH for carrying the UCI traverses all transmit beams indicated by the first scheduling information.

In this manner, in a scenario of coordinated multipoint transmission or multi-transmission reception point (TRP) transmission of the network device, transmission reliability of the control information between the terminal device and the network device can be improved, to improve performance of communication between the terminal device and the network device.

In addition, if the first beamforming manner of the shared channel 140 is that all shared channel transmission occasions in the first set 210 are associated with a same beam, the terminal device 120 and the network device 110 may determine a shared channel transmission occasion from the first set 210, to transmit the control information 425. For example, when a PUSCH transmission scheme is time-domain repeated transmission and a same beamforming manner or beam is used, UCI of a PUCCH that overlaps with a PUSCH in time domain for one or more times of transmission may be carried in one time of time-domain repeated transmission of the PUSCH. In this way, when the control information is transmitted through the shared channel, impact of the control information on transmission performance of the data or other information on the shared channel can be reduced as much as possible, to achieve a compromise between transmission performance of the control information and transmission performance of the data or other information. Some examples of determining the transmission occasions from the first set 210 based on the first beamforming manner are described in detail below with reference to FIG. 5 to FIG. 10.

Figure 5:
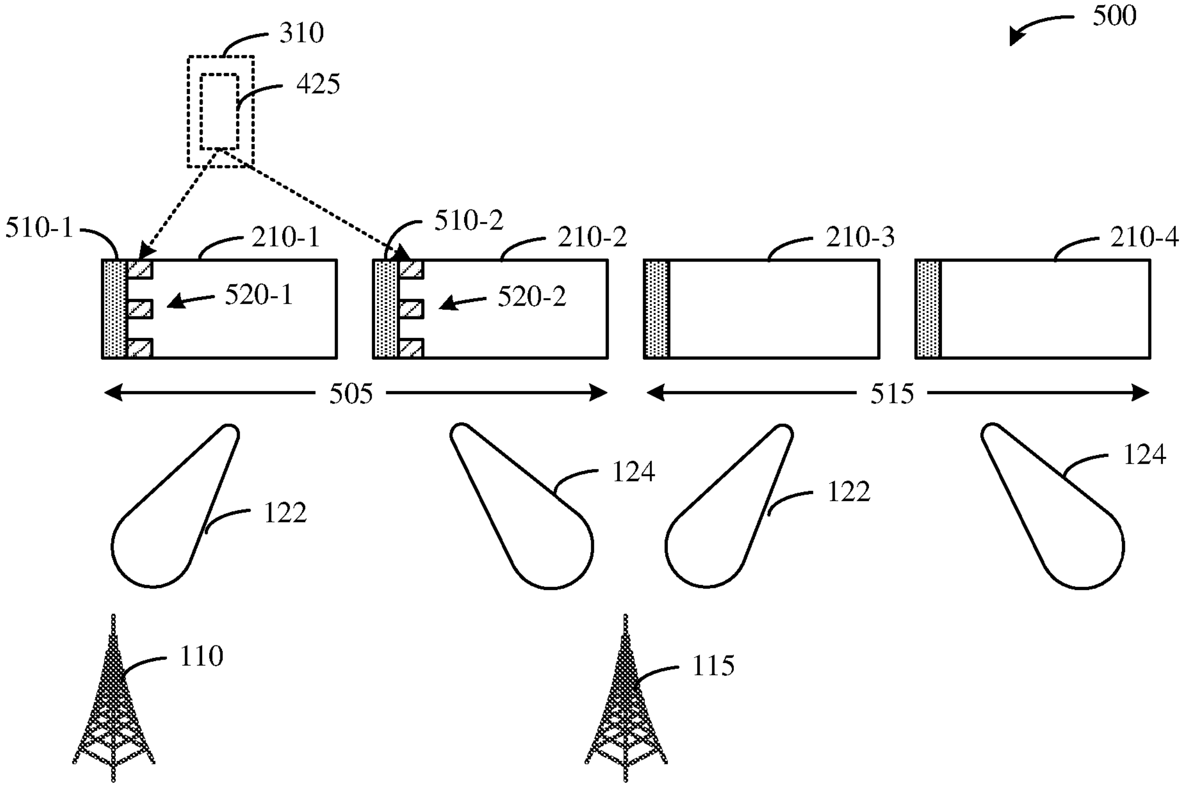
FIG. 5 shows an example of determining one or more transmission occasions for transmitting control information from a set of transmission occasions of a shared channel according to an embodiment of this disclosure.

FIG. 5 shows an example of determining one or more transmission occasions for transmitting control information 425 from a set 210 of transmission occasions of a shared channel 140 according to an embodiment of this disclosure. As shown in FIG. 5, transmission occasions 210-1 and 210-3 in the first set 210 of transmission occasions of the shared channel 140 are associated with a beam 122 pointing to a network device 110, and transmission occasions 210-2 and 210-4 are associated with a beam 124 pointing to a network device 115. FIG. 5 shows that a transmission occasion 310 of a control channel 150 for carrying the control information 425 and the transmission occasion 210-1 of the shared channel 140 overlap in time domain. In addition, FIG. 5 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 5 located in two slots are merely an example, and are not intended to limit the scope of this disclosure in any manner. In another embodiment, the transmission occasions 210-1 to 210-4 may alternatively be located in a same slot, or may be respectively located in more slots.

In the example of FIG. 5, because a first beamforming manner of the shared channel 140 is that the transmission occasions 210-1 and 210-2 in the first set 210 are respectively associated with different beams 122 and 124, a terminal device 120 may determine the transmission occasions 210-1 and 210-2 from the first set 210, to transmit the control information 425 to the network device 110, and the network device 110 may also determine the transmission occasions 210-1 and 210-2 from the first set 210, to receive the control information 425 from the terminal device 120. For example, the network device 110 (for example, a base station) delivers DCI signaling to schedule the shared channel 140 and indicate a plurality of reference signal index values. According to a default rule, each reference signal index value represents one transmit beam. To be specific, the beam 122 corresponds to a reference signal index value 1, the beam 124 corresponds to a reference signal index value 2, the transmission occasion 210-1 corresponds to the reference signal index value 1, and the transmission time 210-2 corresponds to the reference signal index value 2. Specifically, the transmission occasion 210-1 is used as an example, and the control information 150 (for example, UCI) may occupy a specific time-frequency resource in the transmission occasion 210-1. The terminal device 120 may encode an information bit of the control information 150 in a specific encoding manner, and then map the information bit to the specific time-frequency resource. An original data symbol on the shared channel 140 is no longer mapped to a resource element to which the control information 425 is mapped. In other words, the resource element to which the control information 425 is mapped performs puncturing or rate matching on the data symbol. Usually, the control information 425 (for example, including HARQ-ACK information) is important information and may therefore be placed on a symbol, of the shared channel 140, closest to a demodulation reference signal on the transmission occasion of the shared channel 140. For example, on the transmission occasions 210-1 and 210-2 in FIG. 5, the control information 425 may be separately carried on time-frequency resources 520-1 and 520-2 after time-frequency resources 510-1 and 510-2 for transmitting the demodulation reference signal, and the time-frequency resources 520-1 and 520-2 may be inconsecutive in frequency domain. It should be noted that the specific time-frequency resources for carrying the control information 425 shown in FIG. 5 are merely an example, and are not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain.

In addition, in the example of FIG. 5, the terminal device 120 or the network device 110 may alternatively select the transmission occasions 210-1 and 210-4, the transmission occasions 210-2 and 210-3, or the transmission occasions 210-3 and 210-4 from the first set 210 to send or receive the control information 425 because these transmission occasions are also transmission occasions associated with different beams 122 and 124. Certainly, in terms of a transmission latency, it is better to select the transmission occasions 210-1 and 210-2 because the transmission occasions 210-1 and 210-2 are two earliest transmission occasions that meet a condition in the first set 210. Further, because the transmission occasions 210-3 and 210-4 are also associated with different beams, the terminal device 120 or the network device 110 may further select the transmission occasions 210-1 to 210-4 to send or receive the control information 425 when selecting the transmission occasions 210-1 and 210-2, to further improve transmission reliability of the control information 425. However, selecting only the transmission occasions 210-1 and 210-2 without selecting the transmission occasions 210-3 and 210-4 is advantageous from the perspective of a performance compromise because this may reduce impact of the control information 425 on data or other information on the shared channel 140 as much as possible when the control information 425 (for example, the UCI) obtains a diversity gain. It should be understood that the transmission occasions in FIG. 5 associated with two different beams are merely an example, and are not intended to limit the scope of this disclosure in any manner. More generally, if more transmission occasions in the first set 210 are associated with more different beams, the terminal device 120 or the network device 110 may alternatively determine these transmission occasions from the first set 210, to send or receive the control information 425. For example, assuming that the transmission occasions 210-1 to 210-4 in FIG. 5 are respectively associated with four different beams, the terminal device 120 or the network device 110 may select all of the transmission occasions 210-1 to 210-4 to send or receive the control information 425. In other words, a quantity of transmission occasions selected by the terminal device 120 or the network device 110 may be equal to a quantity of different beams. Certainly, in this case, the quantity of transmission occasions selected by the terminal device 120 or the network device 110 may alternatively be less than the quantity of different beams.

In some embodiments, to reduce a transmission latency of the control information 425 as much as possible, the terminal device 120 or the network device 110 may select a plurality of transmission occasions that are close in time domain from the first set 210, to send or receive the control information 425. For example, the terminal device 120 or the network device 110 may select a plurality of transmission occasions that are consecutively numbered in time domain from the first set 210. As used in this specification, a number of a transmission occasion in time domain may be a number allocated to the transmission occasion in a time sequence. In other words, if there is another transmission occasion between two transmission occasions, the terminal device 120 or the network device 110 may avoid selecting the two transmission occasions. Certainly, the terminal device 120 or the network device 110 may alternatively be configured to avoid selecting two transmission occasions spaced by transmission occasions whose quantity is greater than a quantity threshold. For example, if the quantity threshold is 2 and there are three transmission occasions between two transmission occasions, the terminal device 120 or the network device 110 may avoid selecting the two transmission occasions. Additionally or alternatively, the terminal device 120 or the network device 110 may select a plurality of transmission occasions whose mutual time interval is less than or equal to predetermined duration. In some embodiments, the predetermined duration may be determined based on a specific application environment and a performance requirement. In other words, a time domain interval between the plurality of transmission occasions selected by the terminal device 120 or the network device 110 needs to be small enough. In the foregoing various manners, the terminal device 120 can ensure that the transmission latency of the control information 425 is low, to avoid a case in which the control information 425 cannot be correctly received by the network device 110 within predetermined time and transmission performance of the data or other information on the shared channel 140 is affected. Such an example is described below with reference to FIG. 6.

Figure 6:
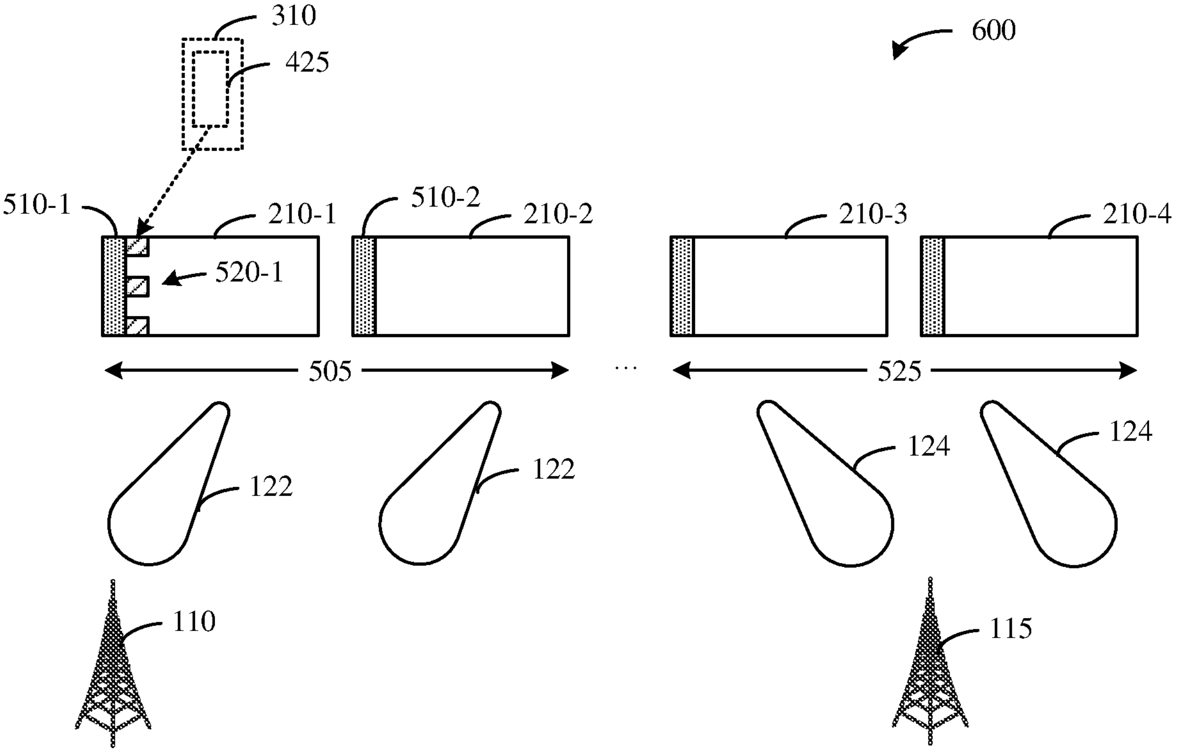
FIG. 6 shows another example of determining one or more transmission occasions for transmitting control information from a set of transmission occasions of a shared channel according to an embodiment of this disclosure.

FIG. 6 shows another example of determining one or more transmission occasions for transmitting control information 425 from a set 210 of transmission occasions of a shared channel 140 according to an embodiment of this disclosure. As shown in FIG. 6, transmission occasions 210-1 and 210-2 in the first set 210 of transmission occasions of the shared channel 140 are associated with a beam 122 pointing to a network device 110, and transmission occasions 210-3 and 210-4 are associated with a beam 124 pointing to a network device 115. FIG. 6 shows that a transmission occasion 310 of a control channel 150 for carrying the control information 425 and the transmission occasion 210-1 of the shared channel 140 overlap in time domain. In addition, FIG. 6 shows that the transmission occasions 210-1 and 210-2 are located in a slot 505, the transmission occasions 210-3 and 210-4 are located in a slot 525, and there is a slot 515 (not shown) between the slot 505 and the slot 525. In other words, the transmission occasions 210-2 and 210-3 are far away from each other in time domain, and an interval between the transmission occasions 210-2 and 210-3 is greater than one slot. Furthermore, this means that a transmission occasion of the shared channel 140 may be at a sub-slot level, and the first set 210 may cross slots. It is understood that the transmission occasions 210-1 to 210-4 in FIG. 6 located in two slots are merely an example, and are not intended to limit the scope of this disclosure in any manner. In another embodiment, the transmission occasions 210-1 to 210-4 may alternatively be located in a same slot, or may be respectively located in more slots.

In the example of FIG. 6, the transmission occasions 210-1 and 210-3, the transmission occasions 210-1 and 210-4, the transmission occasions 210-2 and 210-3, or the transmission occasions 210-2 and 210-4 are a plurality of transmission occasions associated with different beams 122 and 124. However, there is another transmission occasion between the transmission occasions 210-1 and 210-3, between the transmission occasions 210-1 and 210-4, or between the transmission occasions 210-2 and 210-4. This does not meet the foregoing condition of consecutive numbers in time domain. In addition, in the example of FIG. 6, although the transmission occasions 210-2 and 210-3 are consecutively numbered transmission occasions, the interval between the transmission occasions 210-2 and 210-3 in time domain is greater than one slot. If in the example of FIG. 6, maximum predetermined duration between two transmission intervals that may be selected by a terminal device 120 and the network device 110 is set to two OFDM symbols, the interval between the transmission occasions 210-2 and 210-3 is greater than the predetermined duration. Consequently, the foregoing condition that the time domain interval is small enough is not met. It is understood that a specific value of a parameter such as the predetermined duration described herein is merely an example, and is not intended to limit the scope of this disclosure in any manner. In another embodiment, the parameter such as the predetermined duration may be determined as any other value based on a specific application environment and a performance requirement.

Therefore, as shown in FIG. 6, because a plurality of transmission occasions that meet the foregoing latency condition and have different beams do not exist, to ensure that the control information 425 has a low transmission latency, the terminal device 120 or the network device 110 may select only one transmission occasion 210-1 from the first set 210, to send or receive the control information 425. For example, on the transmission occasion 210-1 in FIG. 6, the control information 425 may be carried on a time-frequency resource 520-1 after a time-frequency resource 510-1 for transmitting a demodulation reference signal, and the time-frequency resource 520-1 may be inconsecutive in frequency domain. It should be noted that the specific time-frequency resource for carrying the control information 425 shown in FIG. 6 is merely an example, and is not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain. In addition, in the example of FIG. 6, the terminal device 120 or the network device 110 may alternatively determine one of the transmission occasions 210-2 to 210-4 from the first set 210, to send or receive the control information 425. However, from the perspective of a latency, the transmission occasion 210-1 is better because the transmission occasion 210-1 is an earliest transmission occasion.

In some embodiments, it may take a time period for the terminal device 120 to generate or prepare the control information 150 for transmission. As a result, not all transmission occasions in the first set 210 may be for transmitting the control information 150. For example, it takes specific processing time for the terminal device 120 to generate or prepare HARQ-ACK information that may be included in the control information 150. Specifically, the terminal device 120 may first need to perform channel estimation and a decoding operation on downlink data from the network device 110. Then, the terminal device 120 may perform packet assembly of uplink data, for example, including operations such as scrambling, encoding, modulation, and sequence generation on the determined HARQ-ACK information. Then, the terminal device 120 may send the HARQ-ACK information in the control information 150. Similarly, it also takes processing time for the terminal device 120 to generate or prepare other information in the control information 150. In conclusion, it takes the time period for the terminal device 120 to generate or prepare the control information 150, and the time period may specifically depend on a device capability of the terminal device 120. Therefore, in some embodiments, when selecting a transmission occasion from the first set 210, the terminal device 120 and the network device 110 further need to consider the time period used by the terminal device 120 to prepare the control information 150. In other words, the control information 425 may be carried on a transmission occasion on which the terminal device 120 has sufficient time to generate the control information 150, for example, an earliest transmission occasion or another subsequent transmission occasion that meets the condition. In this manner, the technical solution in this embodiment of this disclosure may adapt to a terminal device with a low processing capability, and meet a limitation of the low processing capability of the terminal device. Such an example is described below with reference to FIG. 7 to FIG. 9.

Figure 7:
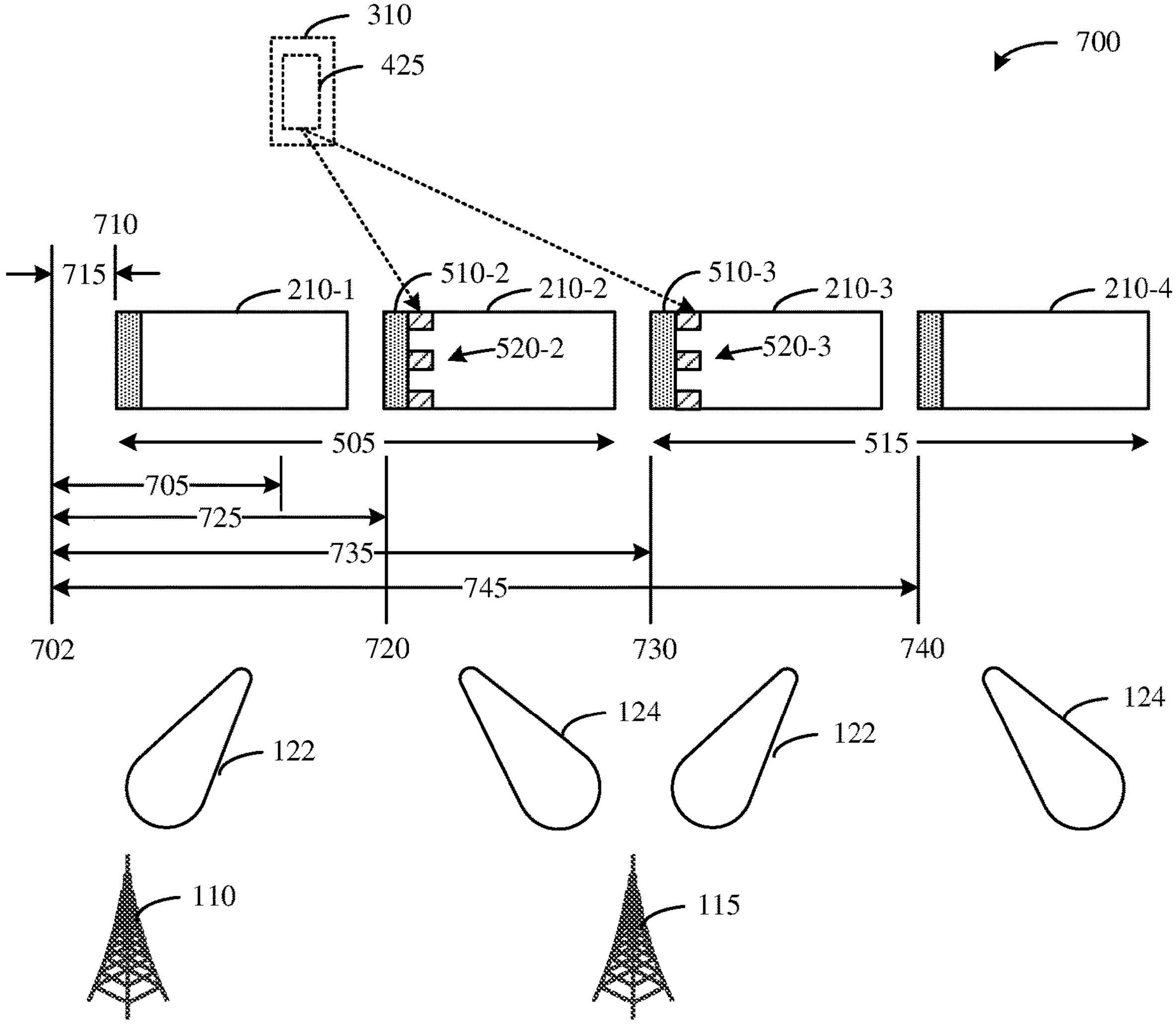
FIG. 7 shows another example of determining one or more transmission occasions for transmitting control information from a set of transmission occasions of a shared channel according to an embodiment of this disclosure.

FIG. 7 shows another example of determining one or more transmission occasions for transmitting control information 425 from a set 210 of transmission occasions of a shared channel 140 according to an embodiment of this disclosure. As shown in FIG. 7, transmission occasions 210-1 and 210-3 in the first set 210 of transmission occasions of the shared channel 140 are associated with a beam 122 pointing to a network device 110, and transmission occasions 210-2 and 210-4 are associated with a beam 124 pointing to a network device 115. FIG. 7 shows that a transmission occasion 310 of a control channel 150 for carrying the control information 425 and the transmission occasion 210-1 of the shared channel 140 overlap in time domain. In addition, FIG. 7 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 7 located in two slots are merely an example, and are not intended to limit the scope of this disclosure in any manner. In another embodiment, the transmission occasions 210-1 to 210-4 may alternatively be located in a same slot, or may be respectively located in more slots. In addition, FIG. 7 shows a receiving time point 702 at which a terminal device 120 receives second scheduling information 415 from the network device 110, a time period 705 used by the terminal device 120 to generate the control information 425, and start time points 710, 720, 730, and 740 of the transmission occasions 210-1, 210-2, 210-3, and 210-4.

Figure 8:
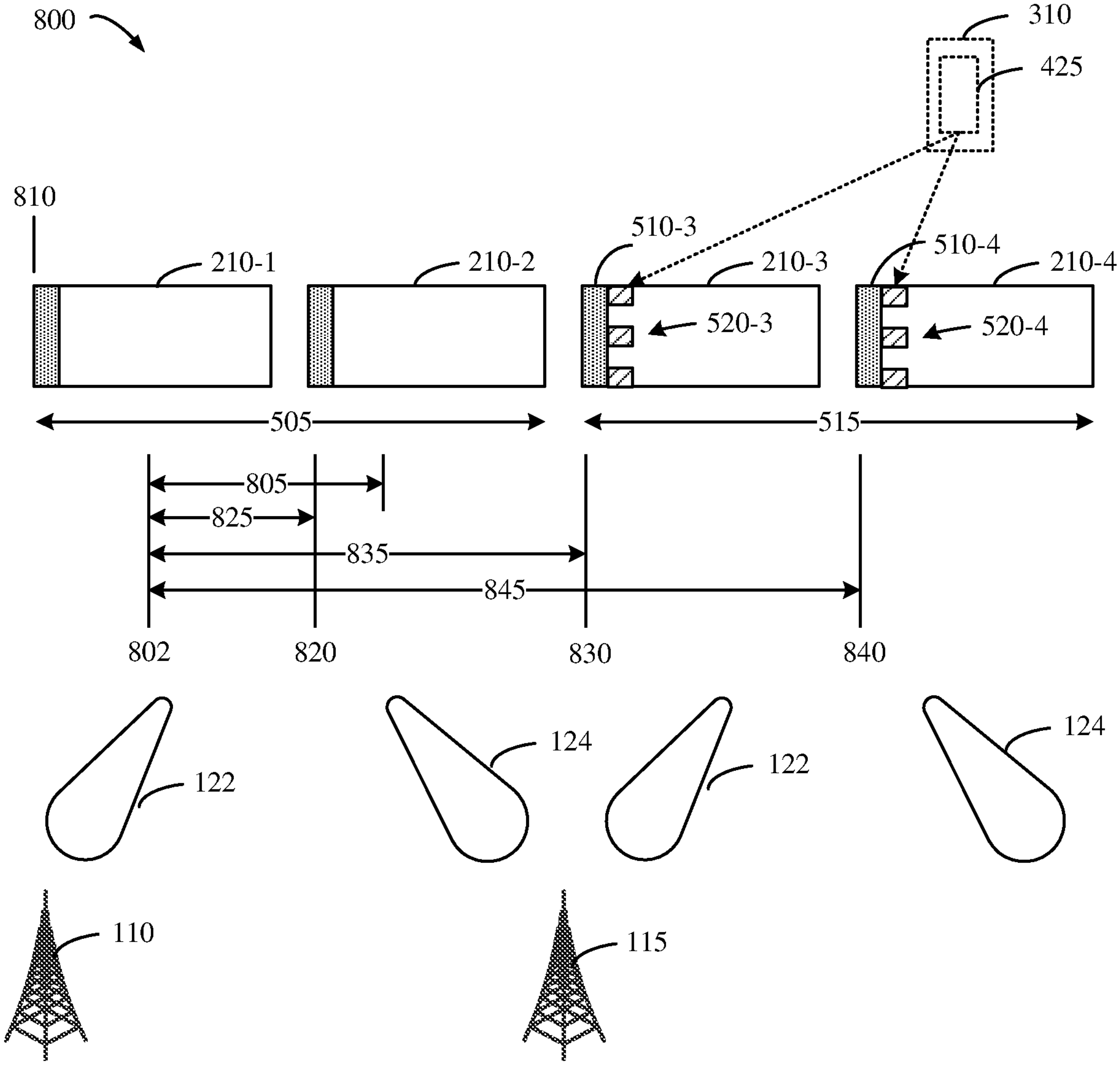
FIG. 8 shows another example of determining one or more transmission occasions for transmitting control information from a set of transmission occasions of a shared channel according to an embodiment of this disclosure.

FIG. 8 shows another example of determining one or more transmission occasions for transmitting control information 425 from a set 210 of transmission occasions of a shared channel 140 according to an embodiment of this disclosure. As shown in FIG. 8, transmission occasions 210-1 and 210-3 in the first set 210 of transmission occasions of the shared channel 140 are associated with a beam 122 pointing to a network device 110, and transmission occasions 210-2 and 210-4 are associated with a beam 124 pointing to a network device 115. FIG. 8 shows that a transmission occasion 310 of a control channel 150 for carrying the control information 425 and the transmission occasion 210-4 of the shared channel 140 overlap in time domain. In addition, FIG. 8 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 8 located in two slots are merely an example, and are not intended to limit the scope of this disclosure in any manner. In another embodiment, the transmission occasions 210-1 to 210-4 may alternatively be located in a same slot, or may be respectively located in more slots. In addition, FIG. 8 shows a receiving time point 802 at which a terminal device 120 receives second scheduling information 415 from the network device 110, a time period 805 used by the terminal device 120 to generate the control information 425, and start time points 810, 820, 830, and 840 of the transmission occasions 210-1, 210-2, 210-3, and 210-4. It should be understood that a concept of a time point in this disclosure may be defined based on a time unit. For example, a start time point may be a specific OFDM symbol.

Figure 9:
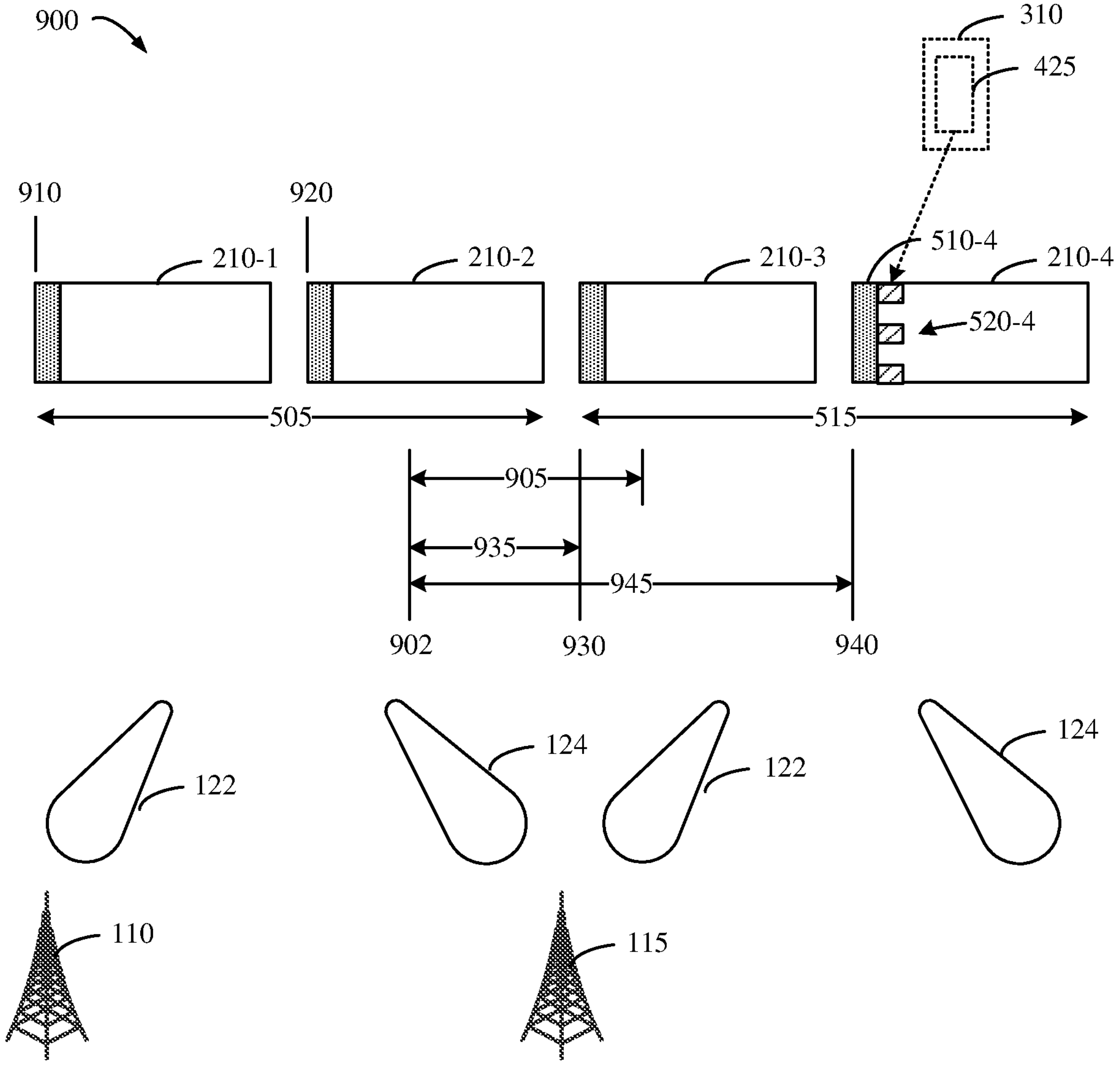
FIG. 9 shows another example of determining one or more transmission occasions for transmitting control information from a set of transmission occasions of a shared channel according to an embodiment of this disclosure.

FIG. 9 shows another example of determining one or more transmission occasions for transmitting control information 425 from a set 210 of transmission occasions of a shared channel 140 according to an embodiment of this disclosure. As shown in FIG. 9, transmission occasions 210-1 and 210-3 in the first set 210 of transmission occasions of the shared channel 140 are associated with a beam 122 pointing to a network device 110, and transmission occasions 210-2 and 210-4 are associated with a beam 124 pointing to a network device 115. FIG. 9 shows that a transmission occasion 310 of a control channel 150 for carrying the control information 425 and the transmission occasion 210-4 of the shared channel 140 overlap in time domain. In addition, FIG. 9 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 9 located in two slots are merely an example, and are not intended to limit the scope of this disclosure in any manner. In another embodiment, the transmission occasions 210-1 to 210-4 may alternatively be located in a same slot, or may be respectively located in more slots. In addition, FIG. 9 shows a receiving time point 902 at which a terminal device 120 receives second scheduling information 415 from the network device 110, a time period 905 used by the terminal device 120 to generate the control information 425, and start time points 910, 920, 930, and 940 of the transmission occasions 210-1, 210-2, 210-3, and 210-4.

In some embodiments, to determine the transmission occasions for sending the control information 425 from the first set 210, the terminal device 120 may determine a time period for generating the control information 425, that is, a time period starting from a time point at which the second scheduling information 415 of the control channel 150 is received to a time point at which the terminal device 120 prepares the control information 425. Similarly, to determine the transmission occasions for receiving the control information 425 from the first set 210, the network device 110 may determine a time period used by the terminal device 120 to generate the control information 425. In some embodiments, to enable the network device 110 to determine the time period, the terminal device 120 may report, to the network device 110, a parameter that is specific to the terminal device 120 and that is for determining the time period. Refer to FIG. 7 to FIG. 9. In the example of FIG. 7, the terminal device 120 and the network device 110 may determine the time period 705. In the example of FIG. 8, the terminal device 120 and the network device 110 may determine the time period 805. In the example of FIG. 9, the terminal device 120 and the network device 110 may determine the time period 905.

Then, the terminal device 120 and the network device 110 may determine a subset of the first set 210 based on the time period for generating the control information 425, and duration between a start time point of a transmission occasion in the subset and a receiving time point at which the terminal device 120 receives the second scheduling information 415 is greater than the time period for generating the control information 425. For example, in the example of FIG. 7, the terminal device 120 and the network device 110 may determine that the subset of the first set 210 is the transmission occasions 210-2 to 210-4. This is because duration 725 between the start time point 720 of the transmission occasion 210-2 and the receiving time point 702 at which the second scheduling information 415 is received is greater than the time period 705 for generating the control information 425, duration 735 between the start time point 730 of the transmission occasion 210-3 and the receiving time point 702 at which the second scheduling information 415 is received is greater than the time period 705 for generating the control information 425, and duration 745 between the start time point 740 of the transmission occasion 210-4 and the receiving time point 702 at which the second scheduling information 415 is received is greater than the time period 705 for generating the control information 425. However, duration 715 between the start time point 710 of the transmission occasion 210-1 and the receiving time point 702 at which the second scheduling information 415 is received is less than the time period 705 for generating the control information 425.

Similarly, in the example of FIG. 8, the terminal device 120 and the network device 110 may determine that the subset of the first set 210 is the transmission occasions 210-3 and 210-4. This is because duration 835 between the start time point 830 of the transmission occasion 210-3 and the receiving time point 802 at which the second scheduling information 415 is received is greater than the time period 805 for generating the control information 425, and duration 845 between the start time point 840 of the transmission occasion 210-4 and the receiving time point 802 at which the second scheduling information 415 is received is greater than the time period 805 for generating the control information 425. However, the start time point 810 of the transmission occasion 210-1 is before the receiving time point 802 at which the second scheduling information 415 is received. As a result, the terminal device 120 definitely cannot prepare the control information 425 before the start time point 810 of the transmission occasion 210-1. In addition, duration 825 between the start time point 820 of the transmission occasion 210-2 and the receiving time point 802 at which the second scheduling information 415 is received is less than the time period 805 for generating the control information 425.

Similarly, in the example of FIG. 9, the terminal device 120 and the network device 110 may determine that the subset of the first set 210 is the transmission occasion 210-4. This is because duration 945 between the start time point 940 of the transmission occasion 210-4 and the receiving time point 902 at which the second scheduling information 415 is received is greater than the time period 905 for generating the control information 425. However, the start time points 910 and 920 of the transmission occasions 210-1 and 210-2 are both before the receiving time point 902 at which the second scheduling information 415 is received. As a result, the terminal device 120 definitely cannot prepare the control information 425 before the start time point 910 of the transmission occasion 210-1 and the start time point 920 of the transmission occasion 210-2. In addition, duration 935 between the start time point 930 of the transmission occasion 210-3 and the receiving time point 902 at which the second scheduling information 415 is received is less than the time period 905 for generating the control information 425.

After determining the foregoing subset of the first set 210, the terminal device 120 and the network device 110 may determine, from the subset, a transmission occasion of the shared channel 140 for transmitting the control information 425. For example, in the example of FIG. 7, the terminal device 120 and the network device 110 may determine, from the subset 210-2, 210-3, and 210-4 of the transmission occasions, a transmission occasion for transmitting the control information 425. Because the first beamforming manner of the shared channel 140 is that the transmission occasions 210-2 and 210-3 in the first set 210 are respectively associated with different beams 124 and 122, the terminal device 120 may determine the transmission occasions 210-2 and 210-3 from the subset 210-2, 210-3, and 210-4 of the transmission occasions, to transmit the control information 425 to the network device 110, and the network device 110 may also determine the transmission occasions 210-2 and 210-3 from the subset 210-2, 210-3, and 210-4 of the transmission occasions, to receive the control information 425 from the terminal device 120. For example, on the transmission occasions 210-2 and 210-3 in FIG. 7, the control information 425 may be separately carried on time-frequency resources 520-2 and 520-3 after time-frequency resources 510-2 and 510-3 for transmitting a demodulation reference signal, and the time-frequency resources 520-2 and 520-3 may be inconsecutive in frequency domain. It should be noted that the specific time-frequency resources for carrying the control information 425 shown in FIG. 7 are merely an example, and are not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain. In addition, in the example of FIG. 7, the terminal device 120 or the network device 110 may alternatively determine the transmission occasions 210-3 and 210-4 from the subset 210-2, 210-3, and 210-4 of the transmission occasions to send or receive the control information 425 because these transmission occasions are also transmission occasions associated with different beams 122 and 124.

In the example of FIG. 8, the terminal device 120 and the network device 110 may determine, from the subset 210-3 and 210-4 of the transmission occasions, a transmission occasion of the shared channel 140 for transmitting the control information 425. Because the first beamforming manner of the shared channel 140 is that the transmission occasions 210-3 and 210-4 in the first set 210 are respectively associated with different beams 122 and 124, the terminal device 120 may determine the transmission occasions 210-3 and 210-4 from the subset 210-3 and 210-4 of the transmission occasions, to transmit the control information 425 to the network device 110, and the network device 110 may also determine the transmission occasions 210-3 and 210-4 from the subset 210-3 and 210-4 of the transmission occasions, to receive the control information 425 from the terminal device 120. For example, on the transmission occasions 210-3 and 210-4 in FIG. 8, the control information 425 may be separately carried on time-frequency resources 520-3 and 520-4 after time-frequency resources 510-3 and 510-4 for transmitting a demodulation reference signal, and the time-frequency resources 520-3 and 520-4 may be inconsecutive in frequency domain. It should be noted that the specific time-frequency resources for carrying the control information 425 shown in FIG. 8 are merely an example, and are not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain.

In the example of FIG. 9, the terminal device 120 and the network device 110 may determine, from the subset 210-4 of the transmission occasions, a transmission occasion of the shared channel 140 for transmitting the control information 425. Because the subset 210-4 of the transmission occasions includes only one optional transmission occasion 210-4, the terminal device 120 may determine the transmission occasion 210-4 from the subset 210-4 of the transmission occasions, to transmit the control information 425 to the network device 110, and the network device 110 may also determine the transmission occasion 210-4 from the subset 210-4 of the transmission occasions, to receive the control information 425 from the terminal device 120. For example, on the transmission occasion 210-4 in FIG. 9, the control information 425 may be carried on a time-frequency resource 520-4 after a time-frequency resource 510-4 for transmitting a demodulation reference signal, and the time-frequency resource 520-4 may be inconsecutive in frequency domain. It should be noted that the specific time-frequency resource for carrying the control information 425 shown in FIG. 9 is merely an example, and is not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain.

Some embodiments in which a plurality of transmission occasions in the first set 210 are associated with different beams are described above with reference to FIG. 5 to FIG. 9. In another embodiment, the first beamforming manner of the shared channel 140 may be that all shared channel transmission occasions in the first set 210 are associated with a same beam. In this case, the terminal device 120 or the network device 110 may determine a shared channel transmission occasion from the first set 210, to transmit the control information 425. For example, when a PUSCH transmission scheme is time-domain repeated transmission and a same beamforming manner or beam is used, UCI of a PUCCH that overlaps with a PUSCH in time domain for one or more times of transmission may be carried in one time of time-domain repeated transmission of the PUSCH. In this manner, when the control information 425 is transmitted through the shared channel 140, impact of the control information 425 on transmission performance of data or other information on the shared channel 140 can be reduced as much as possible, to achieve a compromise between transmission performance of the control information 425 and transmission performance of the data or other information. Such an embodiment is described below with reference to FIG. 10.

Figure 10:
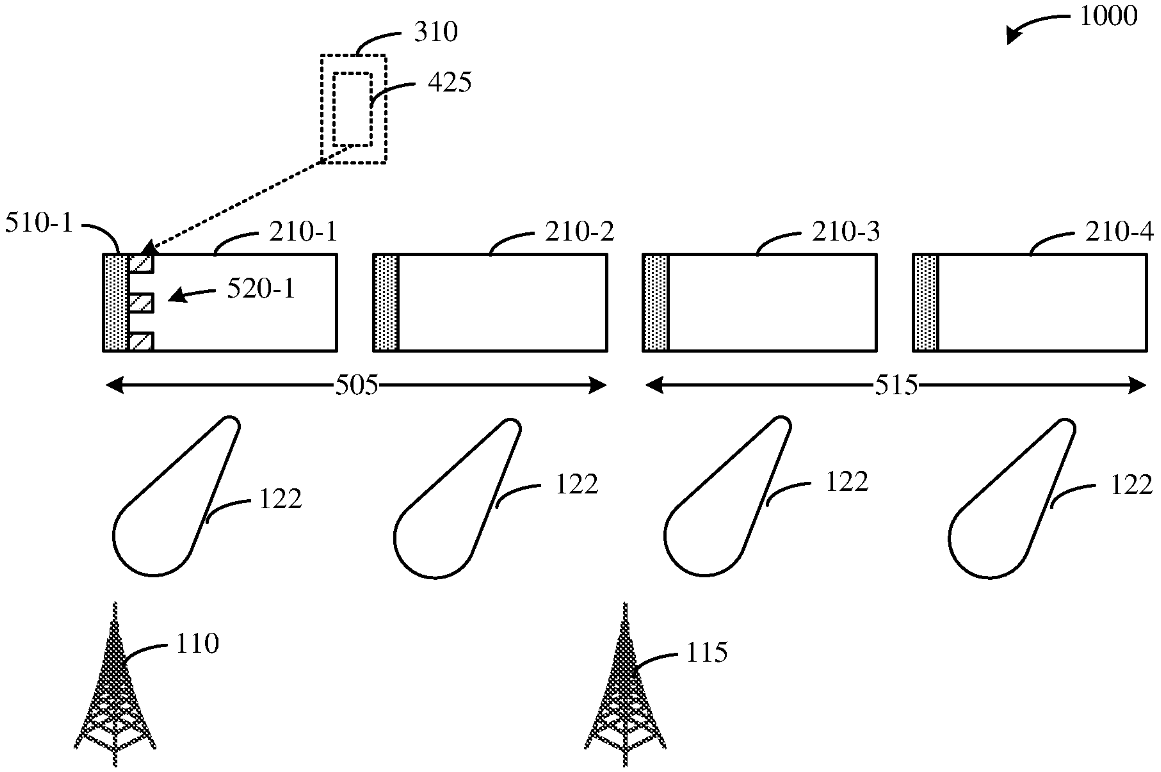
FIG. 10 shows another example of determining one or more transmission occasions for transmitting control information from a set of transmission occasions of a shared channel according to an embodiment of this disclosure.

FIG. 10 shows another example of determining one or more transmission occasions for transmitting control information 425 from a set 210 of transmission occasions of a shared channel 140 according to an embodiment of this disclosure. As shown in FIG. 10, transmission occasions 210-1 to 210-4 in the first set 210 of transmission occasions of the shared channel 140 are all associated with a beam 122 pointing to a network device 110. FIG. 10 shows that a transmission occasion 310 of a control channel 150 for carrying the control information 425 and the transmission occasions 210-1 and 210-2 of the shared channel 140 overlap in time domain. In addition, FIG. 10 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 10 located in two slots are merely an example, and are not intended to limit the scope of this disclosure in any manner. In another embodiment, the transmission occasions 210-1 to 210-4 may alternatively be located in a same slot, or may be respectively located in more slots.

In the example of FIG. 10, because a first beamforming manner of the shared channel 140 is that the transmission occasions 210-1 to 210-4 in the first set 210 are all associated with the same beam 122, a terminal device 120 may determine the transmission occasion 210-1 from the first set 210, to transmit the control information 425 to the network device 110, and the network device 110 may also determine the transmission occasion 210-1 from the first set 210, to receive the control information 425 from the terminal device 120. For example, on the transmission occasion 210-1 in FIG. 10, the control information 425 may be carried on a time-frequency resource 520-1 after a time-frequency resource 510-1 for transmitting a demodulation reference signal, and the time-frequency resource 520-1 may be inconsecutive in frequency domain. It should be noted that the specific time-frequency resource for carrying the control information 425 shown in FIG. 10 is merely an example, and is not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain.

In addition, in the example of FIG. 10, the terminal device 120 or the network device 110 may alternatively select the transmission occasion 210-2, the transmission occasion 210-3, or the transmission occasion 210-4 from the first set 210, to send or receive the control information 425. More generally, if there are more transmission occasions in the first set 210, the terminal device 120 or the network device 110 may alternatively determine a transmission occasion from these transmission occasions in the first set 210, to send or receive the control information 425. In addition, it should be further noted that although the transmission occasions 210-1 to 210-4 in FIG. 10 are all associated with the beam 122, this is merely an example, and is not intended to limit the scope of this disclosure in any manner. In another embodiment, the transmission occasions 210-1 to 210-4 each may alternatively be associated with a plurality of beams. For example, assuming that the transmission occasions 210-1 to 210-4 each are associated with beams 122 and 124, the transmission occasions 210-1 to 210-4 are also considered to be associated with "same" beams.

As described above with reference to FIG. 4, in some embodiments, the terminal device 120 and the network device 110 may alternatively determine (450) the transmission occasions from the first set 210 based on a second beamforming manner of the control channel 150, to transmit the control information 425. In this manner, the transmission occasion of the shared channel 140 for transmitting the control information 425 may be determined based on transmission requirements of the control channel 150 and the control information 425, to ensure transmission performance of the control information 425. In addition, a carrying policy of the control information 425 is determined according to a transmission solution of the control channel 150, so that a better compromise between transmission reliability of the control channel 150 and transmission reliability of the shared channel 140 can be obtained.

Specifically, if the second beamforming manner of the control channel 150 is that a plurality of transmission occasions in a second set 350 of transmission occasions of the control channel 150 are associated with different beams, the terminal device 120 or the network device 110 may determine a plurality of shared channel transmission occasions from the first set 210 of transmission occasions of the shared channel 140, and transmit beams corresponding to the plurality of shared transmission occasions are different from each other, to transmit the control information 425. In this manner, when the control information 425 requires coordinated multipoint transmission or multi-transmission reception point transmission to achieve high reliability, transmission reliability of the control information 425 may be preferentially met by transmitting the control information 425 through the shared channel 140. In some embodiments, the foregoing condition may be specifically represented as that the control channel 150 (for example, a PUCCH) is explicitly configured to be repeatedly transmitted and different beamforming manners or beams are used for a plurality of times of different transmission. In another embodiment, the control channel 150 (for example, the PUCCH) may be explicitly configured to be transmitted in a frequency hopping manner, and different beamforming manners or beams are used for different frequency hopping transmission. Different beamforming manners or beams used for different frequency hopping transmission may be explicitly notified by using signaling, or a default rule may be used to agree that when the frequency hopping transmission manner is configured, a beamforming manner may be determined by the terminal device. In this case, the beamforming manner or a beam is not additionally notified. A mechanism for transmitting the control channel 150 (for example, the PUCCH) in a frequency hopping manner may be sending repeated control information 425 (for example, UCI) in different frequency bands, or sending non-repeated control information 425 (for example, UCI) in different frequency bands.

In addition, if the second beamforming manner of the control channel 150 is that all transmission occasions in the second set 350 of transmission occasions of the control channel 150 are associated with a same beam, the terminal device 120 or the network device 110 may determine a shared channel transmission occasion from the first set 210 of transmission occasions of the shared channel 140, to transmit the control information 425. In this manner, when the control information 425 does not require coordinated multipoint transmission or multi-transmission reception point transmission to achieve high reliability, transmission reliability of the data or other information on the shared channel 140 may be preferentially met by transmitting the control information 425 through the shared channel. Some examples of determining the transmission occasions from the first set 210 based on the second beamforming manner are described in detail below with reference to FIG. 11 and FIG. 12.

Figure 11:
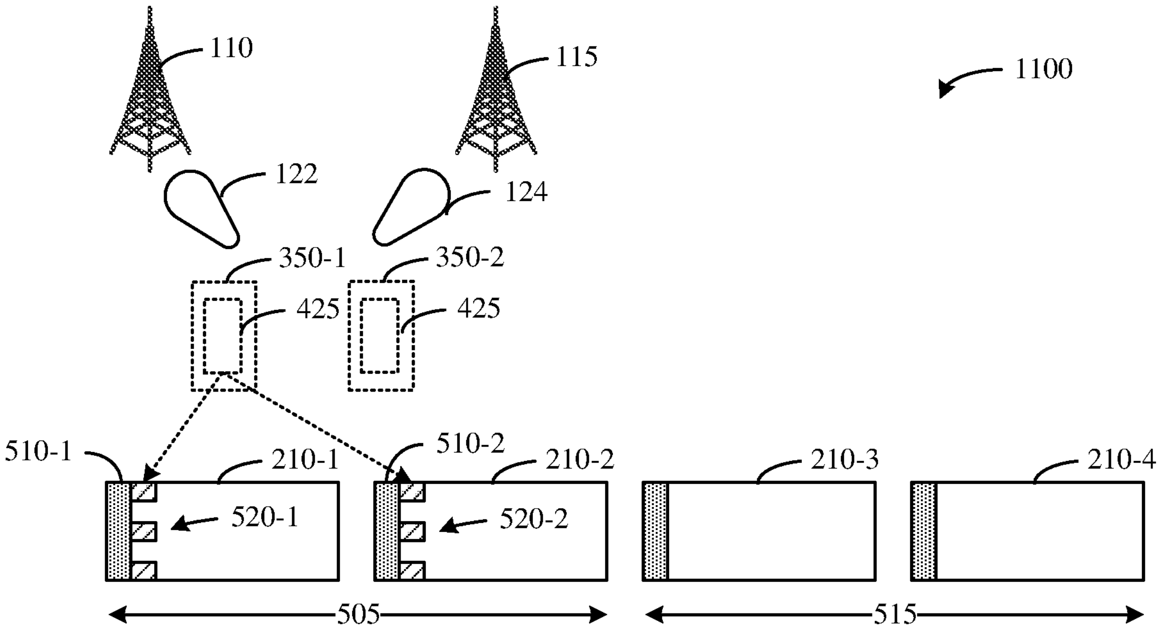
FIG. 11 shows another example of determining one or more transmission occasions for transmitting control information from a set of transmission occasions of a shared channel according to an embodiment of this disclosure.

FIG. 11 shows another example of determining one or more transmission occasions for transmitting control information 425 from a set 210 of transmission occasions of a shared channel 140 according to an embodiment of this disclosure. As shown in FIG. 11, the first set 210 of transmission occasions of the shared channel 140 includes transmission occasions 210-1 to 210-4. A second set 350 of transmission occasions of a control channel 150 includes transmission occasions 350-1 and 350-2. The transmission occasions 350-1 and 350-2 of the control channel 150 are respectively associated with a beam 122 pointing to a network device 110 and a beam 124 pointing to a network device 115. FIG. 11 shows that the transmission occasions 350-1 and 350-2 of the control channel 150 for carrying the control information 425 and the transmission occasions 210-1 and 210-2 of the shared channel 140 respectively overlap in time domain. In addition, FIG. 11 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 11 located in two slots are merely an example, and are not intended to limit the scope of this disclosure in any manner. In another embodiment, the transmission occasions 210-1 to 210-4 may alternatively be located in a same slot, or may be respectively located in more slots.

In the example of FIG. 11, because a second beamforming manner of the control channel 150 is that the transmission occasions 350-1 and 350-2 in the second set 350 are respectively associated with different beams 122 and 124, a terminal device 120 may determine the plurality of transmission occasions 210-1 and 210-2 from the first set 210 of the shared channel 140, to transmit the control information 425 to the network device 110, and the network device 110 may also determine the plurality of transmission occasions 210-1 and 210-2 from the first set 210 of the shared channel 140, to receive the control information 425 from the terminal device 120. For example, on the transmission occasions 210-1 and 210-2 in FIG. 11, the control information 425 may be separately carried on time-frequency resources 520-1 and 520-2 after time-frequency resources 510-1 and 510-2 for transmitting a demodulation reference signal, and the time-frequency resources 520-1 and 520-2 may be inconsecutive in frequency domain. It should be noted that the specific time-frequency resources for carrying the control information 425 shown in FIG. 11 are merely an example, and are not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain. In addition, in the example of FIG. 11, the terminal device 120 or the network device 110 may alternatively determine any other two or more transmission occasions from the transmission occasions 210-1 to 210-4 in the first set 210, to send or receive the control information 425. More generally, if there are more transmission occasions in the first set 210, the terminal device 120 or the network device 110 may alternatively determine, from the first set 210, transmission occasions whose quantity is less than or equal to a total quantity of transmission occasions in the first set 210, to send or receive the control information 425.

Figure 12:
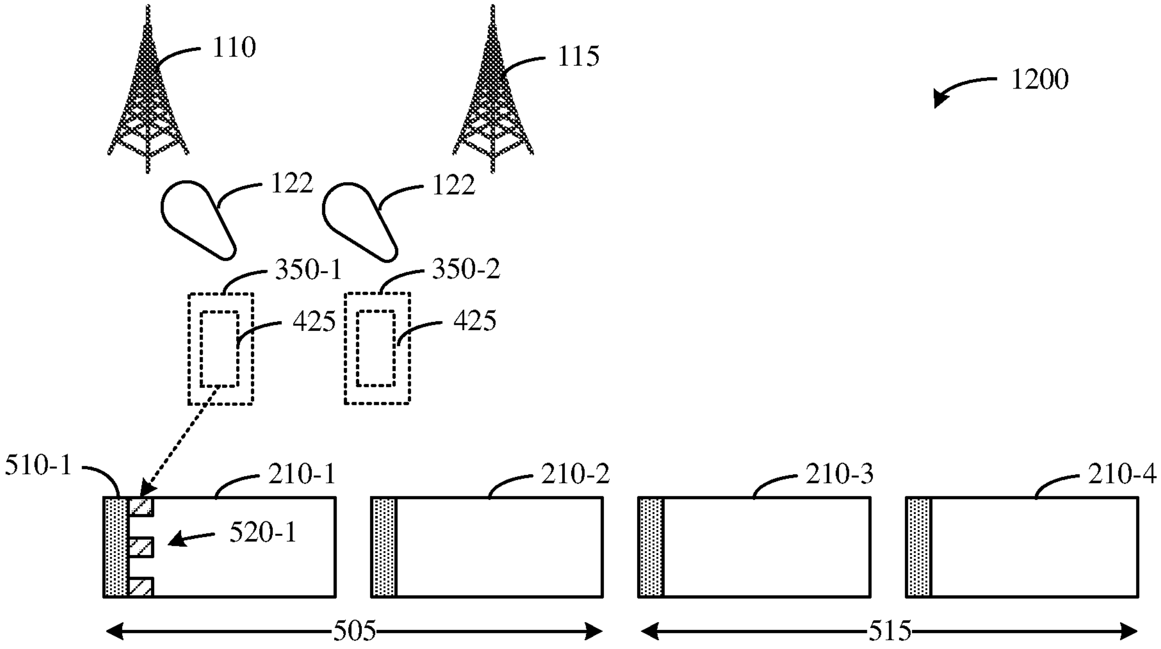
FIG. 12 shows another example of determining one or more transmission occasions for transmitting control information from a set of transmission occasions of a shared channel according to an embodiment of this disclosure.

FIG. 12 shows another example of determining one or more transmission occasions for transmitting control information 425 from a set 210 of transmission occasions of a shared channel 140 according to an embodiment of this disclosure. As shown in FIG. 12, the first set 210 of transmission occasions of the shared channel 140 includes transmission occasions 210-1 to 210-4. A second set 350 of transmission occasions of a control channel 150 includes transmission occasions 350-1 and 350-2. The transmission occasions 350-1 and 350-2 of the control channel 150 are both associated with a beam 122 pointing to a network device 110. FIG. 12 shows that the transmission occasions 350-1 and 350-2 of the control channel 150 for carrying the control information 425 and the transmission occasions 210-1 and 210-2 of the shared channel 140 respectively overlap in time domain. In addition, FIG. 12 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 11 located in two slots are merely an example, and are not intended to limit the scope of this disclosure in any manner. In another embodiment, the transmission occasions 210-1 to 210-4 may alternatively be located in a same slot, or may be respectively located in more slots.

In the example of FIG. 12, because a second beamforming manner of the control channel 150 is that the transmission occasions 350-1 and 350-2 in the second set 350 are both associated with the same beam 122, a terminal device 120 may determine the transmission occasion 210-1 from the first set 210 of the shared channel 140, to transmit the control information 425 to the network device 110, and the network device 110 may also determine the transmission occasion 210-1 from the first set 210 of the shared channel 140, to receive the control information 425 from the terminal device 120. For example, on the transmission occasion 210-1 in FIG. 12, the control information 425 may be carried on a time-frequency resource 520-1 after a time-frequency resource 510-1 for transmitting a demodulation reference signal, and the time-frequency resource 520-1 may be inconsecutive in frequency domain. It should be noted that the specific time-frequency resource for carrying the control information 425 shown in FIG. 12 is merely an example, and is not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain. In addition, in the example of FIG. 12, the terminal device 120 or the network device 110 may alternatively determine the transmission occasion 210-2, the transmission occasion 210-3, or the transmission occasion 210-4 from the first set 210, to send or receive the control information 425. More generally, if there are more transmission occasions in the first set 210, the terminal device 120 or the network device 110 may alternatively determine a transmission occasion from these transmission occasions in the first set 210, to send or receive the control information 425.

As described above with reference to FIG. 4, in some embodiments, the terminal device 120 and the network device 110 may alternatively determine (450) the transmission occasions from the first set 210 based on both a first beamforming manner of the shared channel 140 and the second beamforming manner of the control channel 150, to transmit the control information 425. Specifically, if the first beamforming manner is that a plurality of transmission occasions in the first set 210 are associated with different beams, and the second beamforming manner is that a plurality of transmission occasions in the second set 350 are associated with different beams, the terminal device 120 or the network device 110 may determine, from the first set 210, a plurality of transmission occasions associated with different beams, to transmit the control information 425. If one of the first beamforming manner and the second beamforming manner does not meet the foregoing condition, the terminal device 120 or the network device 110 may determine only one transmission occasion from the first set 210, to transmit the control information 425. In this manner, when the control information 425 requires coordinated multipoint transmission or multi-transmission reception point transmission to achieve high reliability, and the shared channel 140 is to use the coordinated multipoint transmission or the multi-transmission reception point transmission, transmission reliability of the control information 425 may be preferentially met by transmitting the control information 425 through the shared channel 140. It should be noted that, when the transmission occasions of the shared channel 140 for transmitting the control information 425 are determined based on both the first beamforming manner and the second beamforming manner, the terminal device 120 and the network device 110 may determine, one by one, whether a transmission occasion meets a condition about the first beamforming manner and a condition about the second beamforming manner, instead of first determining some transmission occasions by using the condition about the first beamforming manner, determining some other transmission occasions by using the condition about the second beamforming manner, and then determining an intersection set of the transmission occasions obtained twice. An example of determining the transmission occasions from the first set 210 based on both the first beamforming manner and the second beamforming manner is described in detail below with reference to FIG. 13.

Figure 13:
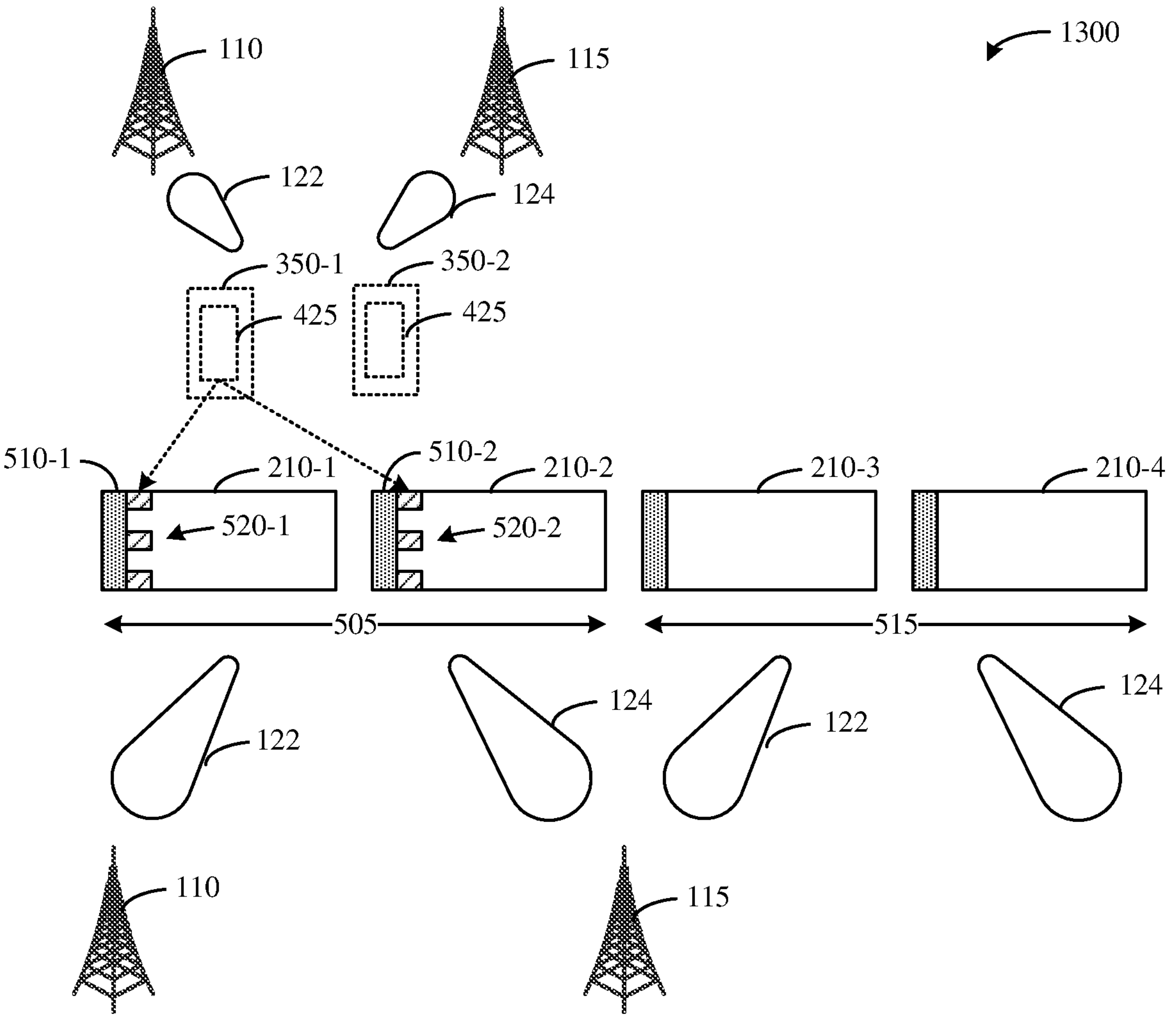
FIG. 13 shows another example of determining one or more transmission occasions for transmitting control information from a set of transmission occasions of a shared channel according to an embodiment of this disclosure.

FIG. 13 shows another example of determining one or more transmission occasions for transmitting control information 425 from a set 210 of transmission occasions of a shared channel 140 according to an embodiment of this disclosure. As shown in FIG. 13, transmission occasions 210-1 and 210-3 in the first set 210 of transmission occasions of the shared channel 140 are associated with a beam 122 pointing to a network device 110, and transmission occasions 210-2 and 210-4 are associated with a beam 124 pointing to a network device 115. Transmission occasions 350-1 and 350-2 in a second set 350 of transmission occasions of a control channel 150 are respectively associated with the beam 122 pointing to the network device 110 and the beam 124 pointing to the network device 115. FIG. 13 shows that the transmission occasions 350-1 and 350-2 of the control channel 150 for carrying the control information 425 and the transmission occasions 210-1 and 210-2 of the shared channel 140 respectively overlap in time domain. In addition, FIG. 13 further shows that the transmission occasions 210-1 and 210-2 are located in a slot 505, and the transmission occasions 210-3 and 210-4 are located in a slot 515. This means that a transmission occasion of the shared channel 140 may be at a sub-slot level, and the first set 210 may cross slots. It is understood that the transmission occasions 210-1 to 210-4 in FIG. 13 located in two slots are merely an example, and are not intended to limit the scope of this disclosure in any manner. In another embodiment, the transmission occasions 210-1 to 210-4 may alternatively be located in a same slot, or may be respectively located in more slots.

In the example of FIG. 13, because a first beamforming manner of the shared channel 140 is that the transmission occasions 210-1 and 210-2 in the first set 210 are respectively associated with different beams 122 and 124, and a second beamforming manner of the control channel 150 is that the transmission occasions 350-1 and 350-2 in the second set 350 are respectively associated with different beams 122 and 124, a terminal device 120 may determine the plurality of transmission occasions 210-1 and 210-2 from the first set 210, to transmit the control information 425 to the network device 110, and the network device 110 may also determine the plurality of transmission occasions 210-1 and 210-2 from the first set 210, to receive the control information 425 from the terminal device 120. For example, on the transmission occasions 210-1 and 210-2 in FIG. 13, the control information 425 may be separately carried on time-frequency resources 520-1 and 520-2 after time-frequency resources 510-1 and 510-2 for transmitting a demodulation reference signal, and the time-frequency resources 520-1 and 520-2 may be inconsecutive in frequency domain. It should be noted that the specific time-frequency resources for carrying the control information 425 shown in FIG. 13 are merely an example, and are not intended to limit the scope of this disclosure in any manner. In another embodiment, a time-frequency resource for carrying the control information 425 on the transmission occasion of the shared channel 140 may be at any appropriate position. For example, the time-frequency resource for carrying the control information 425 may not be adjacent to a time-frequency resource for carrying the demodulation reference signal, may be consecutive in frequency domain, or may be inconsecutive in time domain.

In addition, in the example of FIG. 13, the terminal device 120 or the network device 110 may alternatively determine the transmission occasions 210-1 and 210-4, the transmission occasions 210-2 and 210-3, or the transmission occasions 210-3 and 210-4 from the first set 210 to send or receive the control information 425 because these transmission occasions are also transmission occasions associated with different beams 122 and 124. More generally, if more transmission occasions in the first set 210 are associated with different beams, the terminal device 120 or the network device 110 may alternatively determine these transmission occasions from the first set 210, to send or receive the control information 425. For example, assuming that the transmission occasions 210-1 to 210-4 in FIG. 13 are respectively associated with four different beams, the terminal device 120 or the network device 110 may select all of the transmission occasions 210-1 to 210-4 to send or receive the control information 425.

Figure 14:
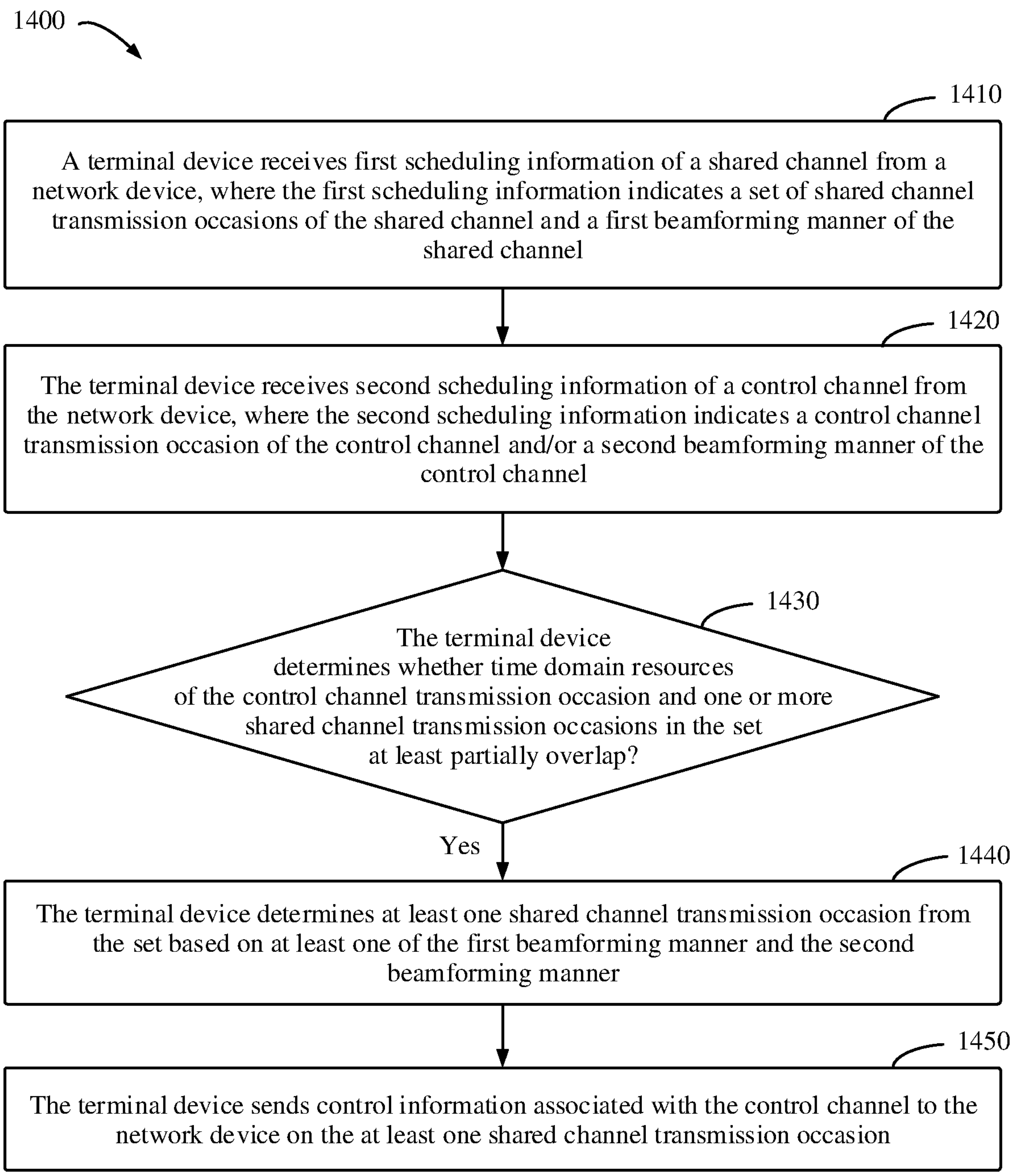
FIG. 14 is a flowchart of an example communication method according to an embodiment of this disclosure.

FIG. 14 is a flowchart of an example communication method 1400 according to an embodiment of this disclosure. In some embodiments, the example method 1400 may be implemented by the terminal device 120 in the example communication system 100, for example, may be implemented by a processor or a processing unit of the terminal device 120 in cooperation with another component (for example, a transceiver). In other embodiments, the example method 1400 may alternatively be implemented by another communication device independent of the example communication system 100, or may be implemented by another communication device in the example communication system 100. For ease of description, the example method 1400 is described with reference to FIG. 1 to FIG. 4.

In a block 1410, the terminal device 120 receives first scheduling information of a shared channel from a network device 110, where the first scheduling information indicates a set of shared channel transmission occasions of the shared channel and a first beamforming manner of the shared channel. In a block 1420, the terminal device 120 receives second scheduling information of a control channel from the network device 110, where the second scheduling information indicates a control channel transmission occasion of the control channel and/or a second beamforming manner of the control channel. In a block 1430, the terminal device 120 determines whether time domain resources of the control channel transmission occasion and one or more shared channel transmission occasions in the set at least partially overlap. In a block 1440, if the terminal device 120 determines that the time domain resources of the control channel transmission occasion and the one or more shared channel transmission occasions in the set at least partially overlap, the terminal device 120 determines at least one shared channel transmission occasion from the set based on at least one of the first beamforming manner and the second beamforming manner. It is optional that the second scheduling information indicates the second beamforming manner of the control channel. In a block 1450, the terminal device 120 sends control information associated with the control channel to the network device 110 on the at least one shared channel transmission occasion. According to the example method 1400, transmission reliability of the control information between the terminal device 120 and the network device 110 can be improved, and transmission reliability of data or other information on the shared channel can be further considered, to improve performance of communication between the network device 110 and the terminal device 120.

In some embodiments, the determining at least one shared channel transmission occasion from the set includes: If the first beamforming manner is that a plurality of shared channel transmission occasions in the set are associated with different beams, the terminal device 120 determines, from the set, the plurality of shared channel transmission occasions associated with the different beams. In this manner, in a scenario of coordinated multipoint transmission or multi-transmission reception point transmission of the network device 110, transmission reliability of the control information between the terminal device 120 and the network device 110 can be improved, to improve performance of communication between the terminal device 120 and the network device 110.

Optionally, transmit beams associated with the plurality of shared channel transmission occasions are different from each other.

In some embodiments, the plurality of shared channel transmission occasions are a plurality of shared channel transmission occasions, in the set of shared channel transmission occasions, that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device 120 and the network device 110 is low, to avoid a case in which the control information cannot be received within predetermined time and transmission performance of the data or other information on the shared channel is affected.

In some embodiments, the determining at least one shared channel transmission occasion from the set includes: The terminal device 120 determines a time period for generating the control information. The terminal device 120 determines a subset of the set based on the time period, where duration between a start time point of a shared channel transmission occasion in the subset and a receiving time point at which the second scheduling information is received is greater than the time period. The terminal device 120 determines the at least one shared channel transmission occasion from the subset. In this manner, the example method 1400 in this embodiment of this disclosure may adapt to the terminal device 120 with a low processing capability, and meet a limitation of the low processing capability of the terminal device 120.

In some embodiments, the determining at least one shared channel transmission occasion from the set includes: If the first beamforming manner is that all shared channel transmission occasions in the set are associated with a same beam, the terminal device 120 determines a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some embodiments, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that a plurality of control channel transmission occasions in the second set are associated with different beams, the terminal device 120 determines the plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that all control channel transmission occasions in the second set are associated with a same beam, the terminal device 120 determines a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the first beamforming manner is that a plurality of shared channel transmission occasions in the first set are associated with different beams, and the second beamforming manner is that a plurality of control channel transmission occasions in the second set are associated with different beams, the terminal device 120 determines, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some embodiments, the at least one shared channel transmission occasion includes a plurality of shared channel transmission occasions, and the sending control information includes: The terminal device 120 sends, on each of one or more of the plurality of shared channel transmission occasions, a plurality of modulation symbols corresponding to the control information. In this way, reliability of transmitting the control information on a plurality of transmission occasions of the shared channel can be improved.

In some embodiments, the at least one shared channel transmission occasion includes a plurality of shared channel transmission occasions, and the sending control information includes: The terminal device 120 sends, on each of the plurality of shared channel transmission occasions, a part of a plurality of modulation symbols corresponding to the control information. In this way, transmission reliability of the data or other information on the shared channel can be improved.

In some embodiments, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

Figure 15:
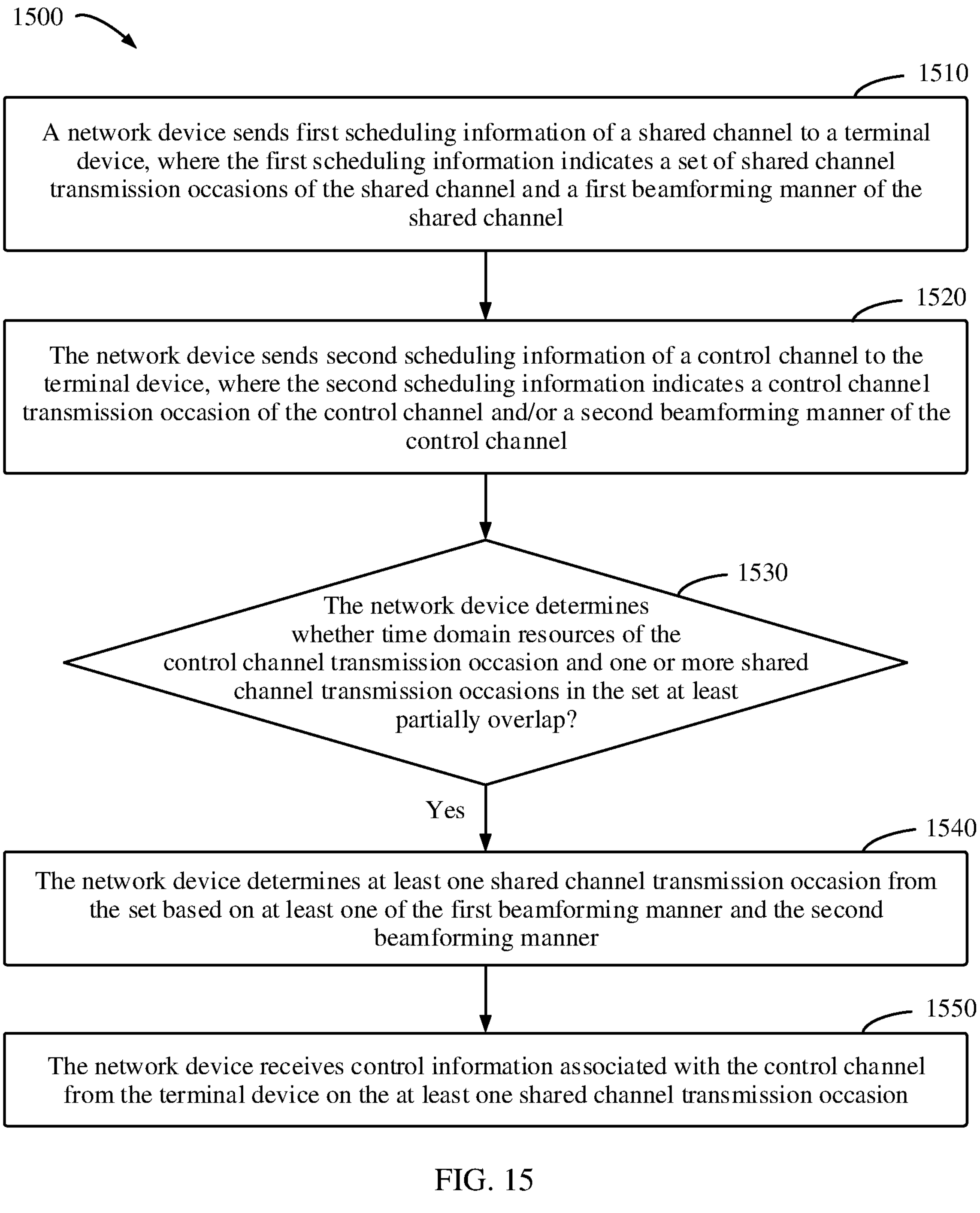
FIG. 15 is a flowchart of another example communication method according to an embodiment of this disclosure.

FIG. 15 is a flowchart of another example communication method 1500 according to an embodiment of this disclosure. In some embodiments, the example method 1500 may be implemented by the network device 110 in the example communication system 100, for example, may be implemented by a processor or a processing unit of the network device 110 in cooperation with another component (for example, a transceiver). In other embodiments, the example method 1500 may alternatively be implemented by another communication device independent of the example communication system 100, or may be implemented by another communication device in the example communication system 100. For ease of description, the example method 1500 is described with reference to FIG. 1 to FIG. 4.

In a block 1510, the network device 110 sends first scheduling information of a shared channel to a terminal device 120, where the first scheduling information indicates a set of shared channel transmission occasions of the shared channel and a first beamforming manner of the shared channel. In a block 1520, the network device 110 sends second scheduling information of a control channel to the terminal device 120, where the second scheduling information indicates a control channel transmission occasion of the control channel and/or a second beamforming manner of the control channel. In a block 1530, the network device 110 determines whether time domain resources of the control channel transmission occasion and one or more shared channel transmission occasions in the set at least partially overlap. In a block 1540, if the network device 110 determines that the time domain resources of the control channel transmission occasion and the one or more shared channel transmission occasions in the set at least partially overlap, the network device 110 determines at least one shared channel transmission occasion from the set based on at least one of the first beamforming manner and the second beamforming manner. It is optional that the second scheduling information indicates the second beamforming manner of the control channel. In a block 1550, the network device 110 receives control information associated with the control channel from the terminal device 120 on the at least one shared channel transmission occasion. According to the example method 1500, transmission reliability of the control information between the terminal device 120 and the network device 110 can be improved, and transmission reliability of data or other information on the shared channel can be further considered, to improve performance of communication between the network device 110 and the terminal device 120.

In some embodiments, the determining at least one shared channel transmission occasion from the set includes: If the first beamforming manner is that a plurality of shared channel transmission occasions in the set are associated with different beams, the network device 110 determines, from the set, the plurality of shared channel transmission occasions associated with the different beams. In this manner, in a scenario of coordinated multipoint transmission or multi-transmission reception point transmission of the network device 110, transmission reliability of the control information between the terminal device 120 and the network device 110 can be improved, to improve performance of communication between the terminal device 120 and the network device 110.

Optionally, transmit beams associated with the plurality of shared channel transmission occasions are different from each other.

In some embodiments, the plurality of shared channel transmission occasions are a plurality of shared channel transmission occasions in the set that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device 120 and the network device 110 is low, to avoid a case in which the control information cannot be received within predetermined time and transmission performance of the data or other information on the shared channel is affected.

In some embodiments, the determining at least one shared channel transmission occasion from the set includes: The network device 110 determines a time period used by the terminal device 120 to generate the control information. The network device 110 determines a subset of the set based on the time period, where duration between a start time point of a shared channel transmission occasion in the subset and a receiving time point at which the terminal device 120 receives the second scheduling information is greater than the time period. The network device 110 determines the at least one shared channel transmission occasion from the subset. In this manner, the example method 1500 in this embodiment of this disclosure may adapt to the terminal device 120 with a low processing capability, and meet a limitation of the low processing capability of the terminal device 120.

In some embodiments, the determining at least one shared channel transmission occasion from the set includes: If the first beamforming manner is that all shared channel transmission occasions in the set are associated with a same beam, the network device 110 determines a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some embodiments, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that a plurality of control channel transmission occasions in the second set are associated with different beams, the network device 110 determines the plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the second beamforming manner is that all control channel transmission occasions in the second set are associated with a same beam, the network device 110 determines a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the determining at least one shared channel transmission occasion from the first set includes: If the first beamforming manner is that a plurality of shared channel transmission occasions in the first set are associated with different beams, and the second beamforming manner is that a plurality of control channel transmission occasions in the second set are associated with different beams, the network device 110 determines, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some embodiments, the at least one shared channel transmission occasion includes a plurality of shared channel transmission occasions, and the receiving control information includes: The network device 110 receives, on each of one or more of the plurality of shared channel transmission occasions, a plurality of modulation symbols corresponding to the control information. In this way, reliability of transmitting the control information on a plurality of transmission occasions of the shared channel can be improved.

In some embodiments, the at least one shared channel transmission occasion includes a plurality of shared channel transmission occasions, and the receiving control information includes: The network device 110 receives, on each of the plurality of shared channel transmission occasions, a part of a plurality of modulation symbols corresponding to the control information. In this way, transmission reliability of the data or other information on the shared channel can be improved.

In some embodiments, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

Figure 16:
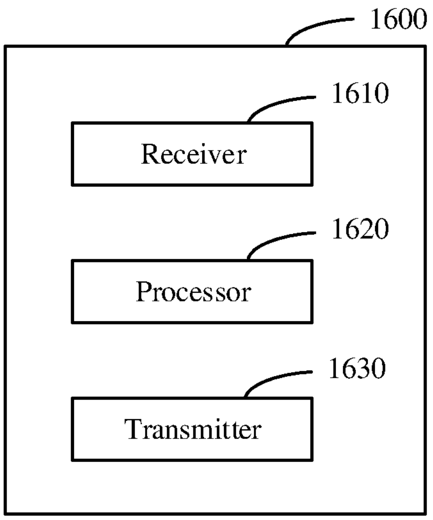
FIG. 16 is a block diagram of an example communication apparatus according to an embodiment of this disclosure.

FIG. 16 is a block diagram of an example communication apparatus 1600 according to an embodiment of this disclosure. In some embodiments, the example apparatus 1600 may be implemented at the terminal device 120 in the example communication system 100, for example, may be implemented by a processor or a processing unit of the terminal device 120 in cooperation with another component (for example, a transceiver). In some embodiments, the example apparatus 1600 may be implemented as the terminal device 120. In other embodiments, the example apparatus 1600 may alternatively be implemented as a communication device independent of the example communication system 100.

In some embodiments, the example apparatus 1600 may include a receiver 1610, a processor 1620, and a transmitter 1630. The receiver 1610 is configured to receive first scheduling information of a shared channel from a network device, where the first scheduling information indicates a set of shared channel transmission occasions of the shared channel and a first b eamforming manner of the shared channel. The receiver 1610 is further configured to receive second scheduling information of a control channel from the network device, where the second scheduling information indicates a control channel transmission occasion of the control channel and/or a second beamforming manner of the control channel. The processor 1620 is configured to: if determining that time domain resources of the control channel transmission occasion and one or more shared channel transmission occasions in the set at least partially overlap, determine at least one shared channel transmission occasion from the set based on at least one of the first beamforming manner and the second beamforming manner. It is optional that the second scheduling information indicates the second beamforming manner of the control channel. The transmitter 1630 is configured to send control information associated with the control channel to the network device on the at least one shared channel transmission occasion. Based on the apparatus, transmission reliability of the control information between the terminal device and the network device can be improved, and transmission reliability of data or other information on the shared channel can be further considered, to improve performance of communication between the network device and the terminal device.

In some embodiments, the processor 1620 is further configured to determine the at least one shared channel transmission occasion from the set in the following manner: if the first beamforming manner is that a plurality of shared channel transmission occasions in the set are associated with different beams, determining the plurality of shared channel transmission occasions associated with the different beams. In this manner, in a scenario of coordinated multipoint transmission or multi-transmission reception point transmission of the network device, transmission reliability of the control information between the terminal device and the network device can be improved, to improve performance of communication between the terminal device and the network device.

Optionally, transmit beams associated with the plurality of shared channel transmission occasions are different from each other.

In some embodiments, the plurality of shared channel transmission occasions are a plurality of shared channel transmission occasions in the set that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device and the network device is low, to avoid a case in which the control information cannot be received within predetermined time and transmission performance of the data or other information on the shared channel is affected.

In some embodiments, the processor 1620 is further configured to determine the at least one shared channel transmission occasion from the set in the following manner: determining a time period for generating the control information; determining a subset of the set based on the time period, where duration between a start time point of the shared channel transmission occasion in the subset and a receiving time point at which the second scheduling information is received is greater than the time period; and determining the at least one shared channel transmission occasion from the subset. In this manner, the example apparatus 1600 in this embodiment of this disclosure may adapt to a terminal device with a low processing capability, and meet a limitation of the low processing capability of the terminal device.

In some embodiments, the processor 1620 is further configured to determine the at least one shared channel transmission occasion from the set in the following manner: if the first beamforming manner is that all shared channel transmission occasions in the set are associated with a same beam, determining a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some embodiments, the set of shared channel transmission occasions is a first set, the foregoing control channel transmission occasion is a control channel transmission occasion in a second set of control channel transmission occasions of the control channel, and the processor 1620 is further configured to determine the at least one shared channel transmission occasion from the first set in the following manner: if the second beamforming manner is that a plurality of control channel transmission occasions in the second set are associated with different beams, determining a plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the processor 1620 is further configured to determine the at least one shared channel transmission occasion from the first set in the following manner: if the second beamforming manner is that all control channel transmission occasions in the second set are associated with a same beam, determining a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the processor 1620 is further configured to determine the at least one shared channel transmission occasion from the first set in the following manner: if the first beamforming manner is that a plurality of shared channel transmission occasions in the first set are associated with different beams, and the second beamforming manner is that a plurality of control channel transmission occasions in the second set are associated with different beams, determining, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some embodiments, the at least one shared channel transmission occasion includes a plurality of shared channel transmission occasions, and the transmitter 1630 is further configured to send the control information in the following manner: sending, on each of one or more of the plurality of shared channel transmission occasions, a plurality of modulation symbols corresponding to the control information. In this way, reliability of transmitting the control information on a plurality of transmission occasions of the shared channel can be improved.

In some embodiments, the at least one shared channel transmission occasion includes a plurality of shared channel transmission occasions, and the transmitter 1630 is further configured to send the control information in the following manner: sending, on each of the plurality of shared channel transmission occasions, a part of a plurality of modulation symbols corresponding to the control information. In this way, transmission reliability of the data or other information on the shared channel can be improved.

In some embodiments, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

Figure 17:
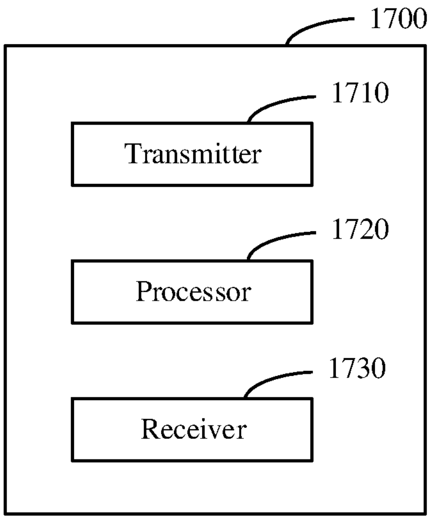
FIG. 17 is a block diagram of another example communication apparatus according to an embodiment of this disclosure.

FIG. 17 is a block diagram of another example communication apparatus 1700 according to an embodiment of this disclosure. In some embodiments, the example apparatus 1700 may be implemented at the network device 110 in the example communication system 100, for example, may be implemented by a processor or a processing unit of the network device 110 in cooperation with another component (for example, a transceiver). In some embodiments, the example apparatus 1700 may be implemented as the network device 110. In other embodiments, the example apparatus 1700 may alternatively be implemented as a communication device independent of the example communication system 100.

In some embodiments, the example apparatus 1700 may include a transmitter 1710, a processor 1720, and a receiver 1730. The transmitter 1710 is configured to send first scheduling information of a shared channel to a terminal device, where the first scheduling information indicates a set of shared channel transmission occasions of the shared channel and a first beamforming manner of the shared channel. The transmitter 1710 is further configured to send second scheduling information of a control channel to the terminal device, where the second scheduling information indicates a control channel transmission occasion of the control channel and/or a second beamforming manner of the control channel. The processor 1720 is configured to: if determining that time domain resources of the control channel transmission occasion and one or more shared channel transmission occasions in the set at least partially overlap, determine at least one shared channel transmission occasion from the set based on at least one of the first beamforming manner and the second beamforming manner. It is optional that the second scheduling information indicates the second beamforming manner of the control channel. The receiver 1730 is configured to receive control information associated with the control channel from the terminal device on the at least one shared channel transmission occasion. Based on the apparatus, transmission reliability of the control information between the terminal device and the network device can be improved, and transmission reliability of data or other information on the shared channel can be further considered, to improve performance of communication between the network device and the terminal device.

In some embodiments, the processor 1720 is further configured to determine the at least one shared channel transmission occasion from the set in the following manner: if the first beamforming manner is that a plurality of shared channel transmission occasions in the set are associated with different beams, determining the plurality of shared channel transmission occasions associated with the different beams. In this manner, in a scenario of coordinated multipoint transmission or multi-transmission reception point transmission of the network device, transmission reliability of the control information between the terminal device and the network device can be improved, to improve performance of communication between the terminal device and the network device.

Optionally, transmit beams associated with the plurality of shared channel transmission occasions are different from each other.

In some embodiments, the plurality of shared channel transmission occasions are a plurality of shared channel transmission occasions in the set that are consecutively numbered in time domain; or a time interval between the plurality of shared channel transmission occasions is less than or equal to predetermined duration. The plurality of shared channel transmission occasions carry the control information. In this way, it can be ensured that a transmission latency of the control information between the terminal device and the network device is low, to avoid a case in which the control information cannot be received within predetermined time and transmission performance of the data or other information on the shared channel is affected.

In some embodiments, the processor 1720 is further configured to determine the at least one shared channel transmission occasion from the set in the following manners: determining a time period used by the terminal device to generate the control information; determining a subset of the set based on the time period, where duration between a start time point of a shared channel transmission occasion in the subset and a receiving time point at which the terminal device receives the second scheduling information is greater than the time period; and determining the at least one shared channel transmission occasion from the subset. In this manner, the example apparatus 1700 in this embodiment of this disclosure may adapt to a terminal device with a low processing capability, and meet a limitation of the low processing capability of the terminal device.

In some embodiments, the processor 1720 is further configured to determine the at least one shared channel transmission occasion from the set in the following manner: if the first beamforming manner is that all shared channel transmission occasions in the set are associated with a same beam, determining a shared channel transmission occasion from the set. In this way, when the control information is transmitted through the shared channel, impact of the control information on transmission performance of the data or other information on the shared channel can be reduced as much as possible, to achieve a compromise between transmission performance of the control information and transmission performance of the data or other information.

In some embodiments, the set of shared channel transmission occasions is a first set, the foregoing control channel transmission occasion is a control channel transmission occasion in a second set of control channel transmission occasions of the control channel, and the processor 1720 is further configured to determine the at least one shared channel transmission occasion from the first set in the following manner: if the second beamforming manner is that a plurality of control channel transmission occasions in the second set are associated with different beams, determining a plurality of shared channel transmission occasions from the first set. In this manner, when the control information requires coordinated multipoint transmission or multi-transmission reception point transmission to achieve high reliability, transmission reliability of the control information may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the processor 1720 is further configured to determine the at least one shared channel transmission occasion from the first set in the following manner: if the second beamforming manner is that all control channel transmission occasions in the second set are associated with a same beam, determining a shared channel transmission occasion from the first set. In this manner, when the control information does not require coordinated multipoint transmission or multi-transmission reception point transmission to achieve high reliability, transmission reliability of the data or other information on the shared channel may be preferentially met by transmitting the control information through the shared channel.

In some embodiments, the set of shared channel transmission occasions is a first set, the foregoing control channel transmission occasion is a control channel transmission occasion in a second set of control channel transmission occasions of the control channel, and the processor 1720 is further configured to determine the at least one shared channel transmission occasion from the first set in the following manner: if the first beamforming manner is that a plurality of shared channel transmission occasions in the first set are associated with different beams, and the second beamforming manner is that a plurality of control channel transmission occasions in the second set are associated with different beams, determining, from the first set, the plurality of shared channel transmission occasions associated with the different beams. In this manner, when the control information requires coordinated multipoint transmission or multi-transmission reception point transmission to achieve high reliability, and the shared channel is to use the coordinated multipoint transmission or the multi-transmission reception point transmission, transmission reliability of the control information may be preferentially met by transmitting the control information through the shared channel.

Optionally, the first set is a subset, in the set, determined by the terminal device based on the time period.

In some embodiments, the at least one shared channel transmission occasion includes a plurality of shared channel transmission occasions, and the receiver 1730 is further configured to receive the control information in the following manner: receiving, on each of one or more of the plurality of shared channel transmission occasions, a plurality of modulation symbols corresponding to the control information. In this way, reliability of transmitting the control information on a plurality of transmission occasions of the shared channel can be improved.

In some embodiments, the at least one shared channel transmission occasion includes a plurality of shared channel transmission occasions, and the receiver 1730 is further configured to receive the control information in the following manner: receiving, on each of the plurality of shared channel transmission occasions, a part of a plurality of modulation symbols corresponding to the control information. In this way, transmission reliability of the data or other information on the shared channel can be improved.

In some embodiments, a quantity of modulation symbols sent on each of the plurality of shared channel transmission occasions is determined based on a corresponding quantity of time-frequency resources included on each of the plurality of shared channel transmission occasions. In this manner, modulation symbols of the control information may be allocated to each transmission occasion based on a quantity of time-frequency resources of the transmission occasion, to reduce impact of the carried control information on data or other information on a transmission occasion with a small quantity of time-frequency resources of the shared channel.

In some implementations, a beamforming manner is indicated by the network device by using spatial filtering indication information or sounding (sounding) reference signal indication information.

In some implementations, the at least one shared channel transmission occasion carries a same transport block. Optionally, a modulation symbol formed from a same transport block by using at least one redundancy version value is separately mapped to the at least one shared channel transmission occasion.

In some implementations, the at least one shared channel transmission occasion is scheduled by one piece of DCI signaling, that is, the first scheduling information is carried in one piece of DCI signaling. The first scheduling information includes information indicating a quantity of the at least one shared channel transmission occasion.

In some implementations, the at least one shared channel transmission occasion is separately scheduled by at least one piece of DCI signaling, and each piece of DCI signaling indicates a time domain position of one shared channel transmission occasion.

In some implementations, the at least one shared channel transmission occasion and the control channel transmission occasion are located on a same carrier or in a same bandwidth part (BWP).

Figure 18:
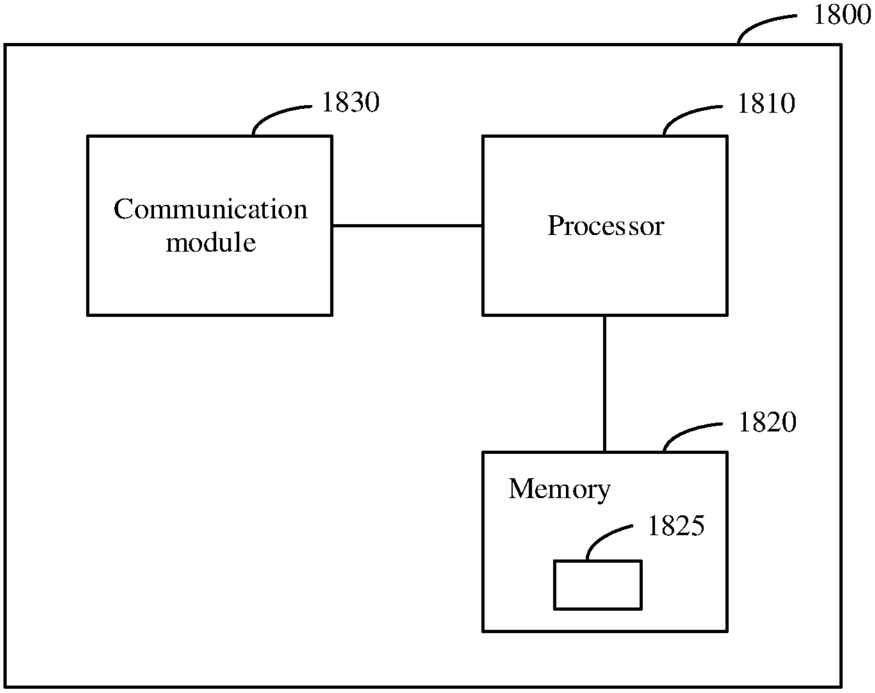
FIG. 18 is a block diagram of an example electronic device according to an embodiment of this disclosure.

FIG. 18 is a block diagram of an example electronic device 1800 according to an embodiment of this disclosure. The example electronic device 1800 may be configured to implement a communication device, for example, the network devices 110 and 115 and the terminal devices 120 and 130 in FIG. 1. Therefore, the example electronic device 1800 may also be referred to as an example communication device 1800 in this specification. As shown in FIG. 18, the example communication device 1800 may include a processor 1810 and a memory 1820 coupled to the processor 1810. The memory 1820 stores computer program instructions 1825. In addition, the example communication device 1800 may further include a communication module 1830 coupled to the processor 1810. The communication module 1830 may be used for bidirectional communication, and may have at least one wire cable, optical cable, wireless interface, and the like to facilitate communication. The communication interface may represent any interface configured to communicate with another device.

The processor 1810 may have any type suitable for a local technical environment, and may include, as a non-limiting example, one or more of the following: a general-purpose computer, a dedicated computer, a microprocessor, a digital signal processor (DSP), and a processor that is based on a multi-core processor architecture. The example communication device 1800 may have a plurality of processors, such as an application-specific integrated circuit chip that follows a clock synchronized with a main processor in terms of time. The memory 1820 may include one or more nonvolatile memories and one or more volatile memories. Examples of the nonvolatile memory include but are not limited to a read-only memory (ROM), an electrically erasable programmable read-only memory (EPROM), a flash memory, a hard disk, a compact disc (CD), a digital versatile disc (DVD), and other magnetic storage devices and/or optical storage devices. Examples of the volatile memory include but are not limited to a random access memory (RAM) or another volatile memory that is not sustainable during a power failure. The computer program instructions 1825 may include computer-executable instructions that are executable by the associated processor 1810. In some embodiments, the computer program instructions 1825 may be stored in a ROM of the memory 1820. The processor 1810 may perform various appropriate actions and processing by loading the memory 1820 into a RAM of the memory 1820. Embodiments of this disclosure may be implemented by using the computer program instructions 1825, so that the example communication device 1800 performs any method or process of this disclosure described above with reference to FIG. 4, FIG. 14, and FIG. 15. Certainly, embodiments of this disclosure may alternatively be implemented by hardware or a combination of software and hardware.

In some embodiments, the computer program instructions 1825 may be tangibly included in a computer-readable medium. Such a computer-readable medium may be included in the example communication device 1800 (for example, the memory 1820) or included in another storage device accessible to the example communication device 1800. The example communication device 1800 may read the computer program instructions 1825 from the computer-readable medium to the RAM of the memory 1820 for execution. The computer-readable medium may include various tangible nonvolatile storage devices, such as a ROM, an EPROM, a flash memory, a hard disk, a CD, a DVD, and the like.

In general, the various example embodiments of this disclosure may be implemented in hardware or dedicated circuitry, software, logic, or any combination thereof. Some aspects may be implemented in hardware, while other aspects may be implemented in firmware or software that may be executed by a controller, a microprocessor, or another computing device. For example, in some embodiments, various examples (for example, a method, an apparatus, or a device) of this disclosure may be partially or all implemented on the computer-readable medium. When aspects of embodiments of this disclosure are illustrated or described as block diagrams, flowcharts, or represented using some other figures, it is understood that the blocks, apparatuses, systems, techniques, or methods described herein may be implemented as non-limiting examples in hardware, software, firmware, dedicated circuitry or logic, general-purpose hardware or controllers, or other computing devices, or some combinations thereof.

This disclosure further provides at least one computer program product stored on a non-transitory computer-readable storage medium. The computer program product includes computer-executable instructions. The computer-executable instructions, for example, are included in a program module executed in a component on a target physical or virtual processor, and are used to perform the example methods or example processes 400, 1400, and 1500 described above with reference to FIG. 4, FIG. 14, and FIG. 15. In general, the program module may include a routine, a program, a library, an object, a class, a component, a data structure, and the like, and execute a specific task or implement a specific abstract data structure. In various embodiments, functions of program modules may be combined or split between the described program modules. The computer-executable instructions for the program module may be executed locally or in a distributed device. In the distributed device, the program module may be located in both a local storage medium and a remote storage medium.

Program code used to implement the methods of this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server. In a context of this disclosure, the computer program code or related data may be carried by any appropriate carrier, so that a device, an apparatus, or a processor can perform various processes and operations described above. Examples of the carrier include a signal, a computer-readable medium, and the like.

The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

In addition, while operations are described in a particular order, this should not be understood as requiring such operations to be completed in the particular order shown or in a successive order, or performing all the illustrated operations to obtain the desired results. In some cases, multitasking or parallel processing is advantageous. Similarly, while the foregoing descriptions include some specific implementation details, this should not be construed as limitations on the scope of any invention or claims, but rather as descriptions of specific embodiments that may be specific to a specific invention. Some features described in this specification in the context of separate embodiments may alternatively be integrated into a single embodiment. Conversely, various features that are described in the context of a single embodiment may alternatively be implemented separately in a plurality of embodiments or in any suitable sub-combination.

Although the subject matter has been described in language specific to structural features and/or methodological actions, it should be understood that the subject matter defined in the appended claims is not limited to the specific features or actions described above. Rather, the specific features and actions described above are disclosed as example forms of implementing the claims.

What is claimed is:

1. A communication method, comprising:

receiving, by a terminal device, first scheduling information of a shared channel from a network device, wherein the first scheduling information indicates:

a set of shared channel transmission occasions of the shared channel, and a first beamforming manner of the shared channel;

receiving, by the terminal device, second scheduling information of a control channel from the network device, wherein the second scheduling information indicates at least one of:

a control channel transmission occasion of the control channel, or a second beamforming manner of the control channel;

in response to the terminal device determining that time domain resources of the control channel transmission occasion and one or more shared channel transmission occasions in the set at least partially overlap, determining, by the terminal device, at least one shared channel transmission occasion from the set based on at least one of the first beamforming manner or the second beamforming manner; and sending, by the terminal device, control information associated with the control channel to the network device on the at least one shared channel transmission occasion.

2. The method according to claim 1, wherein the determining the at least one shared channel transmission occasion from the set comprises:

in response to the first beamforming manner being that a plurality of shared channel transmission occasions in the set is associated with different beams, determining, by the terminal device from the set, the plurality of shared channel transmission occasions associated with the different beams as the at least one shared channel transmission occasion.

3. The method according to claim 2, wherein the plurality of shared channel transmission occasions is consecutively numbered in time domain in the set; or a time interval between the plurality of shared channel transmission occasions is less than or equal to predetermined duration.

4. The method according to claim 1, wherein the determining the at least one shared channel transmission occasion from the set comprises:

determining, by the terminal device, a time period for generating the control information;

determining, by the terminal device, a subset of the set based on the time period, wherein duration between a start time point of a shared channel transmission occasion in the subset and a receiving time point at which the second scheduling information is received is greater than the time period; and determining, by the terminal device, the at least one shared channel transmission occasion from the subset.

5. The method according to claim 1, wherein the determining the at least one shared channel transmission occasion from the set comprises:

in response to the first beamforming manner being that all shared channel transmission occasions in the set are associated with a same beam, determining, by the terminal device, a shared channel transmission occasion from the set as the at least one shared channel transmission occasion.

6. A communication method, comprising:

sending, by a network device, first scheduling information of a shared channel to a terminal device, wherein the first scheduling information indicates:

a set of shared channel transmission occasions of the shared channel, and a first beamforming manner of the shared channel;

sending, by the network device, second scheduling information of a control channel to the terminal device, wherein the second scheduling information indicates at least one of:

a control channel transmission occasion of the control channel, or a second beamforming manner of the control channel;

in response to the network device determining that time domain resources of the control channel transmission occasion and one or more shared channel transmission occasions in the set at least partially overlap, determining, by the network device, at least one shared channel transmission occasion from the set based on at least one of the first beamforming manner or the second beamforming manner; and receiving, by the network device, control information associated with the control channel from the terminal device on the at least one shared channel transmission occasion.

7. The method according to claim 6, wherein the determining the at least one shared channel transmission occasion from the set comprises:

in response to the first beamforming manner being that a plurality of shared channel transmission occasions in the set is associated with different beams, determining, by the network device from the set, the plurality of shared channel transmission occasions associated with the different beams as the at least one shared channel transmission occasion.

8. The method according to claim 7, wherein the plurality of shared channel transmission occasions is consecutively numbered in time domain in the set; or a time interval between the plurality of shared channel transmission occasions is less than or equal to predetermined duration.

9. The method according to claim 6, wherein the determining the at least one shared channel transmission occasion from the set comprises:

determining, by the network device, a time period used by the terminal device to generate the control information;

determining, by the network device, a subset of the set based on the time period, wherein duration between a start time point of a shared channel transmission occasion in the subset and a receiving time point at which the terminal device receives the second scheduling information is greater than the time period; and determining, by the network device, the at least one shared channel transmission occasion from the subset.

10. The method according to claim 6, wherein the determining the at least one shared channel transmission occasion from the set comprises:

in response to the first beamforming manner being that all shared channel transmission occasions in the set are associated with a same beam, determining, by the network device, a shared channel transmission occasion from the set as the at least one shared channel transmission occasion.

11. A communication apparatus, comprising:

a receiver, configured to:

receive first scheduling information of a shared channel from a network device, wherein the first scheduling information indicates:

a set of shared channel transmission occasions of the shared channel, and a first beamforming manner of the shared channel, and receive second scheduling information of a control channel from the network device, wherein the second scheduling information indicates at least one of:

a control channel transmission occasion of the control channel, or a second beamforming manner of the control channel;

a processor, configured to, in response to determining that time domain resources of the control channel transmission occasion and one or more shared channel transmission occasions in the set at least partially overlap, determine at least one shared channel transmission occasion from the set based on at least one of the first beamforming manner or the second beamforming manner; and a transmitter, configured to send control information associated with the control channel to the network device on the at least one shared channel transmission occasion.

12. The apparatus according to claim 11, wherein the processor is further configured to:

in response to the first beamforming manner being that a plurality of shared channel transmission occasions in the set is associated with different beams, determine the plurality of shared channel transmission occasions associated with the different beams as the at least one shared channel transmission occasion.

13. The apparatus according to claim 12, wherein the plurality of shared channel transmission occasions is consecutively numbered in time domain in the set; or a time interval between the plurality of shared channel transmission occasions is less than or equal to predetermined duration.

14. The apparatus according to claim 11, wherein the processor is further configured to:

determine a time period for generating the control information;

determine a subset of the set based on the time period, wherein duration between a start time point of a shared channel transmission occasion in the subset and a receiving time point at which the second scheduling information is received is greater than the time period; and determine the at least one shared channel transmission occasion from the subset.

15. The apparatus according to claim 11, wherein the processor is further configured to:

in response to the first beamforming manner being that all shared channel transmission occasions in the set are associated with a same beam, determine a shared channel transmission occasion from the set as the at least one shared channel transmission occasion.

16. A communication apparatus, comprising:

a transmitter, configured to:

send first scheduling information of a shared channel to a terminal device, wherein the first scheduling information indicates:

a set of shared channel transmission occasions of the shared channel, and a first beamforming manner of the shared channel, and send second scheduling information of a control channel to the terminal device, wherein the second scheduling information indicates at least one of:

a control channel transmission occasion of the control channel, or a second beamforming manner of the control channel;

a processor, configured to, in response to determining that time domain resources of the control channel transmission occasion and one or more shared channel transmission occasions in the set at least partially overlap, determine at least one shared channel transmission occasion from the set based on at least one of the first beamforming manner or the second beamforming manner; and a receiver, configured to receive control information associated with the control channel from the terminal device on the at least one shared channel transmission occasion.

17. The apparatus according to claim 16, wherein the processor is further configured to:

in response to the first beamforming manner being that a plurality of shared channel transmission occasions in the set is associated with different beams, determine the plurality of shared channel transmission occasions associated with the different beams as the at least one shared channel transmission occasion.

18. The apparatus according to claim 17, wherein the plurality of shared channel transmission occasions is consecutively numbered in time domain in the set; or a time interval between the plurality of shared channel transmission occasions is less than or equal to predetermined duration.

19. The apparatus according to claim 16, wherein the processor is further configured to:

determine a time period used by the terminal device to generate the control information;

determine a subset of the set based on the time period, wherein duration between a start time point of a shared channel transmission occasion in the subset and a receiving time point at which the terminal device receives the second scheduling information is greater than the time period; and determine the at least one shared channel transmission occasion from the subset.

20. The apparatus according to claim 16, wherein the processor is further configured to:

in response to the first beamforming manner being that all shared channel transmission occasions in the set are associated with a same beam, determine a shared channel transmission occasion from the set as the at least one shared channel transmission occasion.

* * * * *